United States Patent [19]
Kurita

[11] Patent Number: 5,933,257
[45] Date of Patent: Aug. 3, 1999

[54] IMAGE PROCESSING APPARATUS AND METHOD AND STORING MEDIUM

[75] Inventor: Mitsuru Kurita, Yokohama, Japan

[73] Assignee: Canon Kabushiki Kaisha, Tokyo, Japan

[21] Appl. No.: 08/922,645

[22] Filed: Sep. 3, 1997

[30]     Foreign Application Priority Data

Sep. 4, 1996   [JP]   Japan ................................. 8-234218

[51] Int. Cl.$^6$ ................................. G03F 3/10; H04N 1/46
[52] U.S. Cl. ........................................ 358/527; 358/530
[58] Field of Search ................................. 358/527, 500, 358/501, 518, 520, 515, 529, 530; 382/166, 167

[56]            References Cited

U.S. PATENT DOCUMENTS

| | | | |
|---|---|---|---|
| 4,364,084 | 12/1982 | Akimoto et al. | 358/76 |
| 5,173,950 | 12/1992 | Sato et al. | 382/54 |
| 5,357,354 | 10/1994 | Matsunawa et al. | 358/530 |
| 5,448,380 | 9/1995 | Park | 358/520 |

*Primary Examiner*—Jerome Grant II
*Attorney, Agent, or Firm*—Fitzpatrick, Cella, Harper & Scinto

[57]            ABSTRACT

Preview displaying is performed in which a setting color process mode is reflected by performing a preview process corresponding to a first color process mode irrespective of a color process control signal. An image processing system which performs the preview displaying includes a judgment unit which judge a characteristic of image data, and outputs the color process control signal to control in which color process mode in the plurality of color process modes, including the first color process mode, a color process is to be performed on the image data. Also included are a color processor which performs a color process on a image data in a color process mode corresponding to the color process control signal, and an output unit which outputs the color-processed image data to an image formation unit. Further included is a preview processor which performs the preview process on the color-processed image data, wherein the preview processor performs the preview process corresponding to the first color process mode irrespective of the color process control signal.

6 Claims, 42 Drawing Sheets

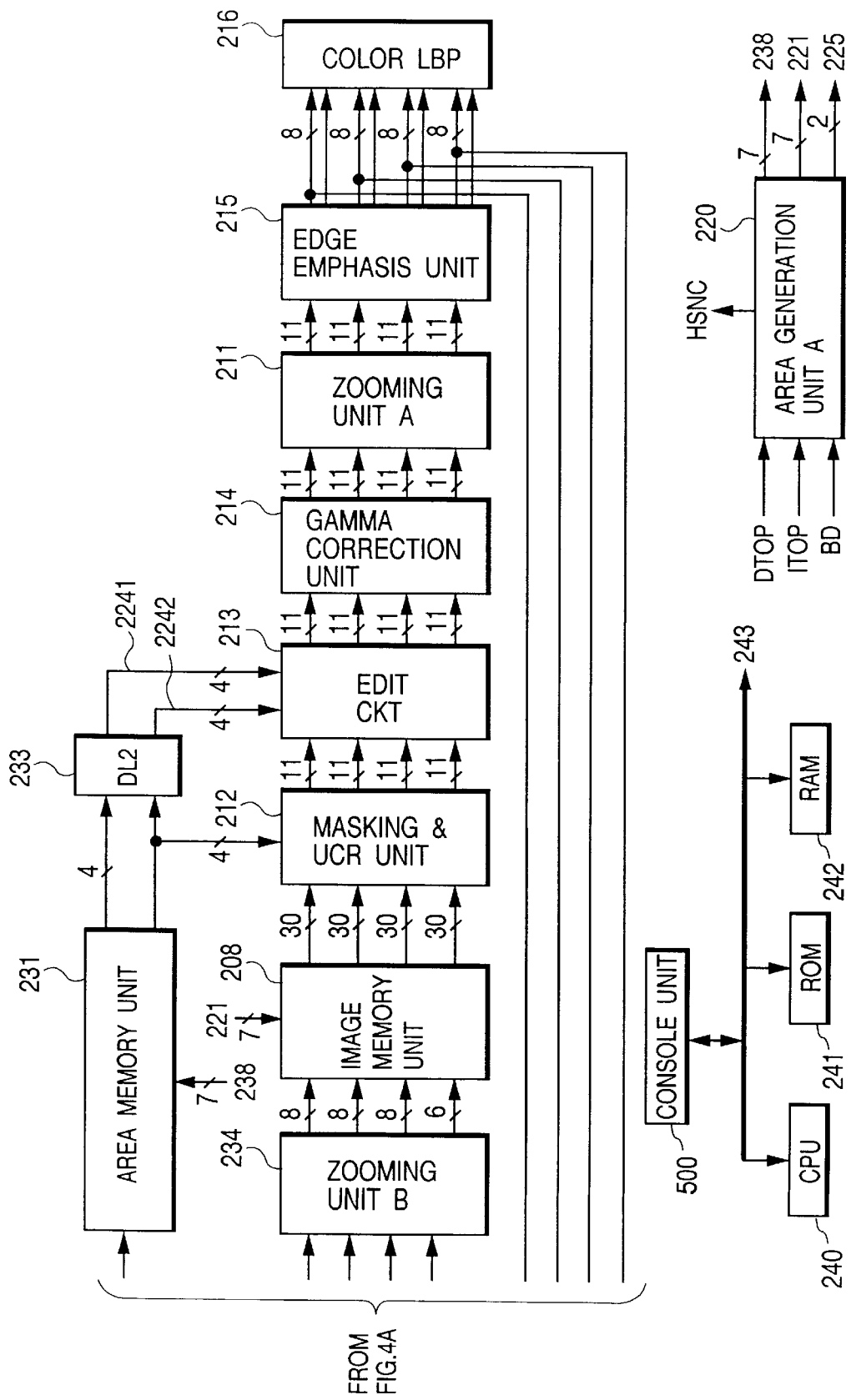

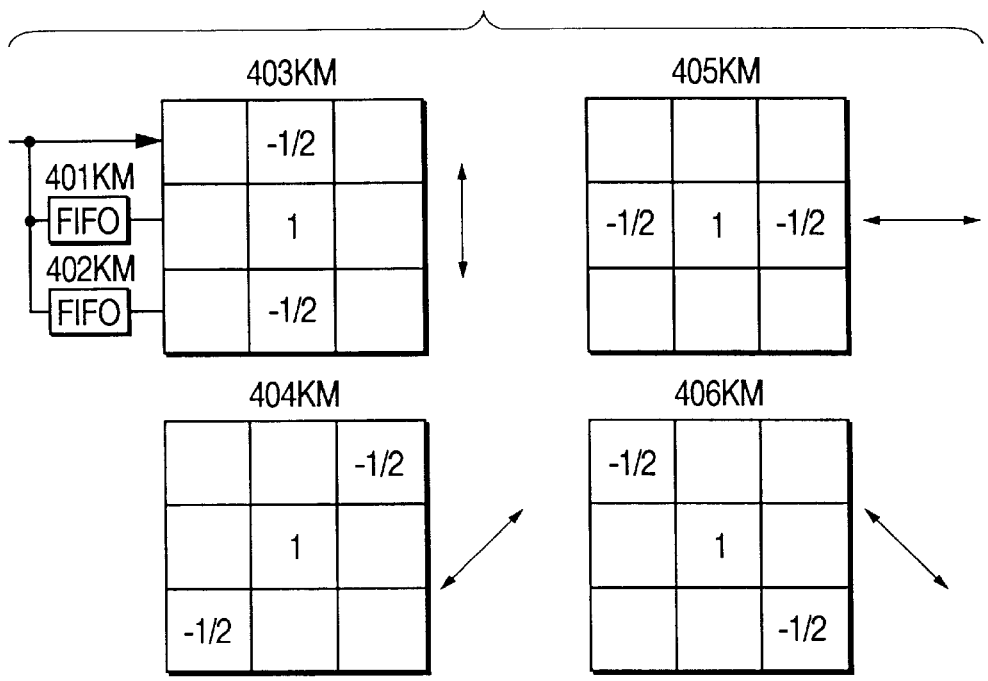
FIG. 27
FIG. 28A
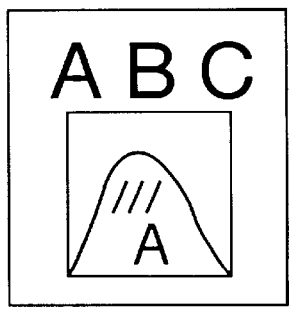
FIG. 28B
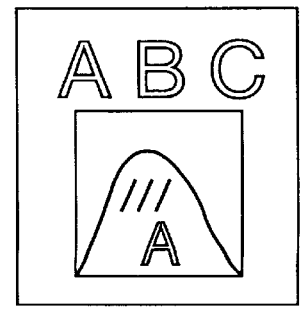

FIG. 34A

| X | H | X |
|---|---|---|
| X | X | X |
| X | L | X |

SET BIT0 OF DIRAMI "HIGH"

FIG. 34B

| X | X | X |
|---|---|---|
| L | X | H |
| X | X | X |

SET BIT1 OF DIRAMI "HIGH"

FIG. 34C

| X | H | X |
|---|---|---|
| X | X | X |
| X | L | X |

SET BIT2 OF DIRAMI "HIGH"

FIG. 34D

| X | L | X |
|---|---|---|
| X | X | X |
| X | H | X |

SET BIT3 OF DIRAMI "HIGH"
BUT DO NOT CARE FOR "X"

FIG. 35

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

VALUES OF DIRAMI OF PERIPHERAL PIXELS OF TARGET PIXEL

| 0 | 1 | 2 | 3 | 4 | 5 | 6 | CODE |
|---|---|---|---|---|---|---|------|
| H | H | H | H | H | H | H | 7 |
| H | H | H | H | H | H | L | 6 |
| H | H | H | H | H | L | L | 5 |
| H | H | H | H | L | L | L | 4 |
| H | H | H | L | L | L | L | 3 |
| H | H | L | L | L | L | L | 2 |
| H | L | L | L | L | L | L | 1 |
| L | L | L | L | L | L | L | 0 |

FIG. 43A

| INPUT | | | | OUTPUT | | |
|---|---|---|---|---|---|---|
| col | zone | edge | FCH | ucr | filter | sen |
| 1 (BLACK) | 0 | INSIDE | DON'T CARE | 3 | 0 | 0 |
| | | 1×1 | DON'T CARE | 0 | 1 | 1 |
| | | 3×3 | DON'T CARE | 0 | 1 | 1 |
| | | 5×5 | DON'T CARE | 0 | 1 | 1 |
| | | 7×7 | DON'T CARE | 0 | 1 | 1 |
| | 1 | INSIDE | DON'T CARE | 3 | 0 | 0 |
| | | 1×1 | DON'T CARE | 1 | 1 | 1 |
| | | 3×3 | DON'T CARE | 1 | 1 | 1 |
| | | 5×5 | DON'T CARE | 1 | 1 | 1 |
| | | 7×7 | DON'T CARE | 3 | 0 | 0 |
| | 2 | INSIDE | DON'T CARE | 4 | 0 | 0 |
| | | 1×1 | DON'T CARE | 2 | 1 | 1 |
| | | 3×3 | DON'T CARE | 2 | 1 | 1 |
| | | 5×5 | DON'T CARE | 2 | 0 | 0 |
| | | 7×7 | DON'T CARE | 4 | 0 | 0 |
| | 3 | INSIDE | DON'T CARE | 5 | 0 | 0 |
| | | 1×1 | DON'T CARE | 3 | 1 | 0 |
| | | 3×3 | DON'T CARE | 3 | 1 | 0 |
| | | 5×5 | DON'T CARE | 5 | 0 | 0 |
| | | 7×7 | DON'T CARE | 5 | 0 | 0 |
| | 4 | INSIDE | DON'T CARE | 6 | 0 | 0 |
| | | 1×1 | DON'T CARE | 4 | 2 | 0 |
| | | 3×3 | DON'T CARE | 4 | 2 | 0 |
| | | 5×5 | DON'T CARE | 6 | 0 | 0 |
| | | 7×7 | DON'T CARE | 6 | 0 | 0 |
| | 5 | INSIDE | DON'T CARE | 7 | 0 | 0 |
| | | 1×1 | DON'T CARE | 5 | 2 | 0 |
| | | 3×3 | DON'T CARE | 5 | 2 | 0 |
| | | 5×5 | DON'T CARE | 7 | 0 | 0 |
| | | 7×7 | DON'T CARE | 7 | 0 | 0 |
| | 6 | INSIDE | DON'T CARE | 7 | 0 | 0 |
| | | 1×1 | DON'T CARE | 6 | 2 | 0 |
| | | 3×3 | DON'T CARE | 7 | 0 | 0 |
| | | 5×5 | DON'T CARE | 7 | 0 | 0 |
| | | 7×7 | DON'T CARE | 7 | 0 | 0 |
| | 7 | INSIDE | 1 | 7 | 3 | 0 |
| | | 1×1 | 1 | 7 | 3 | 0 |
| | | 3×3 | 1 | 7 | 3 | 0 |
| | | 5×5 | 1 | 7 | 3 | 0 |
| | | 7×7 | 1 | 7 | 3 | 0 |
| | | INSIDE | 0 | 7 | 3 | 0 |
| | | 1×1 | 0 | 3 | 0 | 0 |
| | | 3×3 | 0 | 7 | 3 | 0 |
| | | 5×5 | 0 | 7 | 3 | 0 |
| | | 7×7 | 0 | 7 | 3 | 0 |

| FIG. 43A |
|---|
| FIG. 43B | sen
- 0 200 LINES
- 1 400 LINES filter
- 0 SMOOTHING
- 1 STRONG EDGE EMPHASIZING
- 2 MEDIUM EDGE EMPHASIZING
- 3 WEAK EDGE EMPHASIZING ucr
- 0 BLACK LARGER
- 1 ·
- 2 ·
- 3 ·
- 4 ·
- 5 ·
- 6 ·
- 7 BLACK FEWER

FCH
- 0 EDGE OF IMAGE
- 1 NO EDGE OF IMAGE

FIG. 43B

FROM FIG. 43A

| 0 (OTHER THAN BLACK) | 0 | INSIDE | DON'T CARE | 7 | 0 | 0 |
|---|---|---|---|---|---|---|
| | | 1×1 | DON'T CARE | 7 | 1 | 1 |
| | | 3×3 | DON'T CARE | 7 | 1 | 1 |
| | | 5×5 | DON'T CARE | 7 | 1 | 1 |
| | | 7×7 | DON'T CARE | 7 | 1 | 1 |
| | 1 | INSIDE | DON'T CARE | 7 | 0 | 0 |
| | | 1×1 | DON'T CARE | 7 | 1 | 1 |
| | | 3×3 | DON'T CARE | 7 | 1 | 1 |
| | | 5×5 | DON'T CARE | 7 | 1 | 1 |
| | | 7×7 | DON'T CARE | 7 | 0 | 0 |
| | 2 | INSIDE | DON'T CARE | 7 | 0 | 0 |
| | | 1×1 | DON'T CARE | 7 | 1 | 1 |
| | | 3×3 | DON'T CARE | 7 | 1 | 1 |
| | | 5×5 | DON'T CARE | 7 | 0 | 0 |
| | | 7×7 | DON'T CARE | 7 | 0 | 0 |
| | 3 | INSIDE | DON'T CARE | 7 | 0 | 0 |
| | | 1×1 | DON'T CARE | 7 | 1 | 0 |
| | | 3×3 | DON'T CARE | 7 | 1 | 0 |
| | | 5×5 | DON'T CARE | 7 | 0 | 0 |
| | | 7×7 | DON'T CARE | 7 | 0 | 0 |
| | 4 | INSIDE | DON'T CARE | 7 | 0 | 0 |
| | | 1×1 | DON'T CARE | 7 | 2 | 0 |
| | | 3×3 | DON'T CARE | 7 | 2 | 0 |
| | | 5×5 | DON'T CARE | 7 | 0 | 0 |
| | | 7×7 | DON'T CARE | 7 | 0 | 0 |
| | 5 | INSIDE | DON'T CARE | 7 | 0 | 0 |
| | | 1×1 | DON'T CARE | 7 | 2 | 0 |
| | | 3×3 | DON'T CARE | 7 | 2 | 0 |
| | | 5×5 | DON'T CARE | 7 | 0 | 0 |
| | | 7×7 | DON'T CARE | 7 | 0 | 0 |
| | 6 | INSIDE | DON'T CARE | 7 | 0 | 0 |
| | | 1×1 | DON'T CARE | 7 | 2 | 0 |
| | | 3×3 | DON'T CARE | 7 | 0 | 0 |
| | | 5×5 | DON'T CARE | 7 | 0 | 0 |
| | | 7×7 | DON'T CARE | 7 | 0 | 0 |
| | 7 | INSIDE | DON'T CARE | 7 | 0 | 0 |
| | | 1×1 | DON'T CARE | 7 | 3 | 0 |
| | | 3×3 | DON'T CARE | 7 | 0 | 0 |
| | | 5×5 | DON'T CARE | 7 | 0 | 0 |
| | | 7×7 | DON'T CARE | 7 | 0 | 0 |

FIG. 44

$$K1 = -255 \times \log\left(\frac{\text{Min CMY}}{255}\right)\left(\frac{1}{1.52}\right) \quad \cdots (2101)$$

$$\begin{pmatrix} C2 \\ M2 \\ Y2 \\ K2 \end{pmatrix} = \begin{pmatrix} m11 \times k11 & m21 \times k21 & m31 \times k31 & m41 \times k41 & m51 \times k51 & m61 \times k61 & m71 \times k71 & m81 \times k81 \\ m12 \times k12 & m22 \times k22 & m32 \times k32 & m42 \times k42 & m52 \times k52 & m62 \times k62 & m72 \times k72 & m82 \times k82 \\ m13 \times k13 & m23 \times k23 & m33 \times k33 & m43 \times k43 & m53 \times k53 & m63 \times k63 & m73 \times k73 & m83 \times k83 \\ m14 \times k14 & m24 \times k24 & m34 \times k34 & m44 \times k44 & m54 \times k54 & m64 \times k64 & m74 \times k74 & m84 \times k84 \end{pmatrix} \begin{pmatrix} C1 \\ M1 \\ Y1 \\ K1 \\ C1M1 \\ M1Y1 \\ Y1C1 \\ K1K1 \end{pmatrix} \quad \cdots (2102)$$

IMAGE PROCESSING APPARATUS AND METHOD AND STORING MEDIUM

BACKGROUND OF THE INVENTION

1. Field of the Invention

The present invention relates to an image processing apparatus, an image processing method and an image processing system, and more particularly to, e.g., an image processing apparatus, an image processing method and an image processing system which perform preview display of an output image.

2. Related Background Art

In recent years, since image quality and function of a digital color copy machine have been improved, a copy machine having a higher-performance image edit function has been widely used such that an operator can obtain a desired output image. In the copy machine having such image edit function, the operator is required to confirm an edited result of an image on which an edit process has been performed, by actually outputting such image onto a recording medium.

However, according to such method, it is necessary to output the image onto the recording medium many times to obtain the desired output image, whereby wasteful time and cost are unnecessarily required.

For this reason, instead of actually outputting the image onto the recording medium many times to confirm the edited image, a copy machine having a so-called preview function is developed and actually manufactured a product at present. In the preview function, the edited image is displayed on a provided display unit such as a CRT or the like, whereby the operator confirms the displayed image.

In the conventional copy machine having the preview function, an original image read by a scanner or the like was displayed and confirmed by using a monochromatic liquid crystal display. However, if the copy machine itself is a color copy machine, since it is necessary to confirm a tint of the output image, the display unit for performing preview displaying is desired to be able to also perform full-color display.

However, in the conventional copy machine having the preview function to perform full-color display, since R (red), G (green) and B (blue) image data obtained by the scanner are subjected to a color process for previewing or a color process for copying, it is necessary to provide the color process for the previewing such that the color process for the previewing corresponds to the color process for the copying. Therefore, there has been a problem that the size of the copy machine becomes larger.

SUMMARY OF THE INVENTION

The present invention has been made in consideration of the above conventional problems. An object of the present invention is to eliminate a large-size image processing apparatus by using a color process ordinarily used in case of performing image forming and also in case of performing preview displaying. Another object of the present invention is to be able to perform preview display in which a setting color process mode has been reflected, by performing a preview process corresponding to a first color process mode irrespective of a color control signal.

In order to achieve the above objects, the present invention is featured by providing an image processing apparatus comprising:

a judgment means for judging a characteristic of image data, and outputting a color process control signal to control by which one of a plurality of color process modes including the first color process mode a color process on the image data is performed;

a color process means for performing the color process on the image data in the color process mode corresponding to the color process control signal;

an output means for outputting the color-processed image data to an image formation means; and a preview process means for performing the preview process on the color-processed image data, wherein the preview process means performs the preview process corresponding to the first color process mode irrespective of the color process control signal.

The above and other objects, features, and advantages of the present invention will be apparent from the detailed description and the appended claims in conjunction with the accompanying drawings.

BRIEF DESCRIPTION OF THE DRAWINGS

FIG. 27 is a view showing a state of line delaying by FIFO (first-in first-out) memories and a Laplacian filter;

FIGS. 28A and 28B are views showing an example of edge detecting;

FIGS. 34A, 34B, 34C and 34D are views showing a rule of edge direction detecting in an edge direction detection circuit;

FIG. 35 is a view showing a rule in opposed edge detecting;

FIG. 43, which is composed of FIGS. 43A and 43B, is a view showing contents of input/output correspondence in a LUT 117KM; and FIG. 44 is a view showing a masking UCR (under color removal) operation equation.

DETAILED DESCRIPTION OF THE PREFERRED EMBODIMENTS

Figure 1:
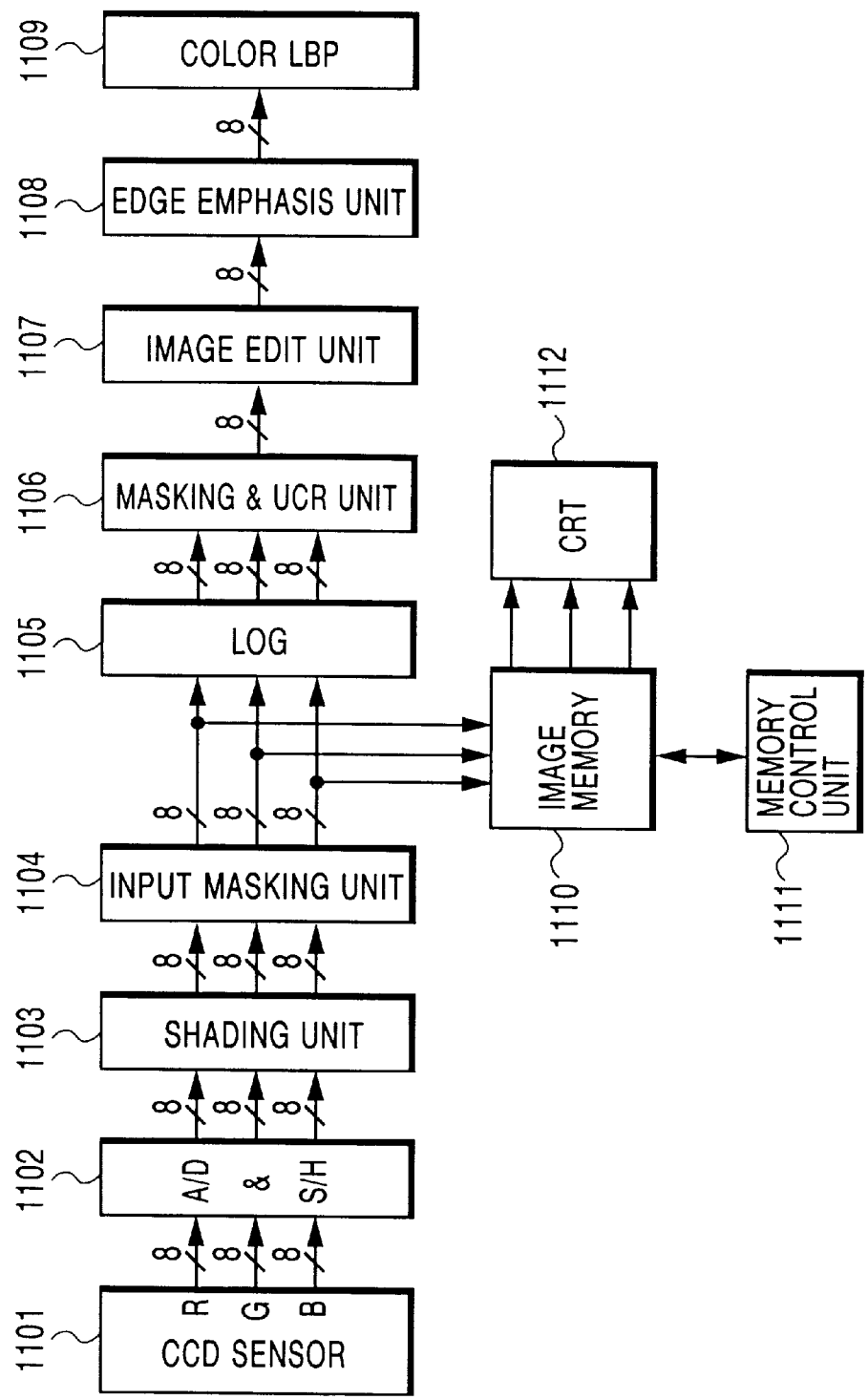
FIG. 1 is a block diagram showing an example of an image processing apparatus having a preview function.

FIG. 1 is a block diagram showing an example of the structure of an image processing apparatus having a full-color preview function. In FIG. 1, blocks 1101 to 1109 constitute a full-color copy process unit, and blocks 1110 to 1112 constitute a full-color preview process unit.

In FIG. 1, reference numeral 1101 denotes a CCD sensor which reads a reflected document through an optical system (not shown) to output RGB signals; 1102 denotes an analog-to-digital conversion and sample-and-hold unit (to be referred as A/D and S/H unit hereinafter) which performs sampling/holding and A/D converting on the RGB signals to obtain digital signals; 1103 denotes a shading correction unit which performs shading correcting; 1104 denotes an input masking unit which performs an input masking process on the RGB signals to obtain a converted NTSC (National Television System Committee) standard color space; 1105 denotes a LOG (logarithmic) conversion unit which performs LOG converting to obtain CMY signals; 1106 denotes a masking and UCR (under color removal) unit which performs correcting according to a printer characteristic; 1107 denotes an image edit unit which performs an image edit process such as trimming or the like; and 1108 denotes an edge emphasis unit which performs edge emphasizing. The masking and UCR unit 1106 performs outputting by a predetermined bit (eight bits) width for each color (Y (yellow), M (magenta), C (cyan) and K (black)) every time the CCD sensor 1101 performs the one-time scanning.

Reference numeral 1109 denotes a printer unit such as a color LBP (laser beam printer) or the like. The printer unit 1109 serially inputs a reflected original image of each color scanned by the CCD sensor 1101 three or four times, and finally outputs a full-color image.

In FIG. 1, reference numeral 1110 denotes an image memory which stores the RGB image signals outputted from the input masking unit 1104, and 1111 denotes a memory control unit which controls the image memory 1110. The memory control unit 1111 includes an address counter and a CPU (central processing unit), and controls the image memory 1110 by controlling an address of the image memory 1110 with the CPU. Further, reference numeral 1112 denotes a CRT (cathode-ray tube) which performs full-color displaying of image information stored in the image memory 1110.

In a preview system having the structure shown in FIG. 1, merely the original image read by the CCD sensor 1101 is displayed in full colors on the CRT 1112. That is, even if an operator sets a desired edit process from a console unit (not shown), such the edit process is not reflected in the image displayed on the CRT 1112, i.e., the image information stored in the image memory 1110. Therefore, it is structured such that the image information stored in the image memory 1110 can be arbitrarily accessed by a CPU (not shown) provided in the memory control unit 1111. Then, an edit process equivalent to that performed by the image edit unit 1107 is realized by such software with such the CPU and displayed on the CRT 1112, whereby the operator can confirm a final image outputted to the color LBP 1109 on the CRT 1112.

In such structure, it attaches importance only to displaying of the image on the CRT 1112, but any method for deleting the displayed image is not considered. That is, the identical image continues to be displayed on the CRT 1112 until a power switch of the image processing apparatus is turned off or a next preview operation starts. In this case, if the operator intends to delete the image displayed on the CRT 1112 according to his convenience after copying terminated, a problem occurs such that the displayed image can not be easily deleted. Further, in the case where the identical image is continued to be displayed on the CRT 1112, burning on the CRT 1112 occurs, whereby there is some fear that a characteristic such as color reproducibility or the like deteriorates on the CRT 1112.

Hereinafter, the image processing apparatus according to the embodiment of the present invention will be explained in detail with reference to the accompanying drawings.

Figure 2:
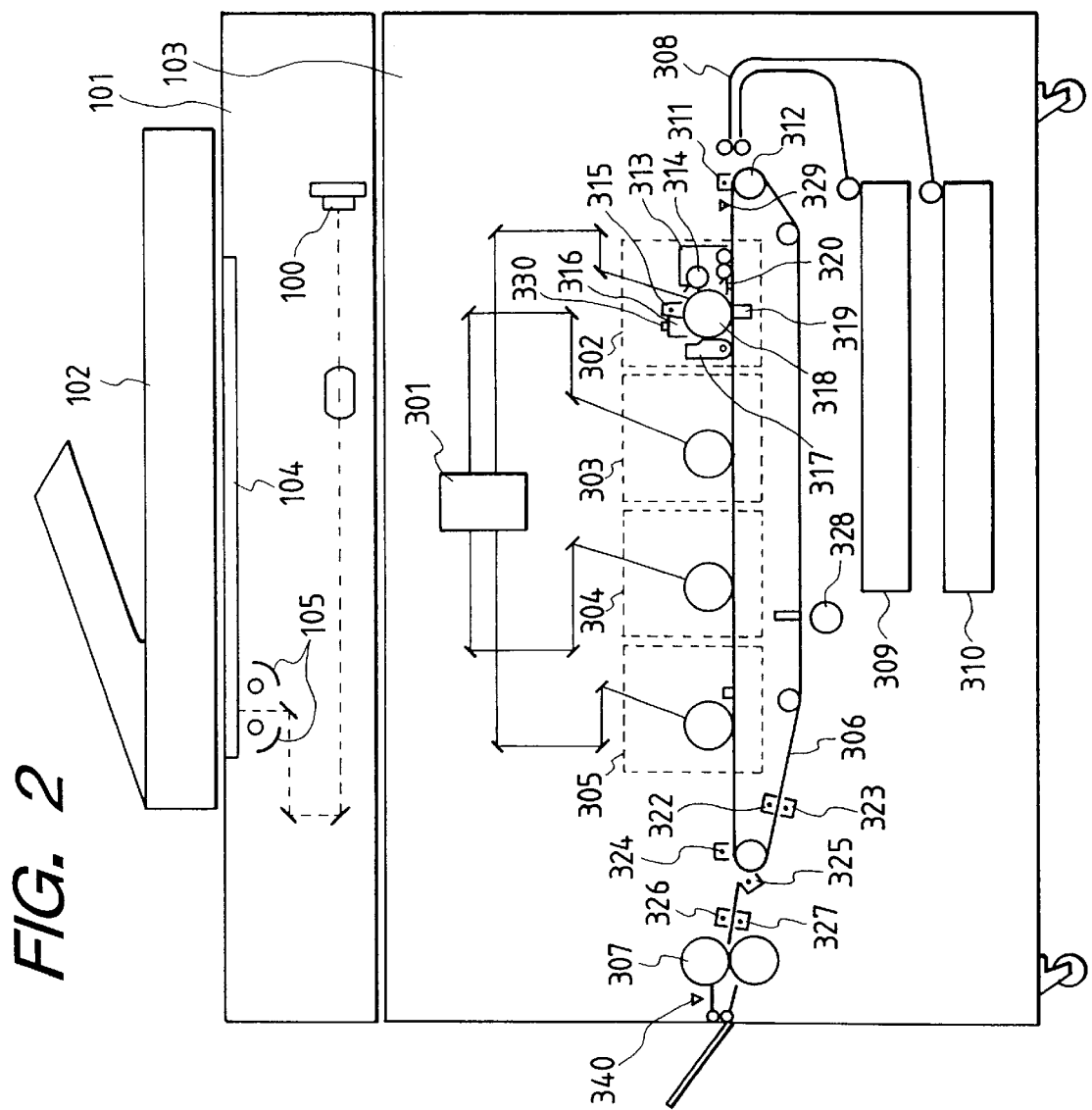
FIG. 2 is a perspective view showing an example of the structure of an image processing apparatus according to an embodiment of the present invention.

FIG. 2 is a perspective view showing a digital color copy machine which constitutes the image processing apparatus according to the embodiment of the present invention and is roughly divided into two components. Reference numeral 101 denotes a reader unit which reads a color original image and further performs a digital edit process or the like. Reference numeral 103 denotes a printer unit which has an image support body different for each color and reproduces a color image in accordance with a digital image signal for each color sent from the reader unit 101. An original feeder 102 which is mounted on the reader unit 101 is a known optional equipment for automatically feeding an original to an original read area in the reader unit 101.

Although FIG. 2 does not show, a preview monitor such as a CRT, an LCD (liquid crystal display), an FLCD (ferroelectric liquid crystal display) or the like is connected to the copy machine through a predetermined interface such as a VGA (video graphics array) interface, an NTSC interface or the like.

(Structure of Printer Unit)

Figure 3:
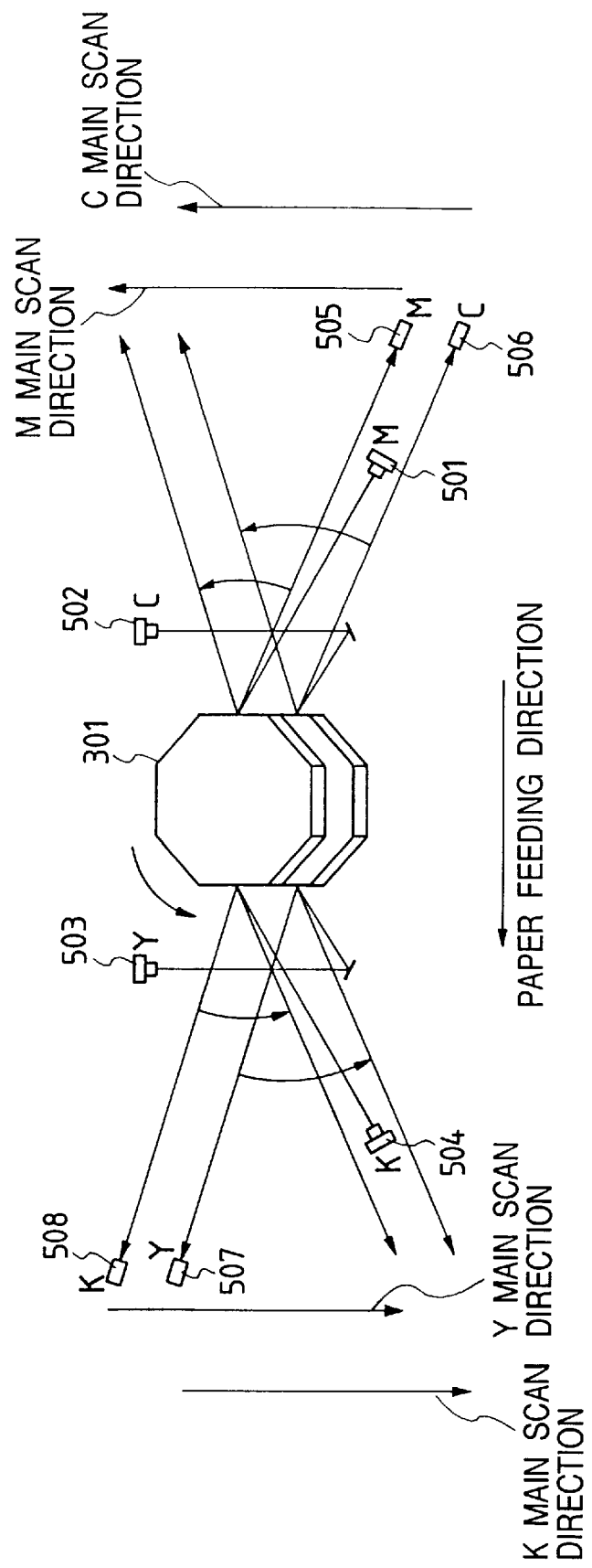
FIG. 3 is a view for explaining a scanning method of a laser beam.

In FIG. 2, reference numeral 301 denotes a polygon scanner which scans with a laser beam outputted from a laser control unit (not shown) to expose predetermined positions on photosensitive drums of image formation units 302 to 305 (described later). As shown in FIG. 3, the polygon scanner 301 scans the photosensitive drum of the image formation unit corresponding to each color with the laser beam generated by M, C, Y and K laser elements 501 to 504 which are independently driven by the laser control unit. Reference numerals 505 to 508 denote M, C, Y and K beam detection sensors (to be referred as BD sensors hereinafter) each of which detects the scanned laser beam to output a signal BD for generating a main-scanning sync signal. In a case where two polygon mirrors are arranged along one axis and driven by a single motor, e.g., the main scanning direction of the M and C laser beams are opposite to those of the Y and K laser beams. Therefore, the image data of Y, K images are ordinarily managed such that Y, K images become mirror images on M, C images in the main-scanning direction.

Reference numerals 302, 303, 304 and 305 respectively denote the M, C, Y and K image formation units each of which forms the image of the corresponding color. Since the structure of the image formation units 302 to 305 are substantially identical, the details of the M image formation unit 302 will be explained hereinafter and thus an explanation of the other image formation units is omitted.

In the M image formation unit 302, reference numeral 318 denotes a photosensitive drum. A latent image is formed on a surface of the drum 302 by the laser beam from the polygon scanner 301. Reference numeral 315 denotes a primary charger which charges the surface of the drum 302 up to a predetermined potential to prepare the latent image forming. Reference numeral 313 denotes a development unit which develops the latent image on the drum 318 to form a toner image. The development unit 313 includes a sleeve 314 which applies development bias to perform the developing. Reference numeral 319 denotes a transfer charger which performs discharging at a rear side of a transfer belt 306 to transfer the toner image on the photosensitive drum 318 to a recording paper or the like on the transfer belt 306. After the transferring, the surface of the photosensitive drum 318 is cleaned by a cleaner 317 and discharged by a subsidiary charger 316. Further, a residual charge on the surface is eliminated by a pre-exposure lamp 330, whereby the primary charger 315 can perform satisfactory charging.

Subsequently, a procedure to form the image on the recording paper or the like will be explained hereinafter.

Reference numeral 308 denotes a paper feed unit which feeds or supplies the recording paper or the like stored in cassettes 309 and 310 to the transfer belt 306. The recording paper fed from the paper feed unit 308 is charged by an adsorption charger 311. Reference numeral 312 denotes a transfer belt roller which drives the transfer belt 306. A pair of the adsorption charger 311 and the transfer belt roller 312 charges the recording paper such that the paper adheres to the transfer belt 306. Reference numeral 329 denotes a paper leading edge sensor which senses a leading edge of the recording paper on the transfer belt 306. A detection signal generated by the paper leading edge sensor 329 is transferred from the printer unit 103 to the reader unit 101, to be used as a sub-scanning sync signal in a case of transferring a video signal from the reader unit 101 to the printer unit 103.

Then, the recording paper or the like is carried by the transfer belt 306, and the toner images are formed on the surface thereof in the order of M, C, Y and K respectively by the image formation units 302 to 305. The recording paper passed through the K image formation unit 305 is discharged by a static eliminator discharger 324 such that the paper can be easily separated or peeled from the transfer belt 306. Then, the paper is separated from the belt 306. Reference numeral 325 denotes a separation charger to prevent image confusion which occurs due to separation discharging when the recording paper is separated from the transfer belt 306. The separated recording paper is charged by pre-fixing chargers 326 and 327 to compensate for the toner adsorption and thus prevent the image confusion. Then, after the toner image is fixed by heat in a fixing unit 307, the paper is discharged or ejected. Reference numeral 340 denotes a paper discharge sensor which senses the discharging of the paper.

(Structure of Reader Unit)

Figure 4A:
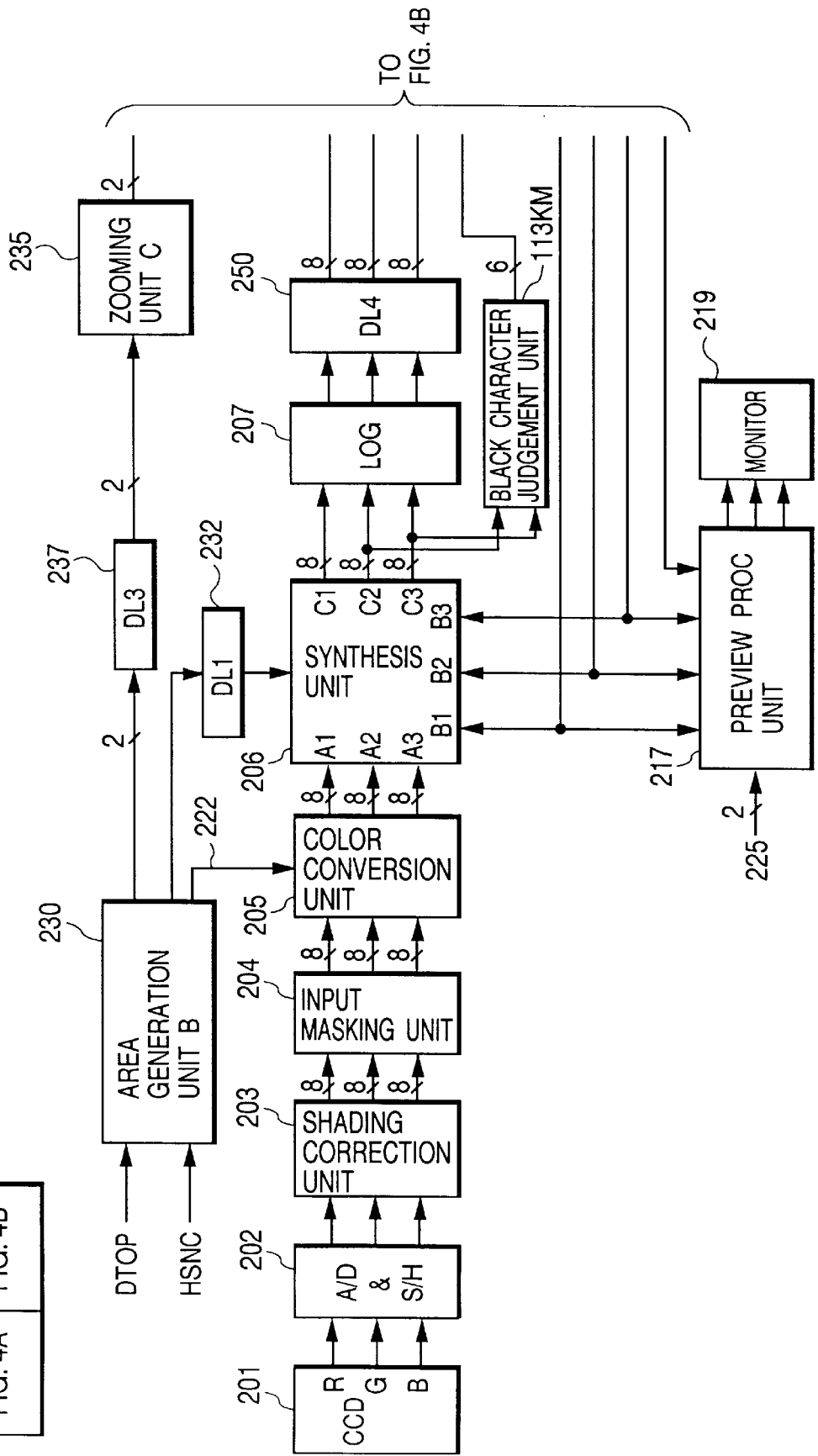
FIG. 4, which is composed of FIGS. 4A and 4B, is a block diagram showing an example of the structure of a digital image process unit in a reader unit.

FIGS. 4A and 4B are block diagrams showing an example of the structure of a digital image process unit provided in the reader unit 101.

In FIGS. 4A and 4B, reference numeral 240 denotes a CPU (central processing unit) which controls a ROM (read-only memory) 241 and a RAM (random access memory) 242 through a CPU bus 243. Similarly, data setting is performed to each image processing unit through the CPU bus 243. The ROM 241 has stored various kinds of control programs including a program shown in a later-described flow chart. These programs are read into the RAM 242 and executed by the CPU 240, so that each structure is controlled and thus a copy operation and a preview operation are realized. The RAM 242 is used as a working area of the CPU 240. A console unit 500 is composed of a display unit such as a LCD or the like on which an operating state and an operating condition of the apparatus are displayed by the CPU 240, a keyboard and a touch panel for inputting operator's instructions, and the like.

Light generated from halogen lamps 105 is reflected on the color original placed on an original mounting board glass 104, and the reflected light is introduced into a three-line sensor 100 to be converted into an electrical signal. Then, the electrical signal (i.e., analog image signal) outputted from a CCD 201 of the three-line sensor 100 is sampled, held and A/D converted by an analog-to-digital conversion and sampling-and-holding unit 202 (to be referred as A/D and S/H unit 202 hereinafter), and then converted into digital signals each having, e.g., eight bits for each of R (red), G (green) and B (blue). The R, G and B signals are shading and black corrected by a shading correction unit 203, and then converted into NTSC signals by an input masking unit 204. Subsequently, a predetermined color conversion process is performed on the NTSC signals by a color conversion unit 205. The details of the color conversion process in the color conversion unit 205 will be explained later.

Reference numeral 206 denotes a synthesis unit which synthesizes, e.g., image data inputted from the color conversion unit 205 and output data stored in an image memory 208, and inputs a synthesized result into a logarithmic converter (to be referred as LOG hereinafter) 207 and a black character detection unit 113KM (described later). C (cyan), M (magenta) and Y (yellow) image data outputted from the LOG 207 are subjected to phase adjusting or matching with a black character judgment signal by a delay unit 4 (to be referred as DL4 hereinafter) 250. Further, in a case where zooming has been set by the console unit 500, a zooming process is performed by a zooming unit B 234 (in this case a black character signal is similarly subjected to the zooming process). In the zooming unit B 234, since a compression process performed by the image memory unit 208 at a later stage acts as low pass filtering process, practically an enlargement process is performed. Of course, in a case where the zooming is not set, the image signals passes through the zooming unit B 234. Then, the outputs (C, M and Y eight-bit image signals and six-bit black character judgment signal) from the zooming unit B 234 are inputted into the image memory unit 208.

On the video signal, the image memory unit 208 is roughly divided into three units, i.e., a compression unit, an image memory and an expansion unit. The image memory unit 208 outputs the four groups of C, M and Y data which respectively represent different positions of the same image corresponding to displacement in the image forming by the four image formation units 302 to 305. The compression and expansion processes in the image memory unit 208 will be explained hereinafter.

The C, M and Y image signals each having eight bits and inputted from the zooming unit B 234 are converted into L*a*b* signals and encoded in unit of 4×4 pixel block. As an encoding method at this time, a non-reversible encoding such as vector quantizing, compressing in a so-called JPEG (joint photographic expert group) system, or the like is used.

Code data obtained by the compression unit is stored in the image memory having at least a capacity corresponding to one page of the original. The code data stored in the image memory is time-divisionally read for C, M, Y and K in accordance with a later-described signal 211, and then processed by the expansion unit in procedure reverse to that in case of the encoding, to generate the C, M and Y signals each having eight bits (i.e., total 24 bits). Subsequently, the C, M and Y signals are supplied to a masking and UCR (under color removal) unit 212.

On the other hand, the black character judgment signal is composed of a delay portion for compressing, and a delay portion for expanding of non-compression memory four planes (32 Mbits×6×4). The black character judgment signal is supplied to the masking and UCR unit 212 by six bits for each color.

The masking and UCR unit 212 (to be described later in detail) to which the four-group data, i.e., the C, M and Y data and the black character judgment data outputted from the image memory unit 208 are inputted generates the C, M, Y and K data suitable for an image characteristic and a printer characteristic. The image memory unit 208 and the masking and UCR unit 212 include four reading-out systems corresponding to the C, M, Y and K colors, so as to generate the C, M, Y and K data corresponding to the displacements in image forming by the four image formation units 302 to 305.

The C, M and Y data outputted from the image memory unit 208 are subjected to an UCR and masking process by the masking and UCR unit 212. In such the process, the black (K) data is generated based on the black character judgment data, and further the C, M, Y and K data are converted into color data suitable for the printer characteristic. Then, the obtained color data are subjected to a free color process and a paint process by an edit circuit 213, and subjected to gamma correcting according to the printer characteristic by a gamma correction unit 214. The C, M, Y and K data obtained after the gamma correcting are subjected to a zooming process (practically reduction process) by a zooming unit A 211. Then, after four kinds of edge emphasizing based on the two-bit black character judgment signal are performed on the image data by an edge emphasis unit 215, the image data are transferred to a color LBP (laser beam printer) 216 (i.e., printer unit 103 in FIG. 2), whereby the recording image is formed. In this case, a line number signal (i.e., high-resolution process signal/high-gradation process signal) is also transferred to the color LBP 216 in synchronism with the final image signal.

Reference numeral 217 denotes a preview process unit which is composed of a display image memory for storing the edited image data and a memory control unit for controlling the display image memory. Reference numeral 219 denotes a monitor on which the data of the display image memory is displayed. The details of the preview process unit 217 and the monitor 219 will be explained later.

Reference numeral 220 denotes an area generation unit A which generates a main-scanning sync signal HSNC and other signals for the preview displaying, on the basis of BD, DTOP and ITOP signals generated inside of the color LBP 216. In case of printer outputting, a sub-scanning enable signal in synchronism with each drum is generated based on the ITOP signal.

The signal 221 which is used to control the image memory unit 208 includes a write enable signal having two bits (i.e., one bit for main scanning and one bit for sub scanning) and a read enable signal having five bits (i.e., one bit for main scanning and four bits for sub scanning), i.e., total seven bits.

In order to adjust timing of the image signal and an area signal in synchronism with the ITOP signal, a signal 238 is generated in consideration of delaying each of the compression and expansion units in the image memory unit 208. The signal 238 is composed of the write enable signal having two bits (i.e., one for main scanning and one for sub scanning) and the read enable signal having five bits (i.e., one for main scanning and four for sub scanning), i.e., total seven bits, for controlling the memory in each of the color conversion unit 205, the synthesis unit 206, the edit circuit 213 and the masking and UCR unit 212.

A signal 225 is the enable signal having two bits (i.e., one for main scanning and one for sub scanning) for controlling the image memory in the preview process unit 217.

Reference numeral 230 denotes an area generation unit B which generates the area signal for each edit process in the edit circuit 213. The area generation unit B 230 is composed of a bit map memory (to be later described in detail) for storing each area signal and a bit map memory control unit (e.g., AGDC (advanced display controller) or the like) for controlling the bit map memory. Data writing into the bit map is performed by the CPU 240, and data reading from the bit map is performed in synchronism with the DTOP and HSNC signals, i.e., in synchronism with the optically scanned original image data. The outputs from the area generation unit B 230 act as the enable signal for the color converting in the color conversion unit 205, the enable signal for the image synthesizing in the synthesis unit 206 and the enable signal for the free color or paint process in the image edit unit 213, respectively.

An area memory unit 231, a delay unit (to be referred as DL1 hereinafter) 232, a delay unit (to be referred as DL2 hereinafter) 233, a zooming unit C 235, and a delay unit (to be referred as DL3 hereinafter) 237 are circuits which perform timing adjustment to synchronize the image signal and the area signal with each other. Concrete operations of these circuits will be explained hereinafter.

The DL1 232 delays the area signal sent from the area generation unit B 230 to the synthesis unit 206 by the delaying of the color conversion process in the color conversion unit 205, and outputs the delayed signal to the synthesis unit 206. It should be noted that the pixel delaying is performed by a DF/F (delay flip flop) and the line delaying is performed by an FIFO memory.

The DL2 233 delays the area signals outputted from the area memory unit 231 by the delaying of the masking and UCR process in the masking and UCR unit 212, and outputs the delayed signals to the image edit circuit 213 as enable signals 2241 and 2242. It should be noted that the pixel delaying is performed by the DF/F and the line delaying is performed by the FIFO memory.

The DL3 237 delays the signal from the area generation unit B 230 by the total delaying of the processes in the color conversion unit 205, the synthesis unit 206, the LOG conversion unit 207 and the DL4 250, and outputs the delayed signal to the zooming unit C 235. It should be noted that the pixel delaying is performed by the DF/F and the line delaying is performed by the FIFO memory.

The zooming unit C 235 is controlled in the same manner as in the zooming unit B 234 (delaying number is also the same). Concretely, the expansion process is performed.

Figure 5:
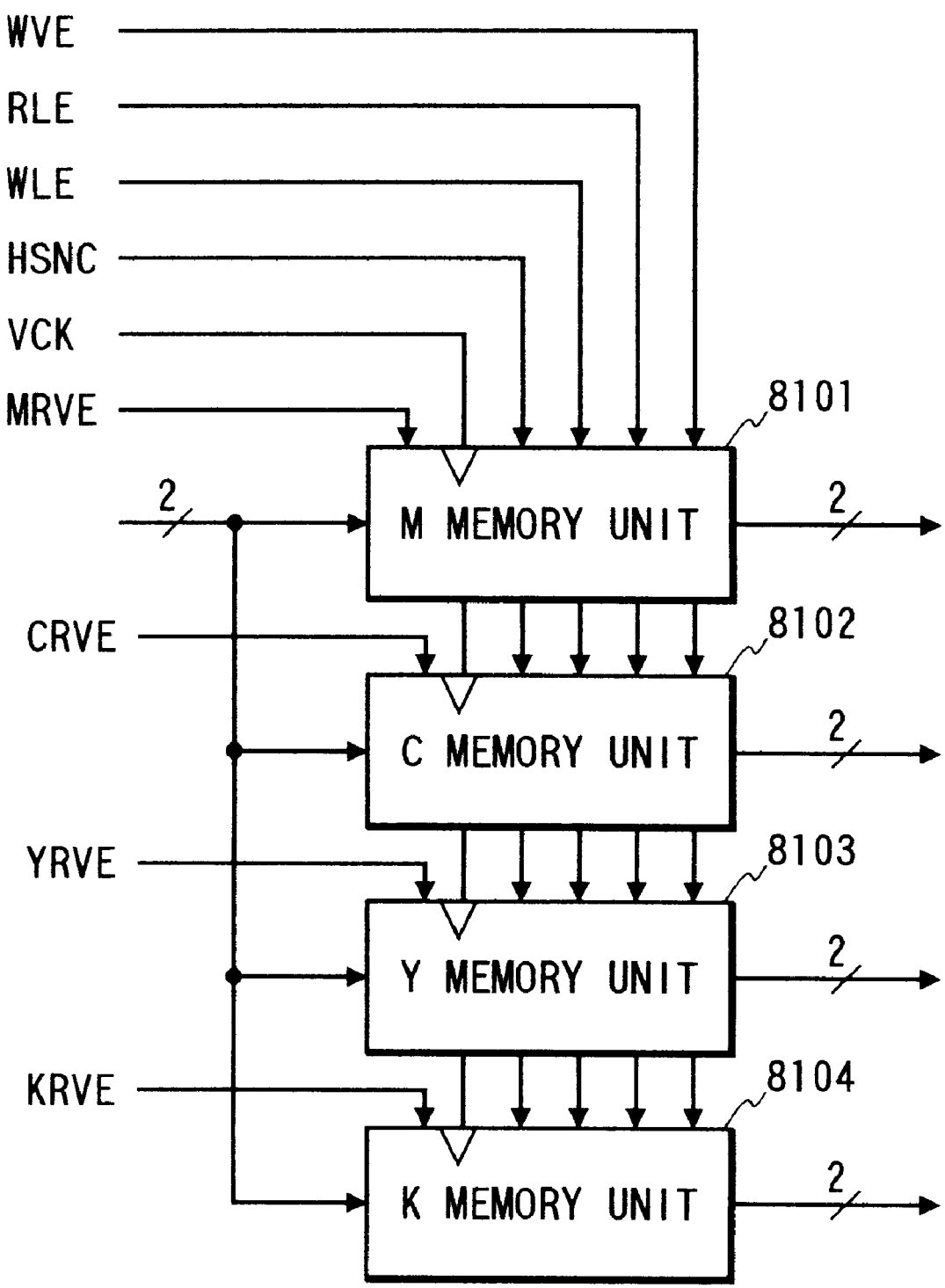
FIG. 5 is a block diagram showing the detailed structure of an area memory unit.

The area memory unit 231 is the circuit for adjusting the delaying as to the image memory unit 208. FIG. 5 shows the detailed structure of the area memory unit 231. As shown in FIG. 5, the area memory unit 231 is composed of four memory units 8101, 8102, 8103 and 8104 respectively corresponding to the M, C, Y and K colors. These memory units have the same structure other than the sub-scanning read enable signals 238 respectively corresponding to the M, C, Y and K image formation units 302 to 305.

The main-scanning sync signal HSNC and an image clock VCK are inputted into each memory unit. Also, as common control signals, a main-scanning write enable signal WLE, a main-scanning read enable signal RLE and a sub-scanning write enable signal WVE are inputted into each memory unit from the signal 238 outputted by the area generation unit A 220. Further, a magenta sub-scanning read enable signal MRVE is inputted into the M memory unit 8101, a cyan sub-scanning read enable signal CRVE is inputted into the C memory unit 8102, an yellow sub-scanning read enable signal YRVE is inputted into the Y memory unit 8103, and a black sub-scanning read enable signal KRVE is inputted into the K memory unit 8104. Then, the two-bit area signal inputted from the zooming unit C 235 is written into and read from each memory.

Figure 6:
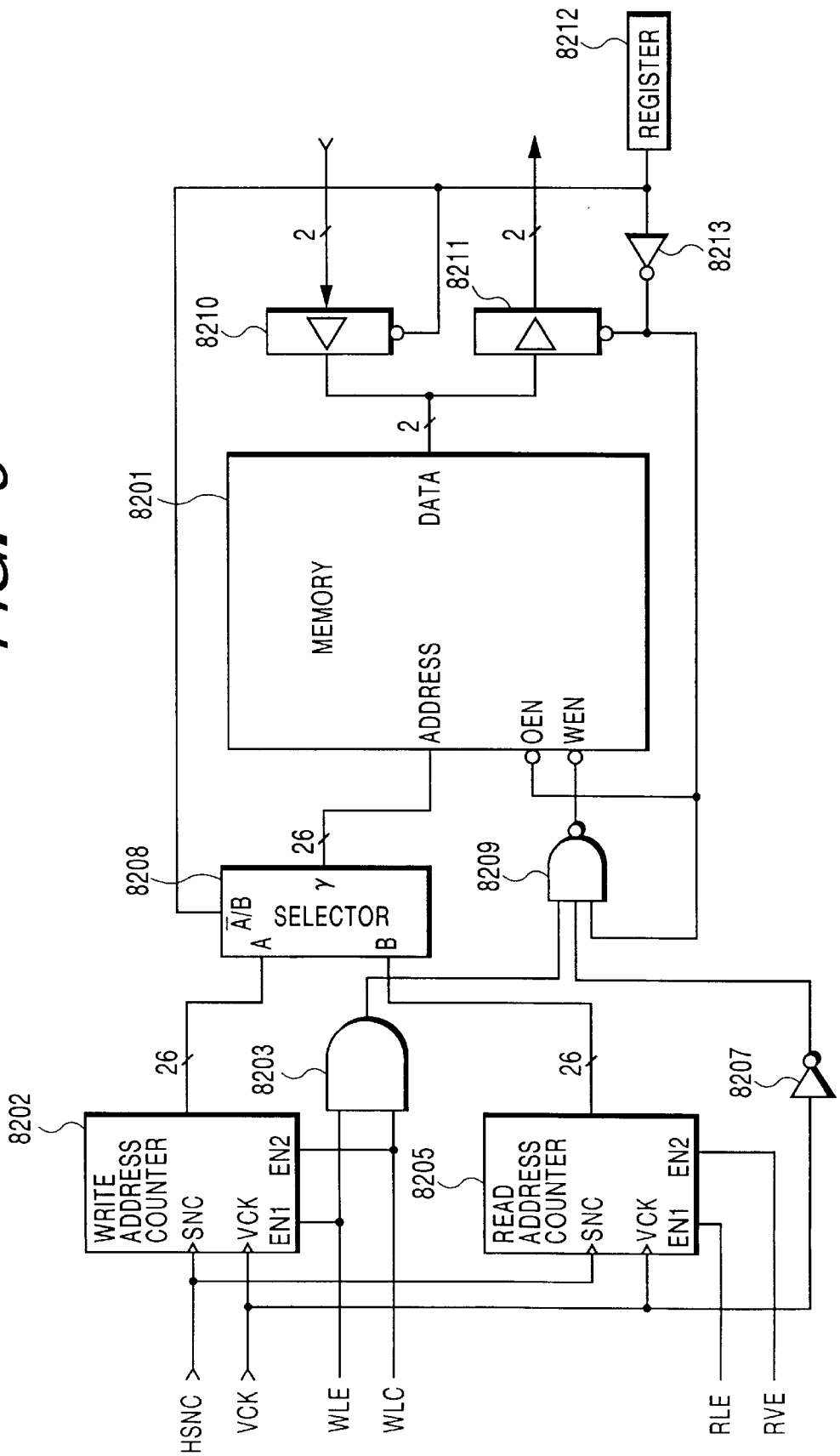
FIG. 6 is a block diagram showing the detailed structure of a one-color memory unit in the area memory unit.

Further, FIG. 6 shows the detailed structure of the M memory unit 8101. In FIG. 6, the M memory unit 8101 is composed of a memory 8201, a write address counter 8202, a read address counter 8205, an AND gate 8203, a NAND gate 8209, inverters 8207 and 8213, a selector 8208, buffers 8210 and 8211, and a register 8212 designated by the CPU 240 shown in FIG. 4. The write address counter 8202 is composed of a main-scanning counter which is reset when the signal WLE rises and performs counting when enabling, and a sub-scanning counter which is reset when the signal WVE rises and performs counting when enabling. The read address counter 8205 is composed of a main-scanning counter which is reset when the signal RLE rises and performs counting when enabling, and a sub-scanning counter which is reset when a signal RVE rises and performs counting when enabling.

In the M memory unit 8101, when writing of the memory 8201, the register 8212 becomes "0", the address of the memory 8201 is selected by the write address counter 8202, the buffer 8210 becomes enabled, the buffer 8211 becomes disabled, a terminal OEN becomes "1", and a terminal WEN becomes "0" when the clock trails or falls, whereby the data in the buffer 8210 is written or stored into the memory 8201.

On the other hand, when reading of the memory 8201, the register 8212 becomes "1", the address of the memory 8201 is selected by the read address counter 8205, the buffer 8210 becomes disabled, the buffer 8211 becomes enabled, the terminal OEN becomes "0", and the terminal WEN becomes "1", whereby the data in the memory 8201 is read through the buffer 8211.

As above, in each two-bit area signal which was read from each color memory, its 0-th bit is inputted into the DL2 233 and its first bit is inputted into the DL2 233 and the masking and UCR unit 212.

According to such the structure as explained above, the area signals of which timing is different from others can be synchronized with the image signal, i.e., such area signals can be managed as one plane.

Although any drawing does not show, in the present embodiment, the image data from an external computer or the like can be inputted to the color conversion unit 205 or the image memory unit 208 through a predetermined interface. Such the image data can be managed in the same manner as to the image data obtained by reading the original.

Figure 24:
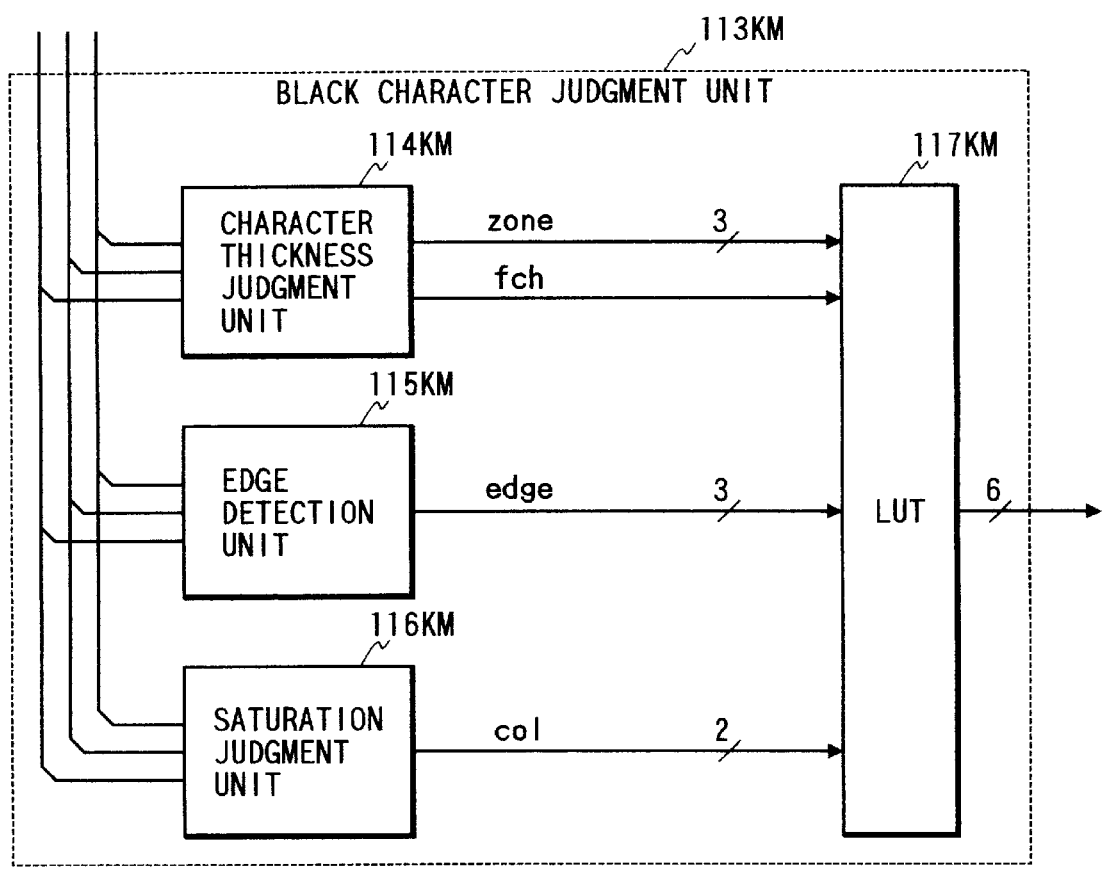
FIG. 24 is a block diagram showing the structure of a black character judgment unit.

Subsequently, the structure of the black character judgment unit 113KM will be explained with reference to FIG. 24.

The black character judgment unit 113KM is composed of a character thickness judgment unit 114KM, an edge detection unit 115KM, a saturation judgment unit 116KM and a LUT (look-up table) 117.

<edge detection unit 115KM>

Figure 25:
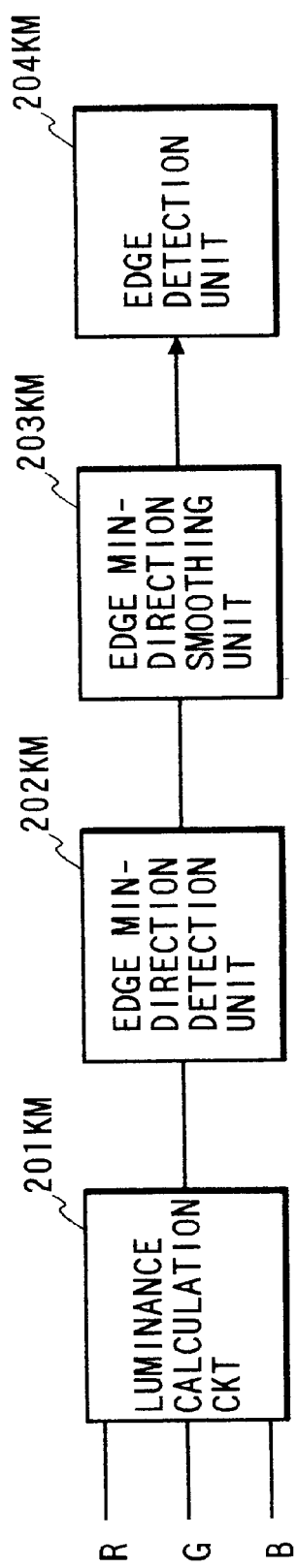
FIG. 25 is a block diagram showing the structure of an edge detection unit.

R (red), G (green) and B (blue) image data outputted from the synthesis unit 206 are inputted into the edge detection unit 115KM, and a luminance signal Y is calculated according to a following equation (1). (luminance calculation circuit 201KM shown in FIG. 25)

$$Y = 0.25R + 0.5G + 0.25B \tag{1}$$

Figure 26:
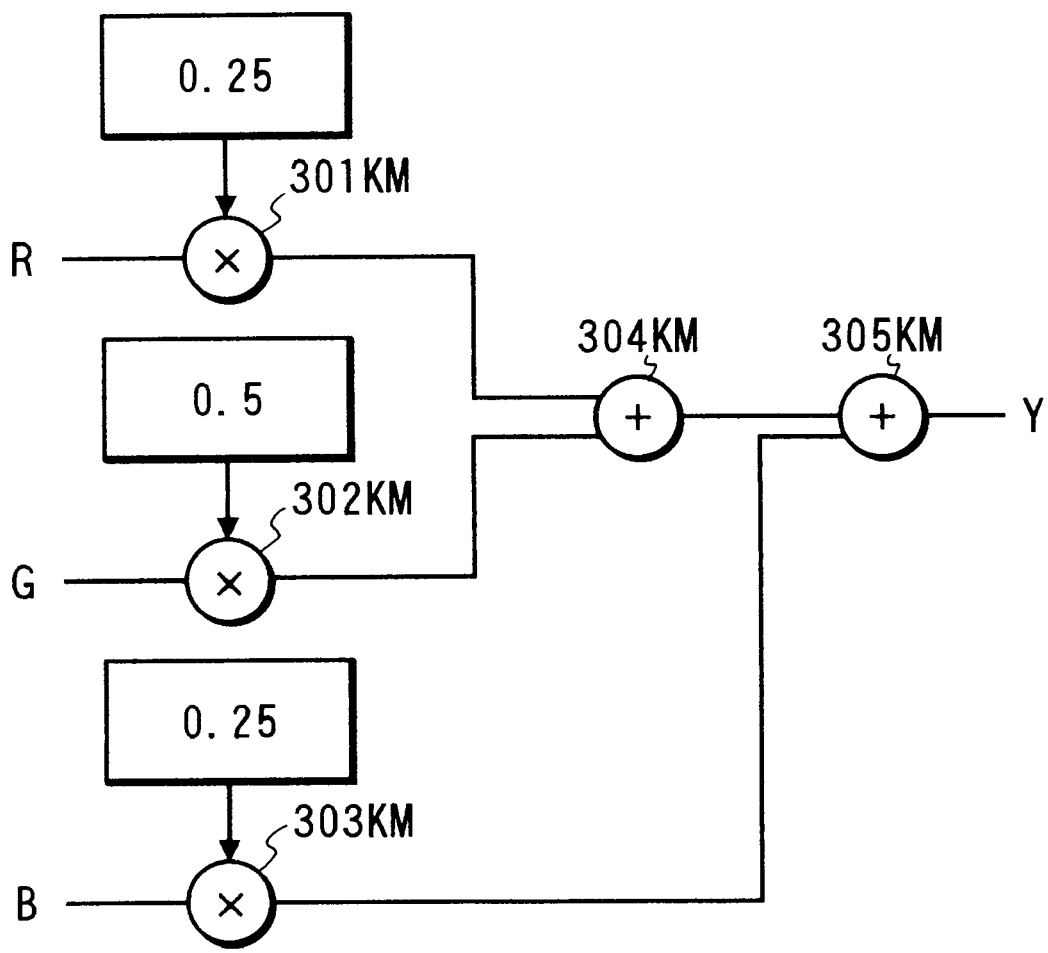
FIG. 26 is a block diagram showing the structure of a luminance calculation circuit.

FIG. 26 is a view showing the detailed structure of the luminance calculation circuit 201KM. In FIG. 26, multipliers 301KM and 303KM multiply the color components of the R, G and B image data by coefficients 0.25, 0.5 and 0.25, respectively. Then, the obtained data are added by adders 304KM and 305KM, whereby the luminance signal Y according to the equation (1) is calculated.

The luminance signal Y is expanded by FIFO memories 401KM and 402KM to correspond to three lines each delayed by one line, and then processed by known Laplacean filters 403KM to 406KM to obtain one of four directions in which an absolute value a of an edge amount, i.e., a filter output value, has a minimum value. The obtained direction is considered as an edge minimum direction (edge minimum direction detection unit 202KM).

Subsequently, an edge minimum direction smoothing unit 203KM performs a smoothing process in the edge minimum direction obtained by the edge minimum direction detection unit 202KM. By such process, only the direction of which edge component is largest can be stored, and the other directions can be smoothed. That is, in a dot component having the large edge components in the plurality of directions, such edge component is smoothed and thus its characteristic is reduced. On the other hand, in character/fine line, its characteristic is stored. By repeating such process according to necessity, a line component and the dot component can be more effectively separated, so that a character component which exists in the dots and could not be detected in a conventional edge detection method can be effectively detected. Then, the Laplacean filter eliminates the edge of which amount is equal to and smaller than the absolute value a, whereby the edge of which amount is larger than the value a is outputted as "1" (edge detection unit 204KM). FIG. 28A shows an example of the image data in the luminance data Y, and FIG. 28B shows the edge detection signal. Further, the signal obtained by expanding the judgment signal in 7×7, 5×5 and 3×3 block sizes and the signal represented by five codes of no expansion and no edge constitute an output signal "edge" (three bits) from the edge detection unit 115KM. In this case, the signal expanding represents the operation that the signal values of all the pixels within the block are OR calculated.

<saturation judgment unit 116KM>

Figure 29:
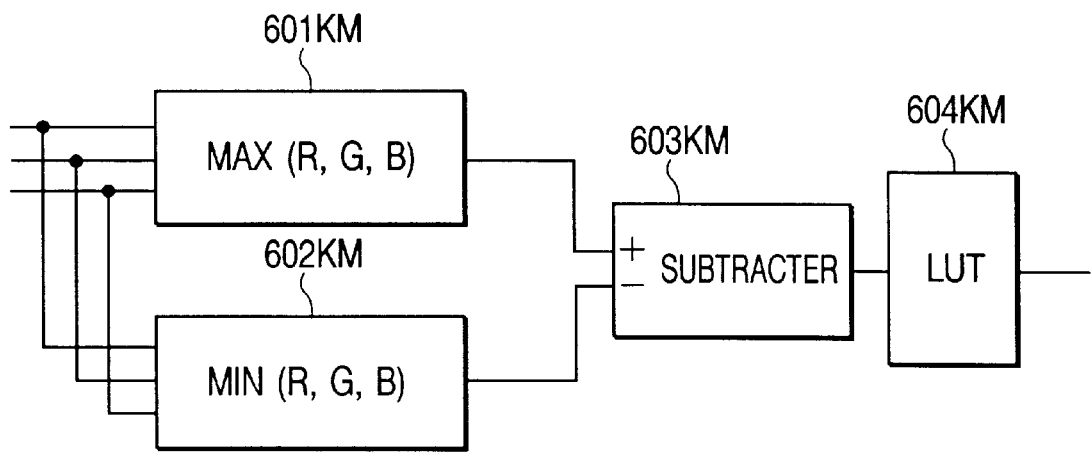
FIG. 29 is a block diagram showing the structure of a saturation judgment circuit.
Figure 30:
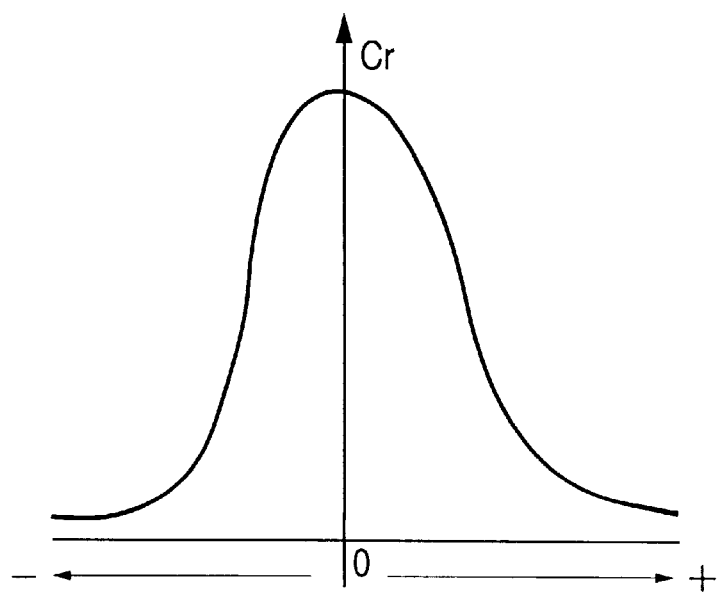
FIG. 30 is a view showing a conversion characteristic used in a LUT (look-up table) 604KM.

FIG. 29 is a view showing the detailed structure of the saturation judgment unit 116KM. A maximum value max (R,G,B) and a minimum value min(R,G,B) of the R, G and B image data outputted from the synthesis unit 206 are extracted by a maximum value detection unit 601KM and a minimum value detection unit 602KM, respectively, and a subtracter 603KM calculates a difference ΔC between these values. Then, in a next LUT 604KM, the data converting is performed according to a characteristic shown in FIG. 30, to generate a saturation signal Cr. FIG. 30 shows that as the difference ΔC becomes closer to "0", saturation becomes lower (i.e., closer to an achromatic color), and as the difference ΔC becomes larger, and the degree of a chromatic color becomes intense. Thus, according to such characteristic of FIG. 30, as the degree of the achromatic color becomes intense, the saturation signal Cr comes to have the larger value, and as the degree of the chromatic color becomes intense, the signal Cr becomes closer to "0". Further, FIG. 30 shows that the degree of changing accords to such drawing. In an output signal "col" in FIG. 24, the color, the black, the intermediate (i.e., intermediate color between the color and the black) and the white are respectively expressed by two bits codes.

<character thickness judgment unit 114KM>

Figure 31:
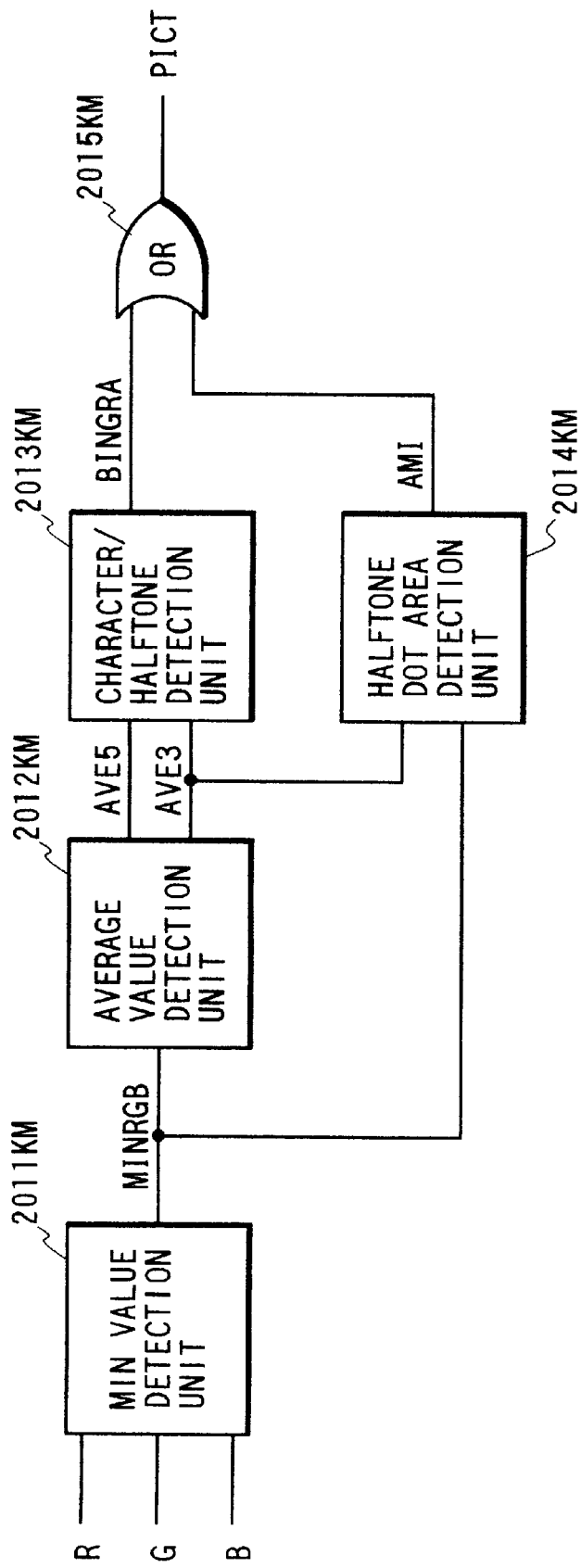
FIG. 31 is a block diagram showing the structure of a character thickness judgment circuit.

FIG. 31 is a view for explaining the character thickness judgment unit 114KM. Initially, the R, G and B image data outputted from the synthesis unit 206 are inputted into a minimum value detection unit 2011KM to obtain a minimum value MINRGB of the inputted R, G and B image data. Then, an average value detection unit 2012KM obtains an average value AVE5 of the value MINRGB of 5×5 pixels in the vicinity of a target pixel (or remarked pixel), and an average value AVE3 of the value MINRGB of a vicinal area of 3×3 pixels.

Subsequently, the values AVE5 and AVE3 are inputted into a character/halftone (area) detection unit 2013KM. In the character/halftone (area) detection unit 2013KM, a density of the target pixel and a changing amount of an average density of the target pixel and its vicinal area are detected for each pixel, whereby it is judged whether or not the target pixel is a part of a character area or a halftone area.

Figure 32:
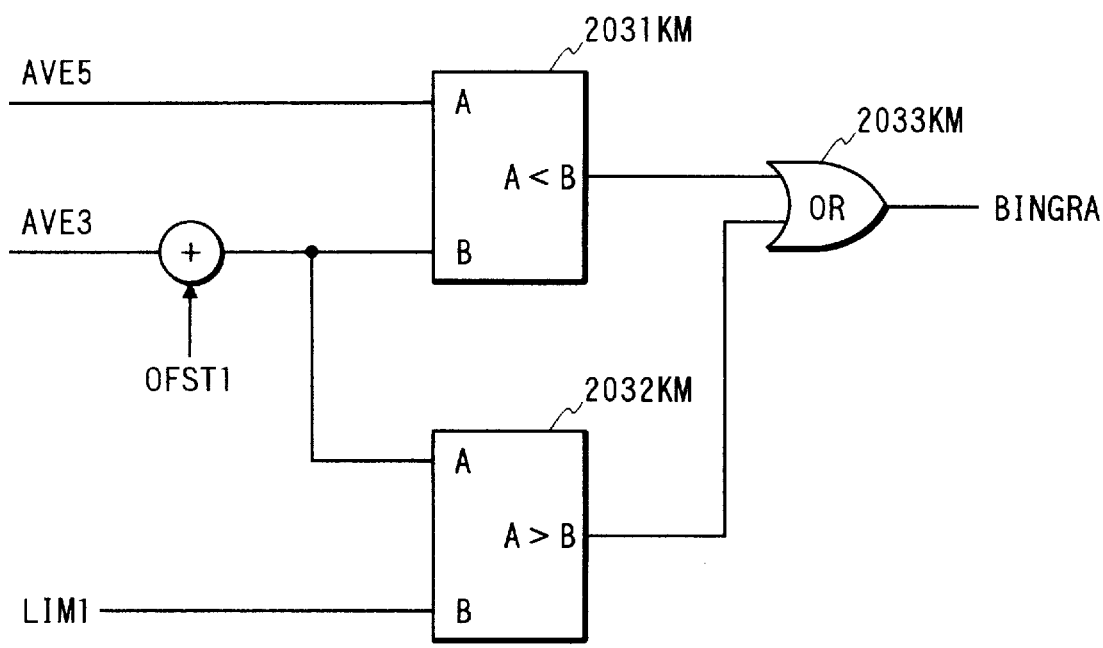
FIG. 32 is a block diagram showing the structure of a character/halftone detection circuit.

FIG. 32 shows the character/halftone (area) detection unit 2013KM. In the unit 2013KM, an appropriate offset value OFST1 is added to the value AVE3, and the obtained value is compared with the value AVE5 by a comparator 2013KM. Also, such obtained value is compared with an appropriate limit value LIM1 by a comparator 2032KM. Output values from the comparators 2031KM and 2032KM are inputted into an OR circuit 2033KM. Then, in case of (AVE3+OFST1>AVE5) or (AVE3+OFST1>LIM1), an output signal (i.e., character/halftone area signal) BINGRA becomes high. That is, by this unit 2013KM, in a case where there is density changing in the vicinity of the target pixel (edge portion in character), or in a case where the vicinal area of the target pixel has the density equal to or larger than a predetermined value (inside portion of character and halftone portion), the character/halftone area signal BINGRA becomes high.

Figure 33:
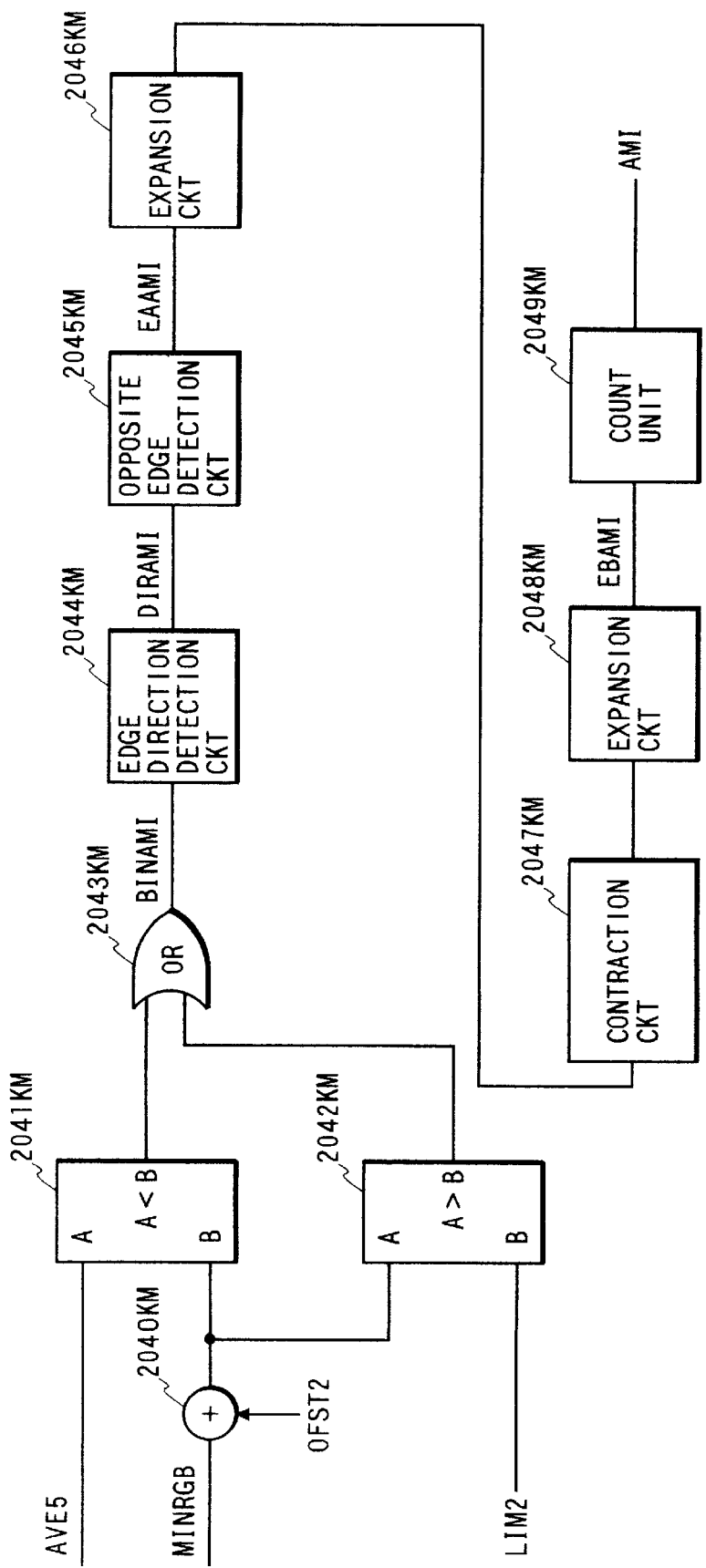
FIG. 33 is a block diagram showing the structure of a dot area detection unit.
Figure 36F:
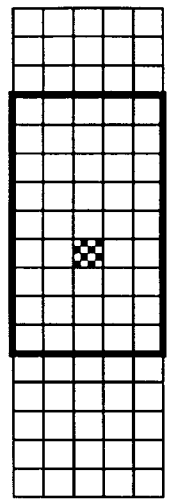
FIGS. 36A, 36B, 36C, 36D, 36E, 36F, 36G, 36H and 36I are views showing shapes of windows in a count unit.
Figure 36G:
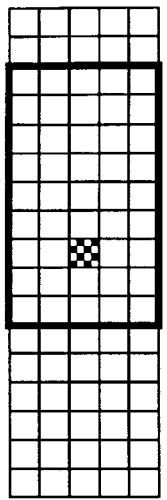
Figure 36H:
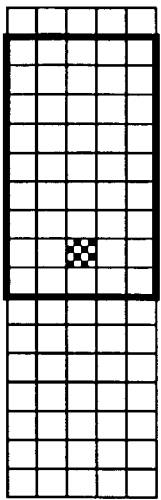
Figure 36I:
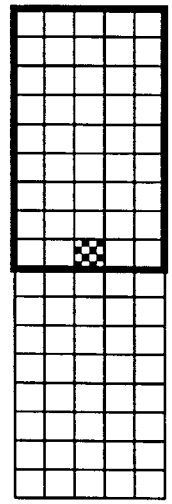
Figure 36A:
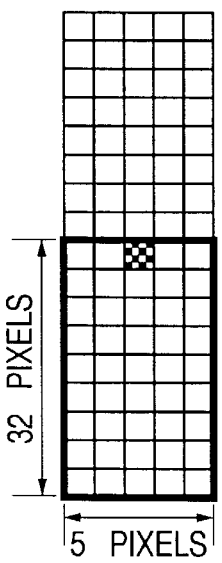
Figure 36B:
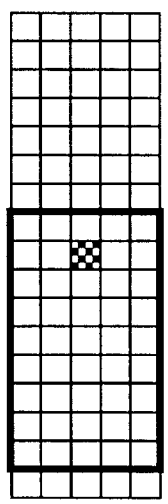
Figure 36C:
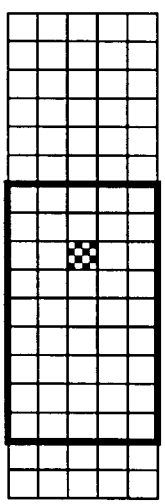
Figure 36D:
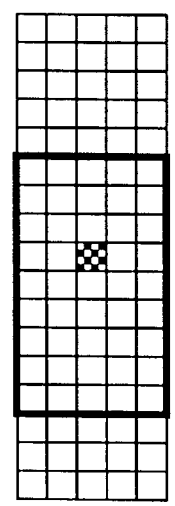
Figure 36E:
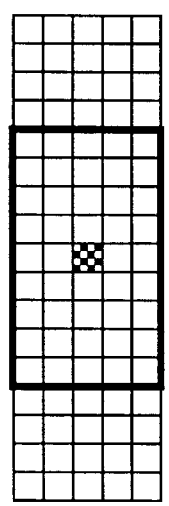

Subsequently, a dot (or halftone dot) area is detected by a dot area detection unit 2014KM. FIG. 33 shows the dot area detection unit 2014KM. Initially, an appropriate offset value OFST2 is added to the minimum value MINRGB detected by the minimum value detection unit 2011KM, and the obtained value is compared with the value AVE5 by a comparator 2041KM. Also, the value MINRGB is compared with an appropriate limit value LIM2 by a comparator 2042KM. Output values from the comparators 2041KM and 2042KM are inputted into an OR circuit 2043KM. Then, in case of (MINRGB+OFST2>AVE5) or (MINRGB+OFST2>LIM2), an output signal RINAMI becomes high. Then, by using the signal BINAMI, an edge direction detection circuit 2044KM obtains an edge direction of each pixel. FIGS. 34A to 34D show a rule for detecting an edge direction in the edge direction detection circuit 2044KM. In a case where the eight pixels in the vicinity of the target pixel satisfy one of conditions shown in FIGS. 34A to 34D, one of bits 0 to 3 in an edge direction signal DIRAMI becomes high, respectively.

Then, in an opposite edge detection circuit 2045KM, the edges which are opposite to each other are detected within an area of 5×5 pixels surrounding the target pixel. In a coordinate system which is shown in FIG. 35 and includes the edge direction signal DIRAMI of the target pixel as A33, the rule for detecting the opposite edge is as follows.

(1) The bit 0 of either one of A11, A21, A31, A41, A51, A22, A32, A42 and A33 is high, and the bit 1 of either one of A33, A24, A34, A44, A15, A25, A35, A45 and A55 is high.

(2) The bit 1 of either one of A11, A21, A31, A41, A51, A22, A32, A42 and A33 is high, and the bit 0 of either one of A33, A24, A34, A44, A15, A25, A35, A45 and A55 is high.

(3) The bit 2 of either one of A11, A12, A13, A14, A15, A22, A23, A24 and A33 is high, and the bit 3 of either one of A33, A42, A43, A44, A51, A52, A53, A54 and A55 is high.

(4) The bit 3 of either one of A11, A12, A13, A14, A15, A22, A23, A24 and A33 is high, and the bit 2 of either one of A33, A42, A43, A44, A51, A52, A53, A54 and A55 is high.

When either one of the above conditions (1) to (4) is satisfied, an opposite edge signal EAAMI is set to be high.

That is, in the case where the opposite edges are detected in the opposite edge detection circuit 2045KM, the opposite edge signal EAAMI becomes high.

Subsequently, an expansion circuit 2046KM expands the signal EAAMI by 3×4 pixels. Then, if the pixel in which the signal EAAMI is high exists in the 3×4 pixels in the vicinity of the target pixel, the expansion circuit 2046KM replaces the signal EAAMI in the target pixel by high-level one. Further, a contraction circuit 2047KM and an expansion circuit 2048KM eliminate a detection result which is isolated in the 5×5 pixel area, to obtain an output signal EBAMI. In this case, the contraction circuit is a circuit which outputs a high-level signal only in a case where all of input signals are high-level signals.

Subsequently, a count unit 2049KM counts the number of the pixels in which the output signal EBAMI of the expansion circuit 2048KM is high, within a window having appropriate size. In the present embodiment, the count unit 2049KM refers to the area of the 5×64 pixels including the target pixel. Shapes of the windows are illustrated in FIGS. 36A to 36I. In FIGS. 36A to 36I, sampling points within the window are a total of 45 points, i.e., nine points very four pixels in the main-scanning direction and there are five lines each including such nine points in the sub-scanning direction. Since this window is moved in the main-scanning direction on one target pixel, it can be considered that the nine kinds of windows are prepared as shown in FIGS. 36A to 36I. That is, it can be considered that the count unit 2049KM referred to the area of the 5×64 pixels including the target pixel as the center. In each window, the output signals EBAMI are counted. If the number of the signals EBAMI of which level are high exceeds a predetermined threshold value, a dot area signal AMI which is outputted from the dot area detection unit 2014KM is set to be high.

By such processing of the dot area detection unit 2014KM, the dot image which was detected as a set or collection of the isolated points by the signal BINGRA can be detected as the area signal.

Subsequently, the character/halftone area signal BINGRA and the dot area signal AMI which were detected in the above processing are OR calculated by an OR circuit 2015KM, whereby a binarization signal PICT of the input image is generated.

Then, the signal PICT is inputted into an area size judgment unit 2016KM to judge an area size of the binarization signal.

Figure 37:
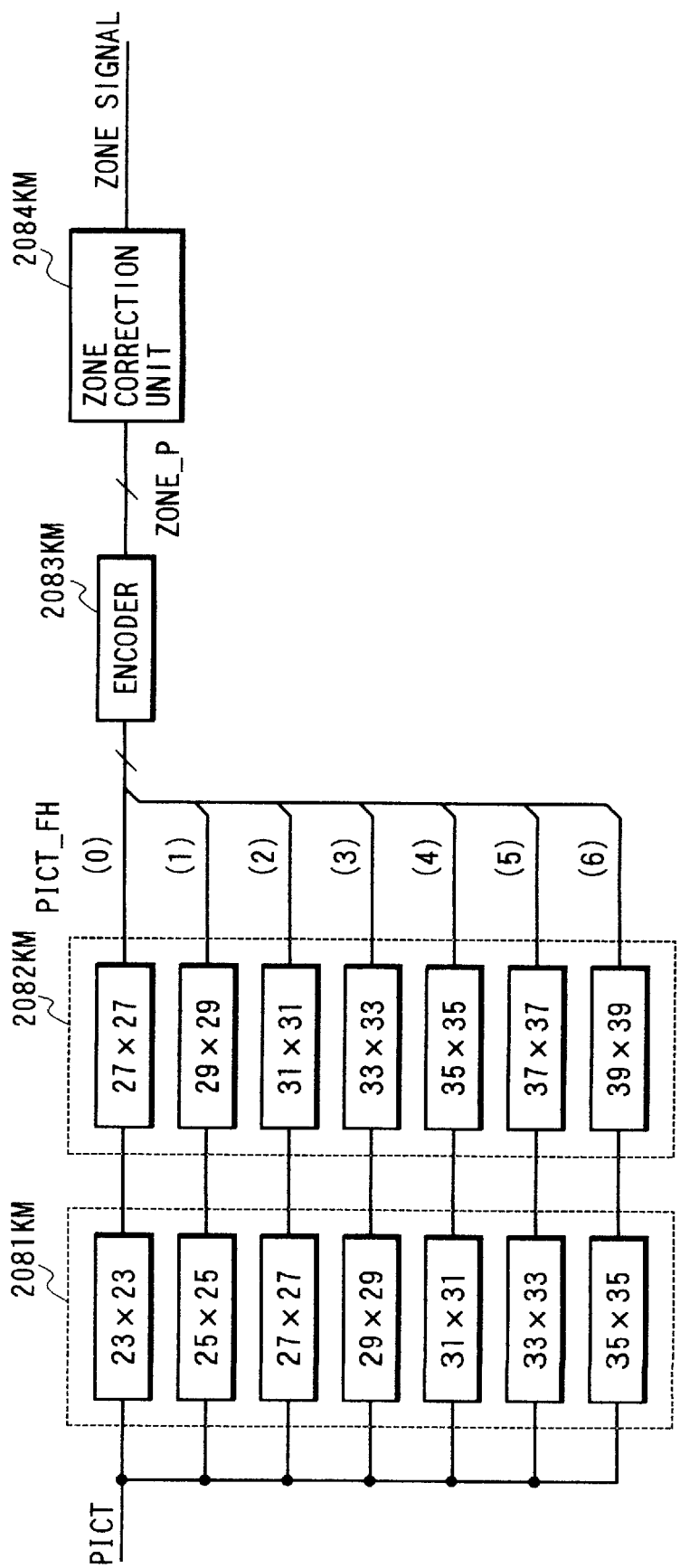
FIG. 37 is a block diagram showing the structure of an area size judgment circuit.

FIG. 37 shows the area size judgment unit 2016KM which has a contraction circuit 2081KM and an expansion circuit 2082KM. In these circuits 2081KM and 2082KM, a plurality pairs of contraction circuits and expansion circuits are provided. The size of the area to which the circuit 2081KM refers is different from that to which the circuit 2082KM refers. The binarization signal PICT is line-delayed according to the sizes of the contraction circuits and then inputted into the contraction circuit 2081KM. In the present embodiment, the seven kinds of contraction circuits having the sizes from 23×23 pixels to 35×35 pixels are prepared. The signals outputted from the contraction circuit 2081KM are line-delayed and then inputted into the expansion circuit 2082KM. In the present embodiment, in correspondence with the outputs from the contraction circuits in FIG. 37, the seven kinds of expansion circuits having sizes from 27×27 pixels to 39×39 pixels, whereby output signals PICT_FH are obtained respectively from the expansion circuits.

Figures 38, 39:
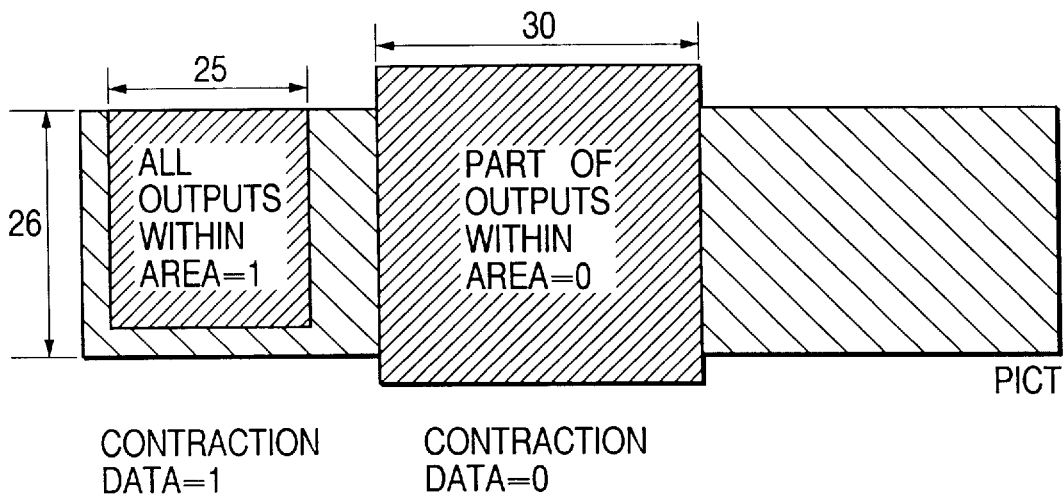
FIG. 38 is a view showing a state for detecting an output signal PICT_FH according to a character thickness.
FIG. 39 is a view showing an encode rule in an encoder 2083.

In a case where the target pixel is a part of the character, the output signals PICT_FH are determined according to the thickness of this character. FIG. 38 shows such a state.

Figure 40:
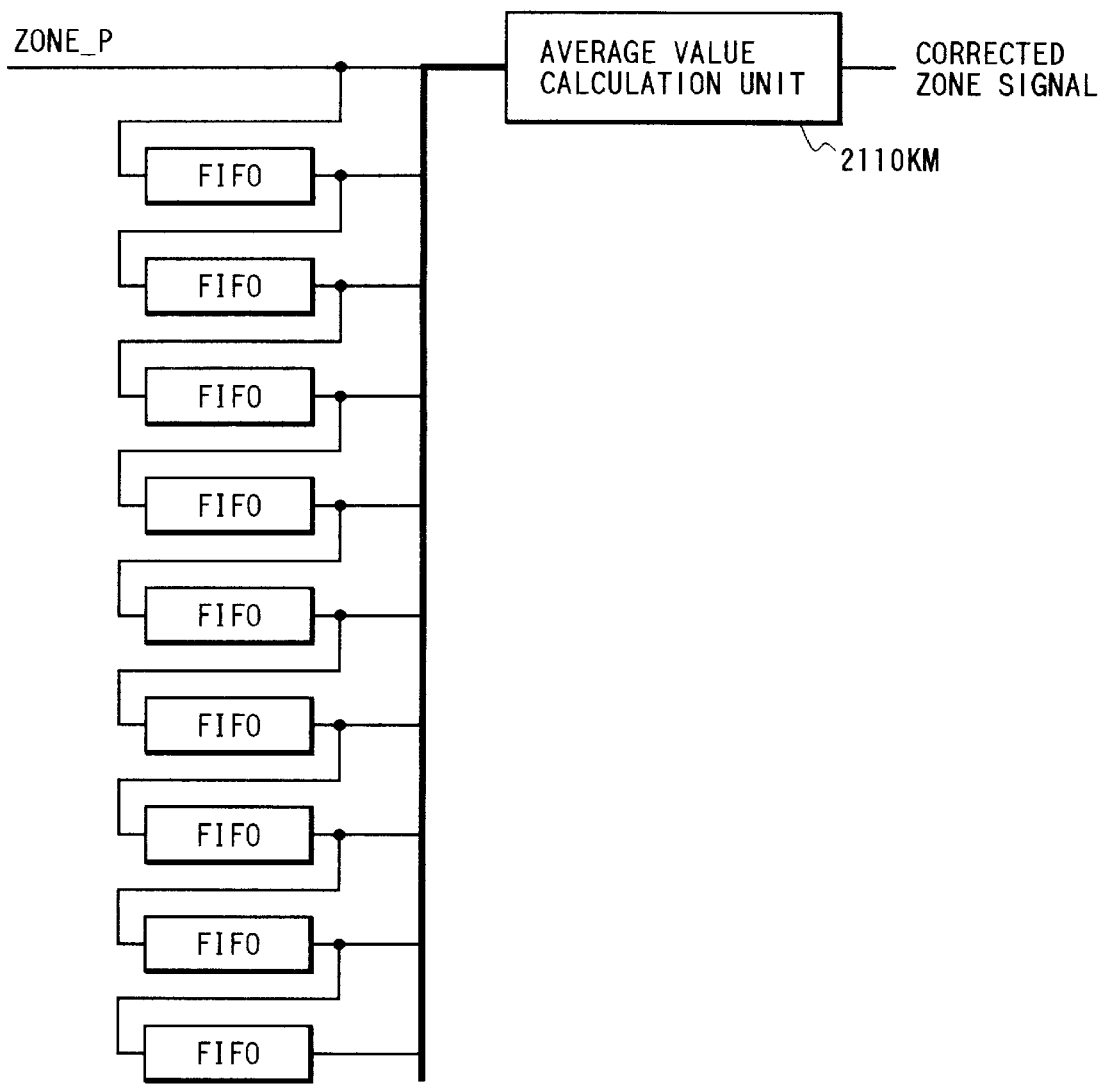
FIG. 40 is a block diagram showing the structure of a zone correction unit 2084.

For example, in a case where the signals PICT_FH exist in a band form of which width is 26 pixels, when the contracting of the size larger than 27×27 pixels is performed, all the outputs become "0". On the other hand, when the contracting of the size smaller than 25×25 pixels is performed and thereafter the expanding according to the respective sizes are performed, the output signals PICT_FH in the band form of which width is 30 pixels can be obtained. Thus, by inputting these output signals PICT_FH into an encoder 2083KM, an image area signal ZONE_P to which the target pixel belongs can be obtained. FIG. 39 shows an encode rule of the encoder 2083KM. According to such processing, a photographic image or a dot image in which the signal PICT is high in the wide area is defined as an area 7 (maximum value). On the other hand, a character or a line image of which area size is smaller (i.e., thinner) than the maximum value is defined as a multi-value image area according to its size (i.e., thickness). In the present embodiment, it is assumed that a ZONE signal has three bits, and the thickness of the character is represented by eight levels, i.e., the finest character is represented by level "0" and the fattest character (including the area other than the character) is represented by level "7". FIG. 40 is a view for explaining a ZONE correction unit 2084KM. In FIG. 40, a signal ZONE_P which was line-delayed by a plurality of FIFO memories is inputted into an average value calculation unit 2110KM, whereby an average value of 10×10 pixels is calculated. As the character is fatter, the value of the signal ZONE_P is larger, and as the character is thinner, the value is smaller. Therefore, the output of the average value calculation unit 2119KM becomes a corrected ZONE signal as is. In this case, it is desirable that the block size to be used for the correction is determined according to the block size to be used for judging the character thickness. By performing subsequent processing with use of the corrected ZONE signal, the thickness judging smoothly changes even in a portion where the thickness of the character or the line abruptly changes, whereby deterioration of image quality due to the change in the black character process can be more improved.

As described above, the area in which the ZONE signal has the level "7" can be considered as the halftone area. Therefore, by utilizing such rule, the character/line existing within the dot area or the halftone area can be distinguished from the character/line in the other area on the basis of the ZONE signal and the edge signal. A method for realizing the distinguishing will be explained hereinafter.

Figure 41:
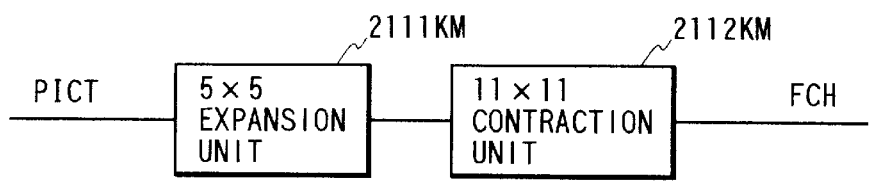
FIG. 41 is a view showing an algorithm for character detecting in a dot/halftone process.
Figure 42:
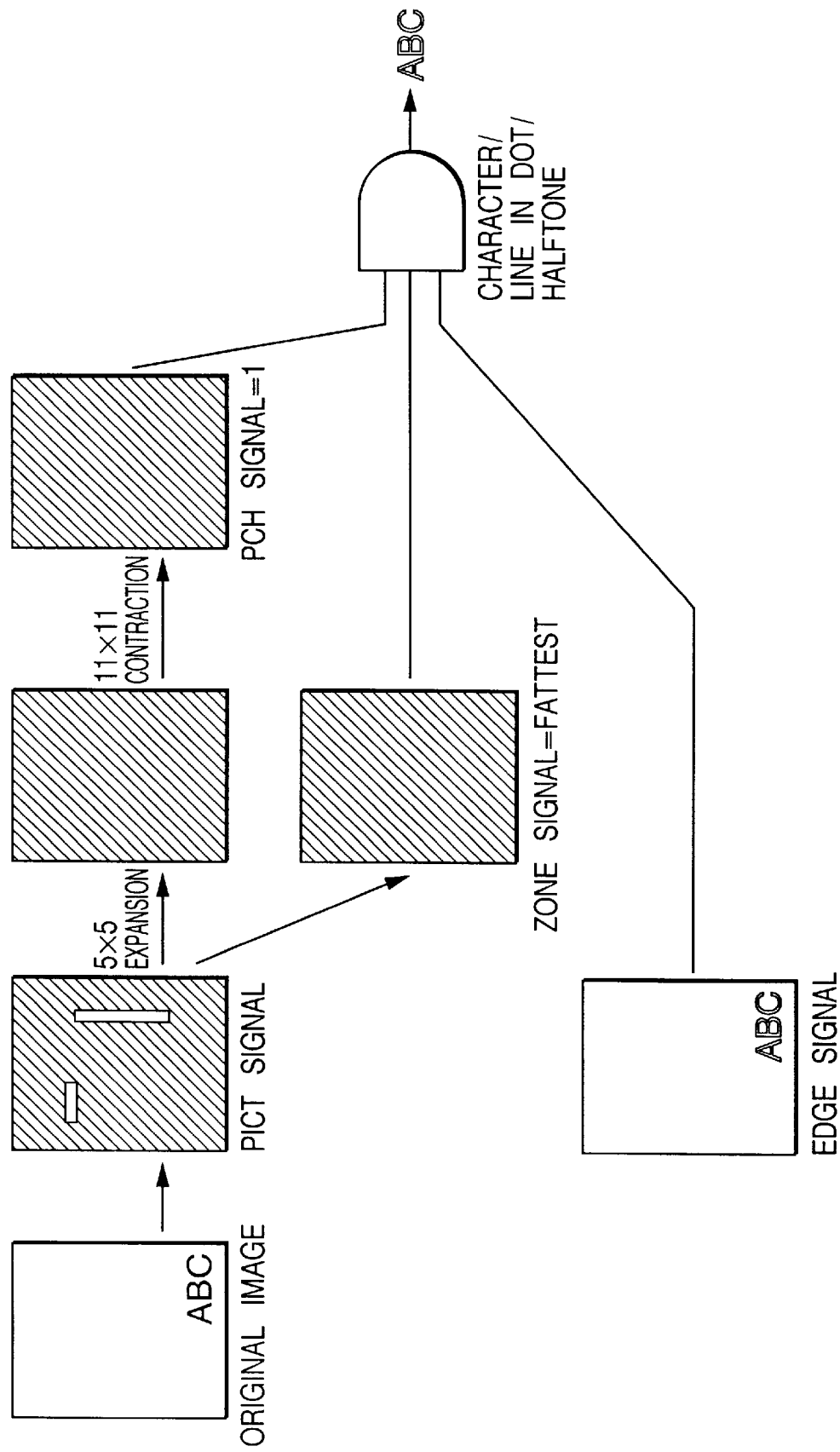
FIG. 42 is a view concretely showing a state of a process based on an algorithm shown in FIG. 39.

FIG. 41 shows an algorithm for detecting the character in the dot/halftone area. Initially, a 5×5 expansion unit 2111KM performs an expansion process with 5×5 block on the above-described signal PICT. By this processing, the detection area is corrected on the dot area which is liable to be incompletely detected. Then, a 11×11 contraction unit 2112KM performs a contraction process with 11×11 block on the output signal from the unit 2111KM. A signal FCH obtained by such processing is the signal contracted by three pixels as compared with the signal PICT. FIG. 42 shows a state of such the processing. In this state, by combining the signal FCH, the ZONE signal and the edge signal with others, the edge in a white background can be distinguished from the edge in the dot/halftone area. Therefore, even in the dot image, the black character process can be performed without emphasizing the dot component and processing the portion such as the edge of a photograph on which the black character process is unnecessary.

<LUT 117KM>

The signals judged by the units 114KM, 115KM and 116KM are outputted as six-bit control signals respectively composed of process signals "ucr", "filter" and "sen", in accordance with a table shown in FIGS. 43A and 43B. They are the signals for controlling a masking UCR coefficient, a spatial filter coefficient and printer resolution, respectively. The table has following characteristics.

(1) The multi-level black character process can be performed according to the thickness of the character.

(2) Since the plurality of ranges are prepared as the edge areas, the black character process area can be selected according to the thickness of the character. In the present embodiment, the widest area is processed in case of the finest character.

(3) As the degree of the process on the edge of the character is made different from the degree of the process on the inside of the character, the black character process is performed, thereby realizing a smoother change in the black amount.

(4) As the character in the dot/halftone is distinguished from the character in the white background, the processes are performed.

(5) The spatial filter coefficient is changed respectively on the edge of the character, the inside of the character and the dot/halftone image. Further, on the edge of the character, the coefficient is changed or varied according to its thickness.

(6) The resolution of the printer is changed only on the finest character.

(7) The same processes as those on the black character are all performed on the color character, except for the masking UCR coefficient.

Of course, in addition to the above-described processes in the present embodiment, various processing methods on the input signal can be supposed by various combinations.

In the present embodiment, four modes can be set from the console unit 500, i.e., a character mode, a photograph mode, a character/photograph mode and a map mode. A character original, a photograph original, a character/photograph mixing original and a map original are optimally reproduced in the character mode, the photograph mode, the character/photograph mode and the map mode, respectively. In each mode, different black character judging is performed.

The masking and UCR unit 212 and the edge emphasis unit 215 are controlled in response to the signals "ucr" and "filter" included in the control signal outputted from the LUT 117KM.

The masking and UCR unit 212 generates the black signal K and performs an output masking process, on the basis of the UCR control signal "ucr".

FIG. 44 shows an operation equation concerning outline of the masking and UCR process performed in the masking and UCR unit 212.

In FIG. 44, a minimum value MIN CMY of values Cl, M1 and Y1 inputted in the masking and UCR process is first obtained, and a value K1 is obtained by using an equation 2101. Then, the 4×8 masking is performed by using an equation 2102 to obtain values C2, M2, Y2 and K2. In the equation 2102, coefficients m11 to m84 are the masking coefficients determined based on the used printer, and coefficients k11 to k84 are the UCR coefficients determined responsive to the UCR control signal. Although the UCR coefficients are all "1.0" for the dot/halftone image (ZONE signal is "7"), the UCR coefficients are set for the finest character (ZONE signal is "0") such that the black (K) single color is outputted. Further, the UCR coefficients are determined for the intermediate thickness such that a change in the tint according to the thickness smoothly continues, thereby controlling the amount of the value K.

Two filters of 5×5 pixels are prepared in the spatial filter unit such that an output signal from one filter is introduced into an input of the other filter. As filter coefficients, (1) smoothing 1, (2) smoothing 2, (3) edge emphasizing 1, and (4) edge emphasizing 2 are prepared, and the coefficient is changed for each pixel in accordance with the signal "filter" from the LUT 117KM. Further, by using the two filters, the edge emphasizing can be performed after the smoothing to realize the edge emphasizing in which moire is reduced. Furthermore, by combining the two kinds of edge emphasizing coefficients, the higher-quality image can be outputted.

(Flow of Image Signal)

In the present embodiment, there is provided an ordinary copy mode in which the ordinary copy process is performed and a preview mode in which the monitor displaying is performed. The preview mode further includes an RGB display mode, a CMYK display mode and a synthesis display mode. In the RGB display mode the result of an edit process (i.e., the color conversion process in the color conversion unit 205) in RGB system is displayed on the monitor 219, in the CMYK display mode the result of an edit process (i.e., the paint and free color processes in the edit circuit 213) in CMYK system is displayed on the monitor 219, and in the synthesis display mode the synthesized result in the synthesis unit 206 is displayed on the monitor 219. Hereinafter, the flows of the image signals in these modes will be explained with reference to FIGS. 4A and 4B.

<ordinary copy mode>

In the ordinary copy mode, the C, M, Y and K data according to the printer characteristic are generated from the image memory unit 208 by using the four sets of C, M and Y data corresponding to misregistration (or positional aberration) of the image formation units 302 to 305, and the edit process is performed on each color component data.

CCD 201→ . . . →synthesis unit 206→ . . . →LOG conversion unit 207→ . . . →image memory unit 208→ . . . →masking and UCR unit 212→ . . . →color LBP 216.

At this time, the sub-scanning enable signals (M to K) included in the signals 221 and 238 are controlled such that these signals become enable according to the misregistration of the image formation units 302 to 305.

<preview mode>

(1) RGB display mode

CCD 201→ . . . →synthesis unit 206 (A input→B output)→ . . . →LOG conversion unit 207→ . . . →image memory unit 208→ . . . →masking and UCR unit 212→ . . . →edge emphasis unit 215→ . . . →preview process unit 217→ . . . →monitor 219.

In the RGB display mode, the data written into the memory within the image memory unit 208 changes every time the editing in the preview mode is performed. Therefore, the operation starts from the original reading (by CCD 201) every time the writing (i.e., displaying on the monitor 219) is performed.

At this time, the sub-scanning enable signals (M to K) included in the signals 221 and 238 simultaneously rise and simultaneously trail.

Further, as a result of the confirmation by the previewing, in case of outputting the image onto the recording paper, the optical scanning is not performed but the reading of the image signal from the image memory unit 208 is performed. At this time, the sub-scanning enabled signals (M to K) included in the signal 221 are controlled such that these signals become enabled according to the misregistration of the image formation units 302 to 305.

(2) CMYK display mode

CCD 201→ . . . →synthesis unit 206 (A input→B output)→ . . . →LOG conversion unit 207→ . . . →image memory unit 208→ . . . →masking and UCR unit 212→ . . . →edge emphasis unit 215→ . . . →preview process unit 217→ . . . →monitor 219.

In the CMYK display mode, the data written into the memory within the image memory unit 208 does not change by the editing in the preview mode. Therefore, in the second and subsequent writing (i.e., displaying on the monitor 219), the optical scanning is not performed, but an edit parameter is changed and the reading from the image memory 208 is performed.

At this time, the sub-scanning enable signals (M to K) included in the signals 221 and 238 simultaneously rise and simultaneously fall.

Further, as a result of the confirmation by the previewing, in case of outputting the image onto the recording paper, the optical scanning is not performed but the reading of the image signal from the image memory unit 208 is performed. At this time, the sub-scanning enable signals (M to K) included in the signal 221 are controlled such that these signals become enable according to the misregistration of the image formation units 302 to 305.

(3) synthesis display mode

<first step> A first image is stored.

CCD 201→ . . . →synthesis unit 206→ . . . →LOG. conversion unit 207→ . . . →image memory unit 208.

<second step> The first image and a second image are synthesized.

However, the CPU 240 sets a process parameter for causing the masking and UCR unit 212 to output the inputted data as it is, and sets in the gamma correction unit 214 an inverse logarithmic (LOG) table for converting the C, M and Y image data into the R, G and B image data.

(first image) image memory unit 206→ . . .→masking and UCR unit 212→ . . . →edge emphasis unit 215→ . . . →synthesis unit 206.

(second image) CCD 201→ . . . →synthesis unit 206.

<third step> The synthesized image is stored and displayed on the monitor.

synthesis unit 206→ . . . →LOG conversion unit 207→ . . . →image memory unit 208 (storing)→ . . . →image memory unit 208→ . . . →masking and UCR unit 212→ . . . →edge emphasis unit 215→ . . . →preview process unit 217→ . . . →monitor 219.

As above, in a case where a synthesized result is displayed on the monitor 219, the synthesized image is stored once in the image memory unit 208. Then, in order to display the synthesized result on the monitor 219, the image data is read from the image memory unit 208. The black character judging is performed only on the image after the synthesizing.

In the synthesis display mode, the data written into the memory within the image memory unit 208 changes every time the editing in the preview mode is performed. Therefore, the operation starts from the original reading (by CCD 201) every time the writing (i.e., displaying on the monitor 219) is performed.

As described above, in the ordinary copy mode, the four sets of C, M and Y data are independently read from the image memory unit 208 in correspondence with the misregistration of the image formation positions. However, the monitor displaying is performed in the preview mode, since the monitor 219 simultaneously uses the plurality of color components representing one pixel, the three sets of C, M and Y data representing the same position of the image are simultaneously read from the image memory unit 208. Further, in the preview mode, it is necessary to read the four sets of C, M and Y data from the image memory unit 208 to store the R, G and B data representing the synthesized result into the image memories 21711 to 21713 in the preview process unit 217.

The controlling of the reading by the image memory unit 208 is performed by changing or varying the read enable signal having five bits (i.e., one for the main scanning and four for the sub scanning) which is generated by the area generation unit A 220, between the ordinary copy mode (five bits in the signal 221) and the preview mode (five bits in the signal 238).

Concretely, in the ordinary copy mode, the read enable signal having five bits including the four bits for the sub scanning to be used to control the reading of the four sets of C, M and Y data is generated in correspondence with the misregistration (or positional aberration) in the image forming by the C, M, Y and K image formation units 302, 303, 304 and 305. On the other hand, in the preview mode, the read enable signal having five bits including the four bits for the sub scanning to be used to control the reading of the four sets of C, M and Y data representing the same image is generated.

As above, in the present embodiment, the system in case of performing re-displaying is different according to whether or not the data written into the memory in the image memory unit 208 changes every time the editing in the preview mode is performed. That is, in the C, M, Y and K display mode, in a case where the re-displaying is performed after the edit process (described later) is performed on the image displayed on the monitor 219, since the C, M, Y and K original image data have already been stored in the image memory unit 208, the re-displaying may be performed on the monitor 219 after the setting edit process is performed on the image data in the image memory unit 208. Namely, in case of the re-displaying, there is no need to get the image by scanning the original with the reader unit 101. Therefore, since the processes in the CCD 201 to the zooming unit B 234 can be skipped, the thruput can be improved.

Further, by the simple structure to change or vary the read enable signal between the preview mode and the ordinary copy mode, the controlling of the reading in the image memory unit 208 can be made suitable for each process.

Furthermore, since the misregistration (or positional aberration) in the each set of C, M and Y data occurred in the ordinary copy mode can be absorbed in the preview mode, there is no need to provide the memory such as the FIFO memory, whereby the circuit structure can be made compact.

(Processing Procedure)

Figure 7:
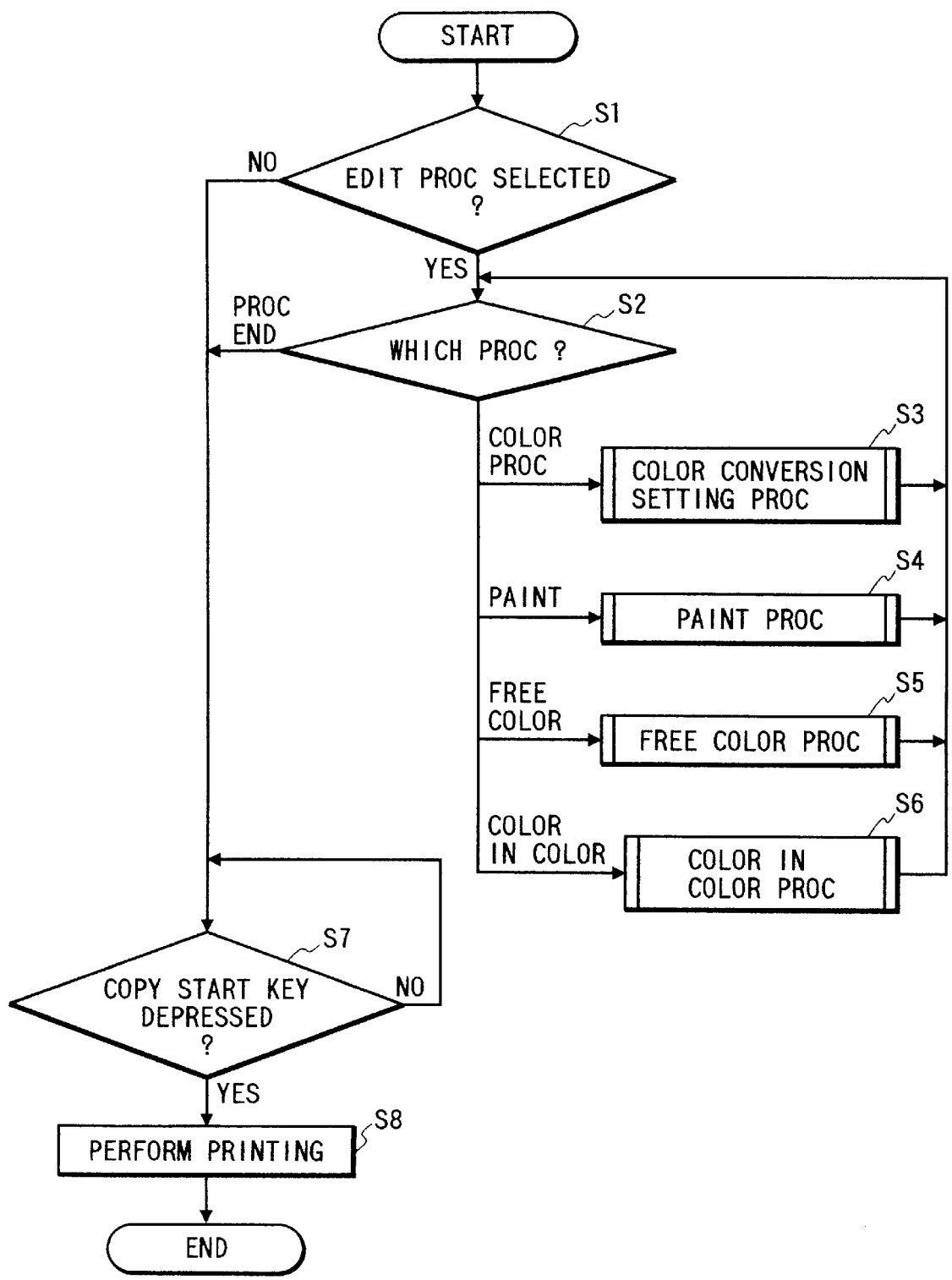
FIG. 7 is a flow chart showing a copy process in the present embodiment.

FIG. 7 is a flow chart showing an example of a processing procedure beginning from the edit process to the printing-out process. This procedure is executed by the CPU 240 which was instructed by the operator to start the processes.

Initially, it is judged in a step S1 whether or not the edit process is selected. If selected, it is further judged in a step S2 which edit process is to be performed. Then, the flow advances to a step S3 if the color conversion setting process is selected, to a step S4 if the paint process is selected, to a step S5 if the free color process is selected, and to a step S6 if the color in color process is selected, respectively. After these processes terminate, the flow returns to the step S2. On the other hand, if the edit process is not selected in the step S1, and if the process termination is selected in the step S2, the flow advances to a step S7. Although the details will be described later, the operator sets a process parameter in each of the steps S3 to S6. In this case, by using the preview function according to the present embodiment, he can adjust such process parameter to obtain the desired image.

Subsequently, the step S7 waits for depressing of a copy start key provided on the console unit 500. If the copy start key is depressed, the printing-out process is performed in a step S8.

<color conversion setting process>

Figure 8:
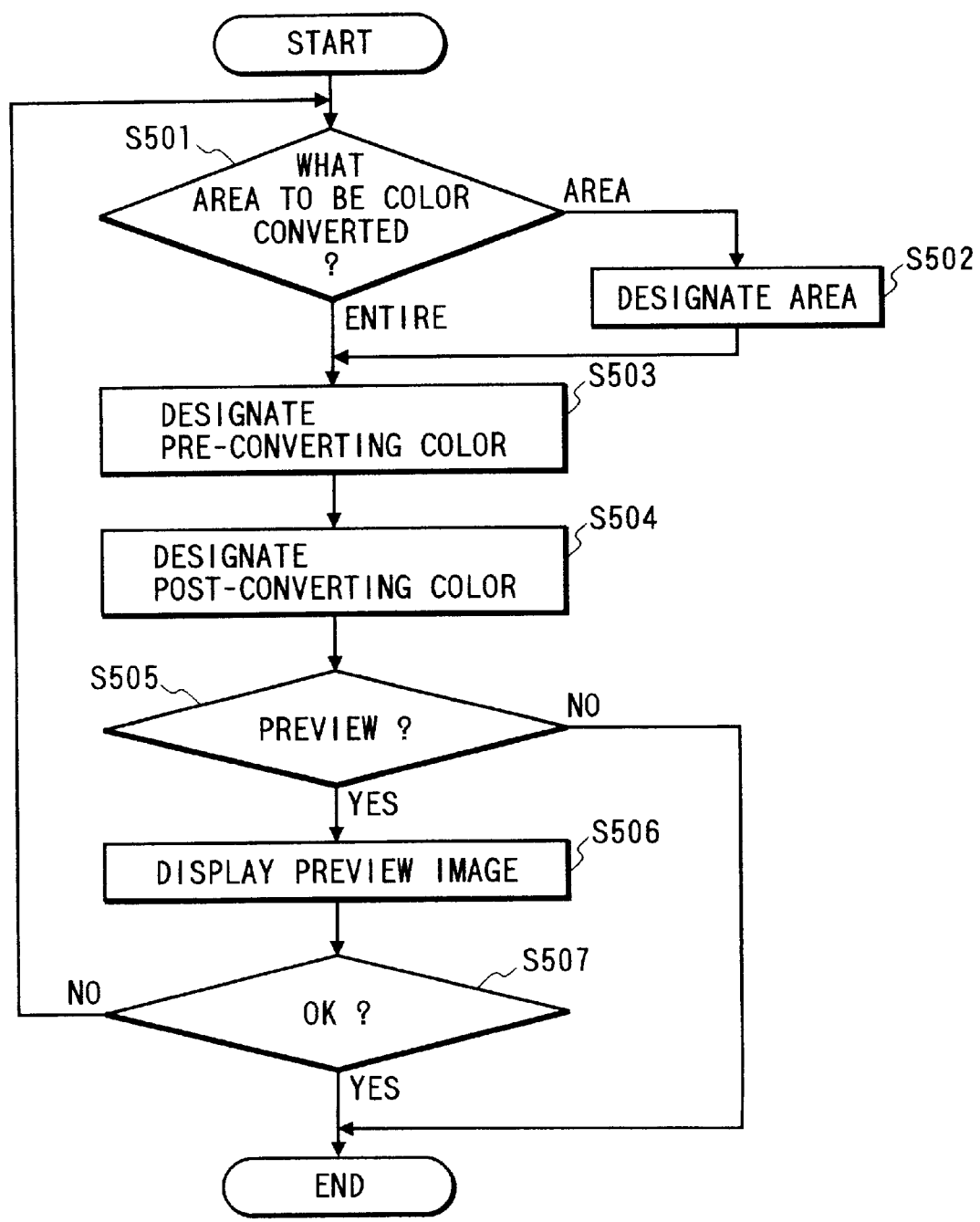
FIG. 8 is a flow chart showing a color conversion process in the present embodiment.

FIG. 8 is a flow chart showing an example of the color conversion setting process.

Initially, in a step S501, the area (i.e., entire area of the image or predetermined area) on which the color converting is performed is selected. If the predetermined area is selected, such area is designated (or appointed) by a not-shown digitizer or the like in a step S502.

Subsequently, a pre-converting color is designated in a step S503, and also a post-converting color is designated in a step S504. The CPU 240 sets the process parameter for performing the designated process, to the color conversion unit 205. At this time, the process parameters necessary for the color converting are completed, whereby the operator can instruct the previewing by depressing a preview key or the like on the console unit 500. That is, if the previewing is instructed in a step S505, the original image is read and the preview image is displayed on the monitor 219 on the basis of the flow of the image signal explained in the above RGB display mode, in a step S506. On the other hand, if the previewing is not instructed, the process terminates and the flow returns to that shown in FIG. 7.

The operator observes the preview image. Then, if a desired color converting result can be obtained, he instructs to terminate the process by depressing an OK key or the like on the console unit 500. That is, if the process termination is instructed in a step S507, such process terminates and the flow returns to that shown in FIG. 7. Further, in a case where the desired color converting result can not be obtained, or the color converting in the other area is set, if the operator operates the console unit 500 or the like, the flow returns to either one of the steps S501 to S504.

<paint process>

Figure 9:
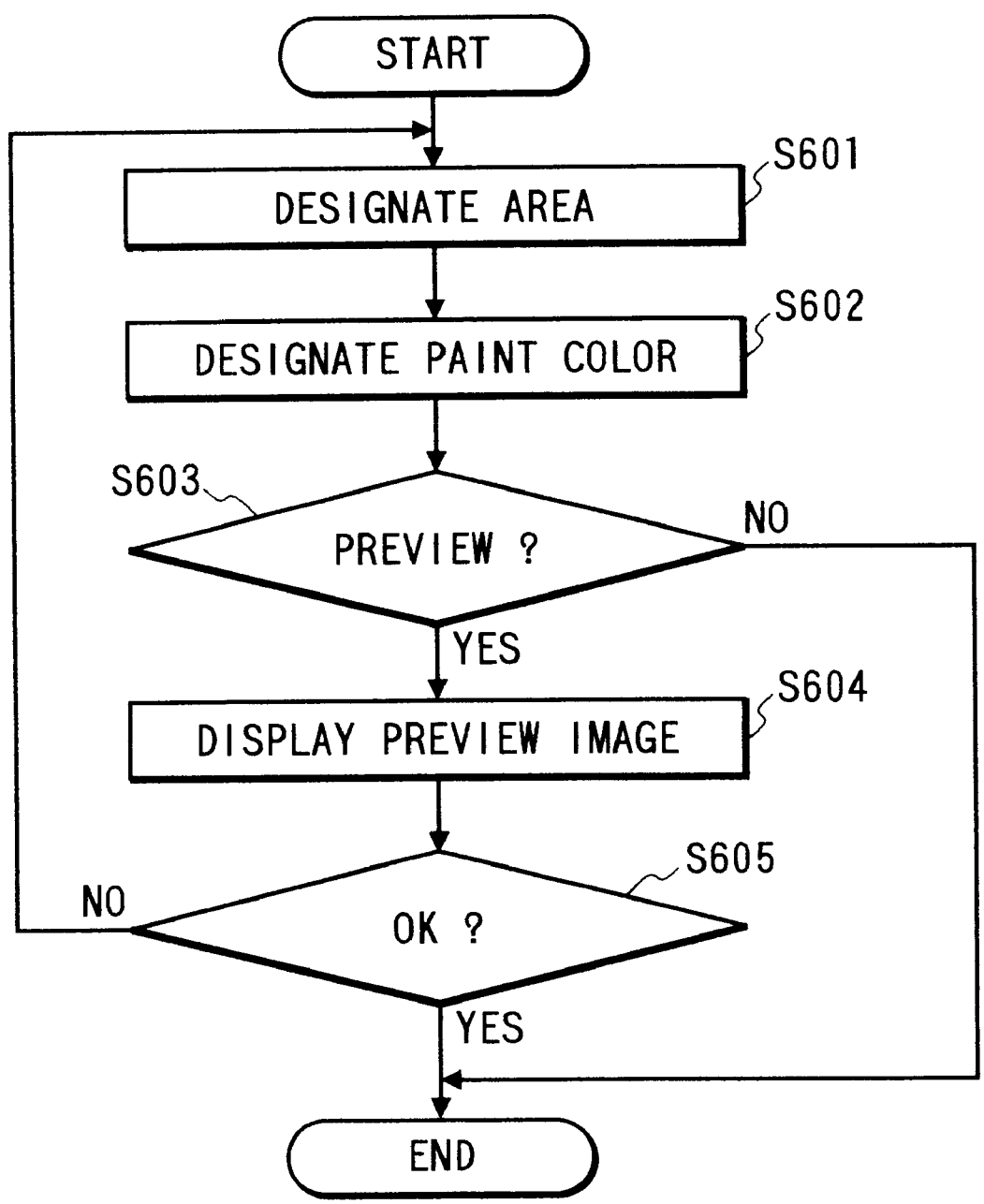
FIG. 9 is a flow chart showing a paint process in the present embodiment.

FIG. 9 is a flow chart showing an example of the paint process.

Initially, the area is designated by using, e.g., a digitizer (not shown) in a step S601, and a paint color is designated in a step S602. The CPU 240 sets the process parameter for performing the designated process, to the edit circuit 213. At this time, the process parameters necessary for the paint process are completed, whereby the operator can instruct the previewing by depressing the preview key or the like on the console unit 500. That is, if the previewing is instructed in a step S603, the original image is read and the preview image is displayed on the monitor 219 on the basis of the flow of the image signal explained in the above-mentioned CMYK display mode, in a step S604. On the other hand, if the previewing is not instructed, such process terminates and the flow returns to the process shown in FIG. 7.

The operator observes the preview image. Then, if the desired paint-processed result can be obtained, he instructs to terminate the process by depressing the OK key or the like on the console unit 500. That is, if the process termination is instructed in a step S605, such the process terminates and the flow returns to the process shown in FIG. 7. Further, in a case where the desired result can not be obtained, or the other area is to be processed, if the operator operates the console unit 500 or the like, the flow returns to either one of the steps S601 to S602.

Then, in case of the printing, as described above, the image signal stored in the image memory unit 208 is read and printed out.

<free color process>

Figure 10:
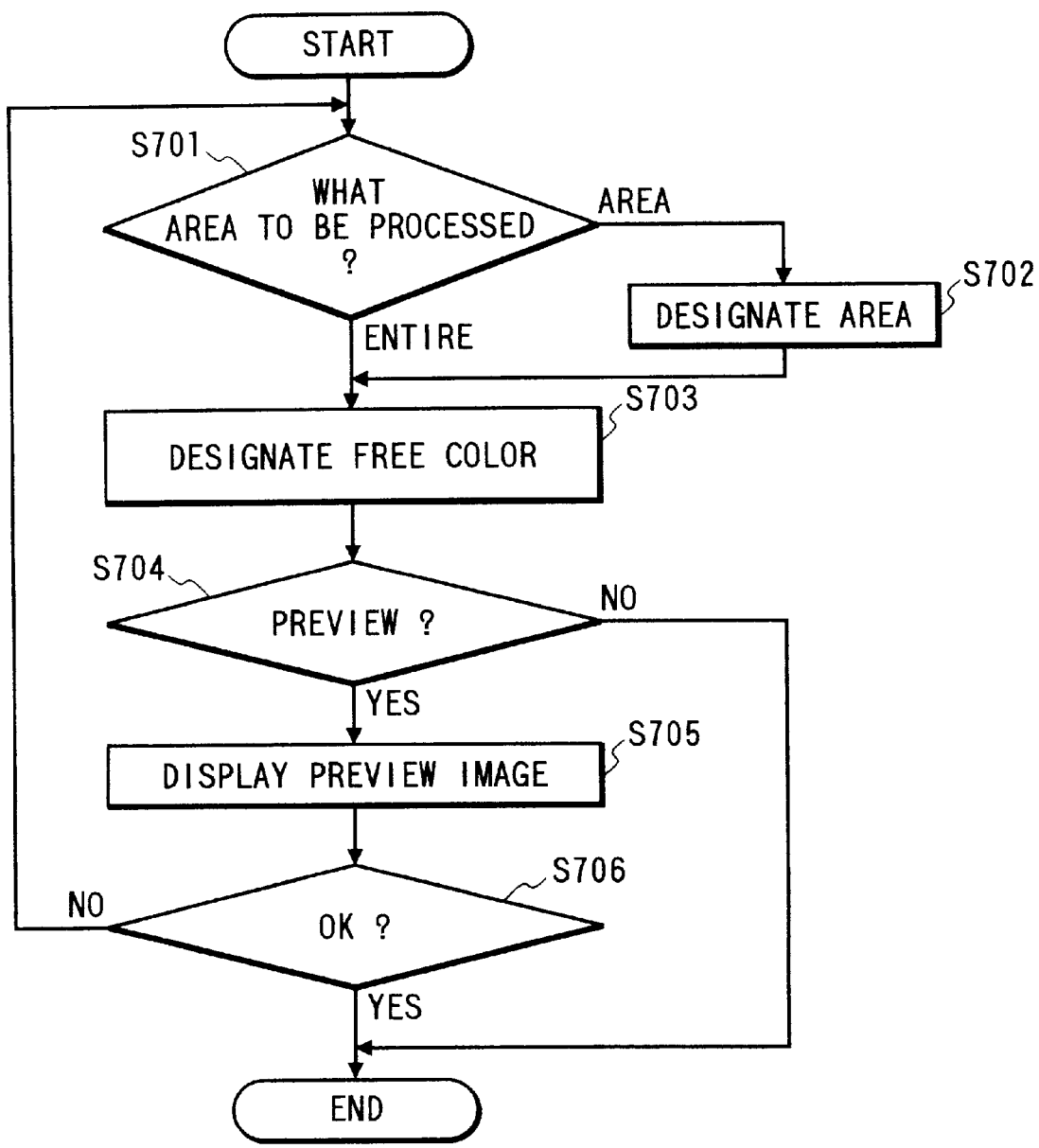
FIG. 10 is a flow chart showing a free color process in the present embodiment.

FIG. 10 is a flow chart showing an example of the free color process.

Initially, in a step S701, the area (i.e., entire area of the image or predetermined area) on which the free color process is performed is selected. If the area is selected, such area is designated (or appointed) by the digitizer (not shown) or the like in a step S702.

Subsequently, a free color is designated in a step S703, and the CPU 240 sets the process parameter for performing the designated process to the edit circuit 213. At this time, the process parameters necessary for the free color process are completed, whereby the operator can instruct the previewing by depressing the preview key or the like on the console unit 500. That is, if the previewing is instructed in a step S704, the original image is read and the preview image is displayed on the monitor 219 on the basis of the flow of the image signal explained in the above-mentioned CMYK display mode, in a step S705. On the other hand, if the previewing is not instructed, the process terminates and the flow returns to the process shown in FIG. 7.

The operator observes the preview image. Then, if the desired result in the free color process can be obtained, he instructs to terminate the process by depressing the OK key or the like on the console unit 500. That is, if the process termination is instructed in a step S706, such process terminates and the flow returns to the process shown in FIG. 7. Further, in a case where the desired result can not be obtained, or the other area is to be processed, if the operator operates the console unit 500 or the like, the flow returns to either one of the steps S701 to S703.

Then, in case of printing, as described above, the image signal stored in the image memory unit 208 is read and printed out.

<color in color (memory synthesis) process>

Figure 11:
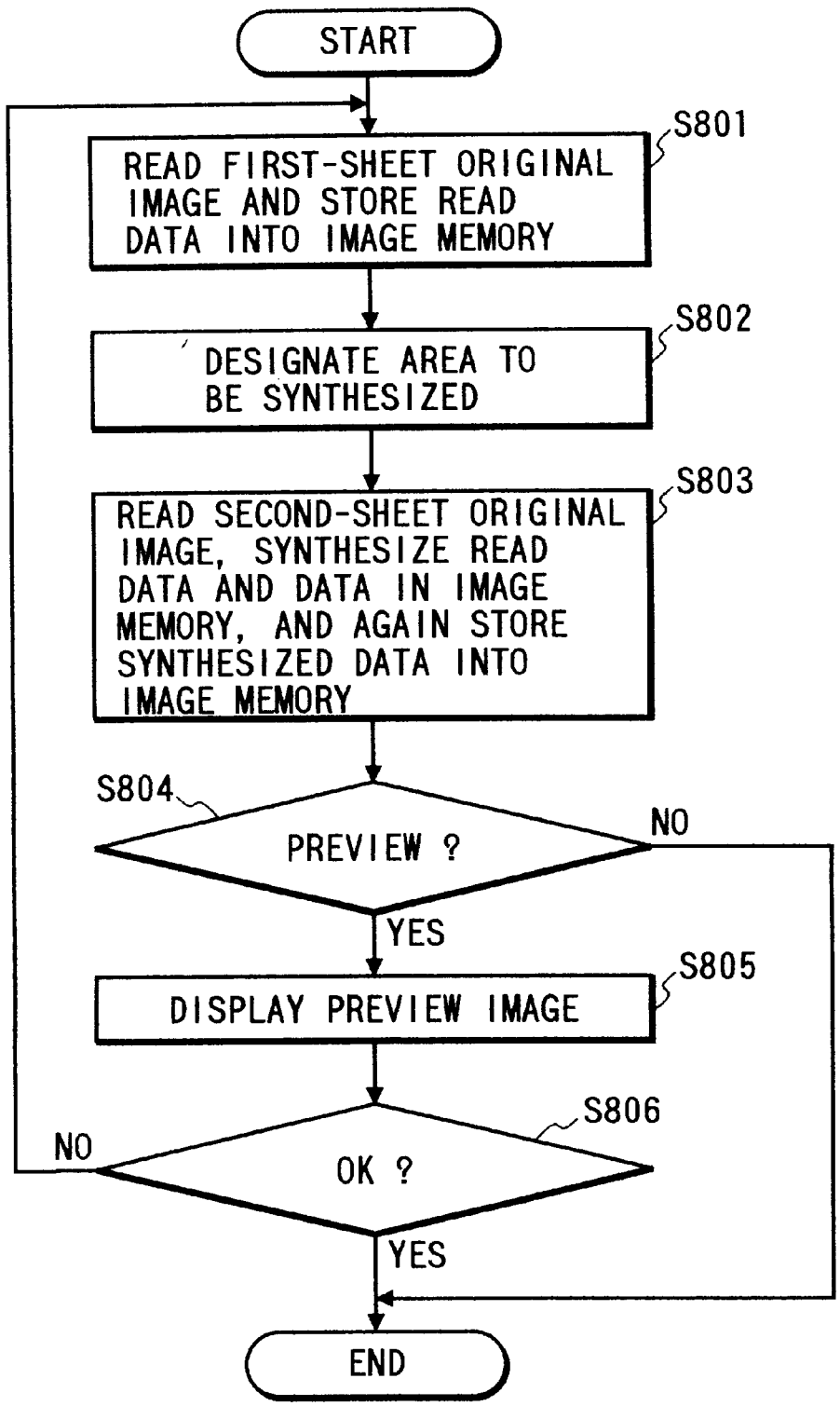
FIG. 11 is a flow chart showing a memory synthesis process in the present embodiment.

FIG. 11 is a flow chart showing an example of the memory synthesis process.

Initially, in a step S801, the image data obtained by reading the first-sheet original image is stored in the image memory unit 208. Then, in a step S802, the area on which the second-sheet original image is synthesized is designated by using, e.g., the digitizer (not shown). Subsequently, in a step S803, the synthesis unit 206 synthesizes, by using read-modify-write, the image data stored in the image memory unit 208 and the image data obtained by reading the second-sheet original image, on the basis of designated area information. Then, the synthesized image data is again stored in the image memory unit 208.

If the previewing is instructed in a step S804, the preview image is displayed on the monitor 219 on the basis of the flow of the image signal explained in the above-mentioned synthesis display mode, in a step S805. On the other hand, if the previewing is not instructed, such the process terminates and the flow returns to the process shown in FIG. 7.

The operator observes the preview image. Then, if the desired synthesizing result can be obtained, he instructs to terminate the process by depressing the OK key or the like on the console unit 500. That is, if the process termination is instructed in a step S806, such process terminates and the flow returns to the process shown in FIG. 7. Further, in a case where the desired result can not be obtained, or the image is further synthesized on the other area, if the operator operates the console unit 500 or the like, the flow returns to either one of the steps S801 to S803.

(Preview Process Unit 217)

Figure 12:
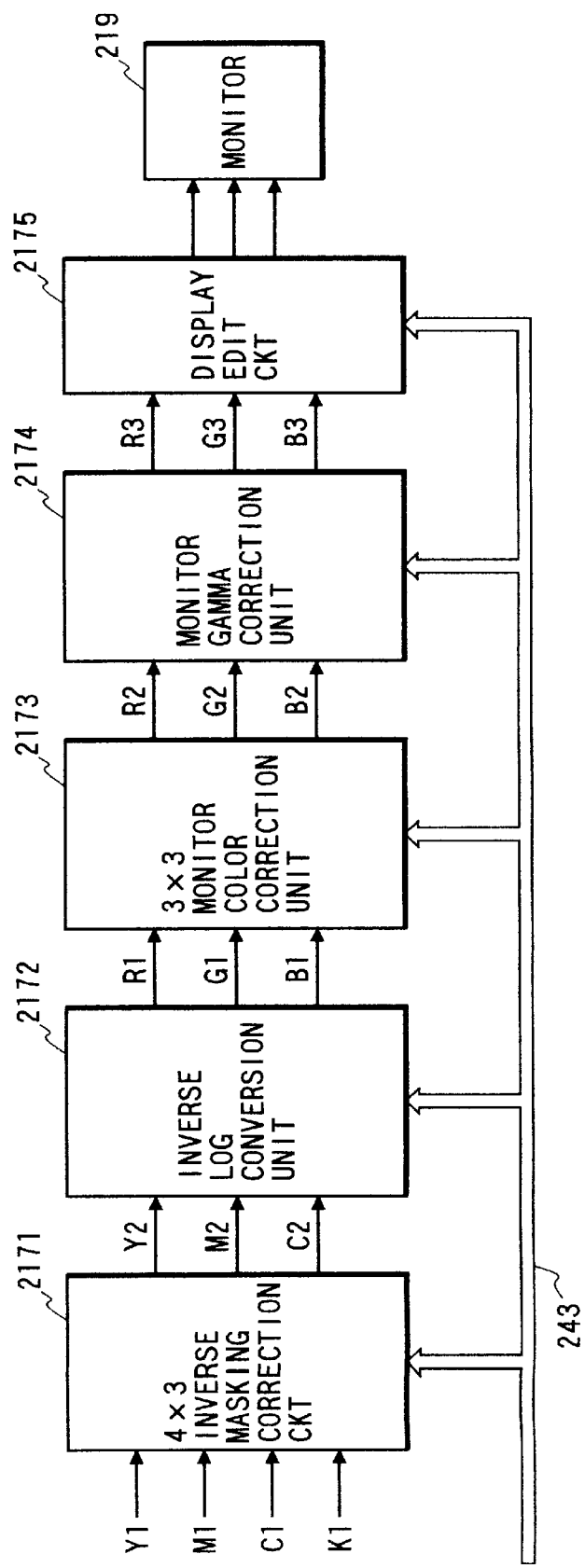
FIG. 12 is a block diagram showing the detailed structure of a preview process unit.

FIG. 12 is a block diagram showing an example of the structure of the preview process unit 217. The preview process unit 217 performs the process for displaying on the monitor 219 a final image which is obtained by passing the read image data through all of the process circuits.

Final image data Y1, M1, C1 and K1 (each eight bits) outputted from the edge emphasis unit 215 are respectively inputted into a 4×3 inverse masking correction circuit 2171, and thus operations based on the following equations are performed. They are inverse operations of the operations performed by the masking and UCR process unit 212 shown in FIGS. 4A and 4B.

$$Y2=a11*Y1+a12*M1+a13*C1+a14*K1$$

$$M2=a21*Y1+a22*M1+a23*C1+a24*K1$$

$$C2=a31*Y1+a32*M1+a33*C1+a34*K1$$

For each of the coefficients a11 to a34, the CPU 240 can set an arbitrary value through the CPU bus 243. However, the same coefficient is set irrespective of the result of the above black character judging.

In the present embodiment, the coefficients a11 to a34 are obtained based on the coefficients m11 to m84 shown in FIG. 44. Such input information of C, M, Y and K four colors are converted into information Y2, M2 and C2 of C, M and Y three colors, and then inputted into an inverse logarithmic conversion unit 2172. The inverse logarithmic conversion unit 2172 includes a LUT (look-up table) to perform an inverse operation of the conversion process by the LOG 207 in FIGS. 4A and 4B. Also, the CPU 240 can set arbitrary correction data to the conversion unit 2172. By such operation in the inverse logarithmic conversion unit 2172, the YMC density data Y2, M2 and C2 are converted into RGB luminance data R1, G1 and B1 to have a signal form capable of being displayed on the monitor 219.

However, there are a plurality of kinds of display devices which are actually connected as the monitor 219, and a color reproduction gamut (or range) is different for each device. Therefore, since it is indispensable to adjust such color reproduction gamuts, a 3×3 monitor color correction unit 2173 adjusts the color reproduction gamut of the monitor 219. In order to correct a color characteristic of the monitor 219, the 3×3 monitor color correction unit 2173 performs operations based on following equations.

$$R2=b11*R1+b12*G1+b13*B1$$

$$G2=b21*R1+b22*G1+b23*B1$$

$$B2=b31*R1+b32*G1+b33*B1$$

Like the 4×3 inverse masking correction circuit 2171, the CPU 240 can set an arbitrary value through the CPU bus 243 as each of the coefficients b11 to b33.

Subsequently, the signals R2, G2 and B2 are inputted into a monitor gamma correction unit 2174 which corrects a gamma characteristic of the monitor by using a LUT, and outputted as signals R3, G3 and B3 after the correcting. The CPU 240 can also set arbitrary correction data to the monitor gamma correction unit 2174.

As above, according to the present embodiment, the coefficients used in the 4×3 inverse masking correction circuit 2171 are made fixed irrespective of the setting mode and the process of the masking and UCR unit 212. Therefore, the changing ratio of the masking and UCR process set based on the result of the black character judging to the masking and UCR process corresponding to the coefficients of the 4×3 inverse masking correction circuit 2171 can be reflected in the preview image. In a case where the process to emphasize the black character is performed by the reader unit, the preview image in which the black character has been emphasized can be displayed.

That is, the formed image can be highly precisely previewed.

Subsequently, a display edit circuit 2175 controls the various edit processes in case of displaying them on the monitor 219, and the monitor 219 itself.

Figure 13:
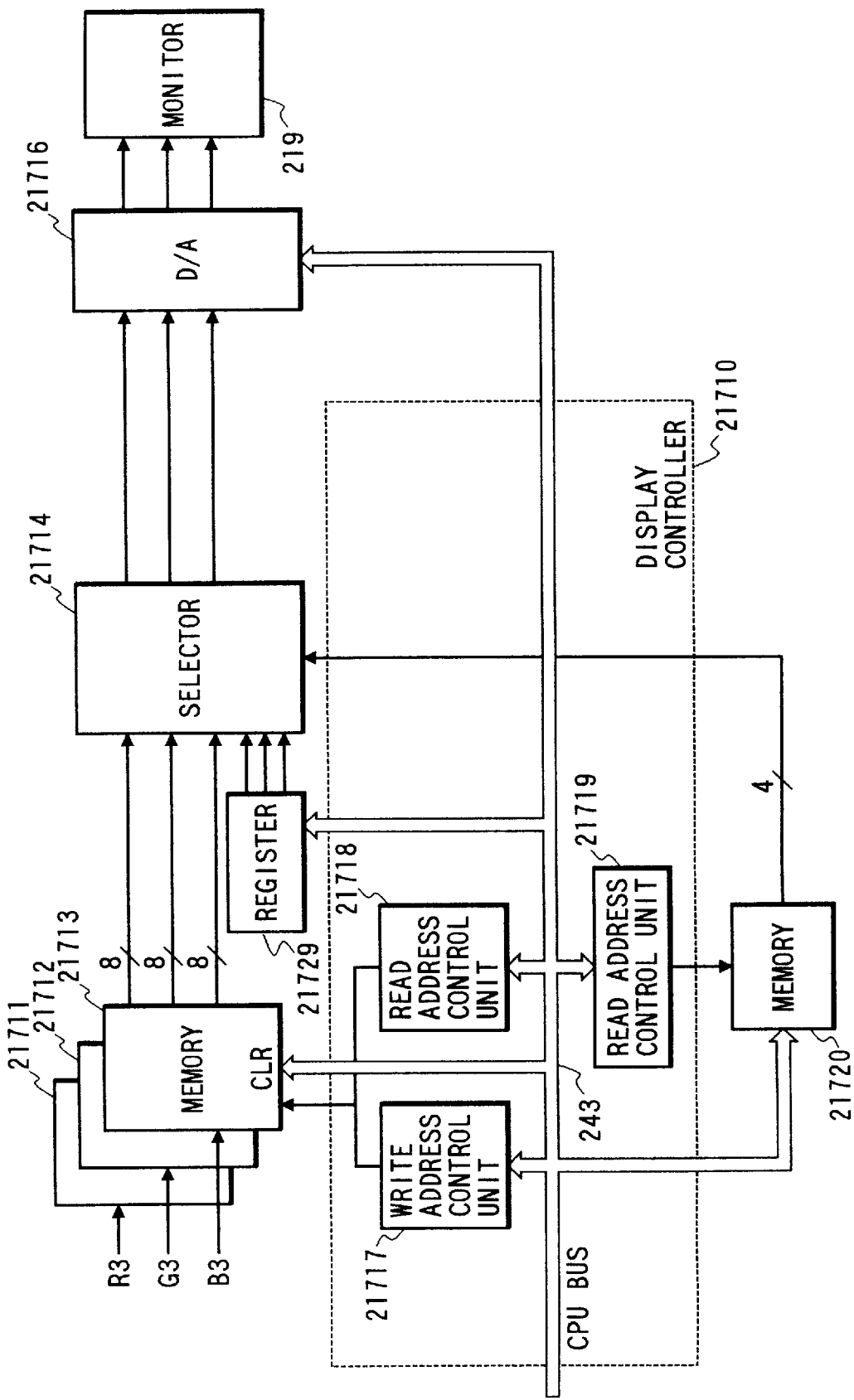
FIG. 13 is a block diagram showing the detailed structure of a display edit circuit.

FIG. 13 is a block diagram showing the detailed structure of the display edit circuit 2175. The display edit circuit 2175 is roughly divided into two parts, i.e., one for processing the read image and the other for generating additional information such as a frame, a character or the like to add it to such image.

The signals R3, G3 and B3 obtained after the correcting by the monitor gamma correction unit 2174 are inputted into memories 21711, 21712 and 21713, respectively. In order to be able to start the writing of the input data at an arbitrary position in each memory, start and end addresses in X and Y directions can be set from the CPU bus 243 through a write address control unit 21717 in a display controller 21710. In the present embodiment, a size of each of the memories 21711 to 21713 is 640×480×9×(8 bits) of three colors. That is, such size exceeds the capacity 3×3 times as large as the number of pixels capable of being displayed on the monitor 219.

When writing the data into the memory in the write address control unit 21717, such writing can be performed with reduction of the image size, and magnification of the reduction can be set from the CPU 240. Further, in accordance with whether the image size to be displayed is a longitudinal size (i.e., portrait) or a lateral size (i.e., landscape), the write address control unit 21717 can control the image to be arbitrarily rotated. At this time, in the memory area outside a start/end address region, i.e., the memory area into which the image is not written, there is a possibility that the image processed immediately before the writing remains or the displayed color is fixed. Therefore, in order to display the area outside the writing region with the arbitrary color, the CPU 240 can set such displaying color.

Further, in order to read the image data written into each of the memories 21711 to 21713 from the arbitrary position and displaying the read image data on the monitor 219, the start and end addresses in the X and Y directions can be set from the CPU bus 243 through a read address control unit 21718 in the display controller 21710. Such setting can be performed by a touch panel key or the like on the console unit 500 (described later), whereby real-time display can be performed.

In the present embodiment, since the image size of the monitor 219 is 640×480 dots, it is necessary to thin out the image to display the entire image stored in the memory. In this case, a thinning rate can be set also by the CPU 240. Further, in the present embodiment, as described later, it can be selected one of three modes, i.e., a one-time mode for displaying the entire image stored in the memory, a two-times mode for displaying ⅙ of the entire image, and a three-times mode for displaying ⅑ of the entire image. Such selection can be instructed from the console unit 500.

A memory 21720 is used to add to the image information the additional information such as the drawing, the character or the like which is represented by binary information for each of C, M, Y and K colors. Since a size of the memory 21720 is 640×480×9×(4 bits), the different drawings or characters corresponding to C, M, Y and K four planes can be developed independently developed. In the present embodiment, such additional information is directly developed in the memory 21720 by the CPU 240. However, for example, such additional information may be developed through an exclusive-use controller, such as a GDC (graphic display controller), AGDC (advanced display controller) or the like, which can develop the image information at high speed.

Reference numeral 21719 denotes a read address control unit for controlling the read address for the memory 21720. Like the read address control unit 21718, the reading start position and the thinning rate in the read address control unit 21719 can be set by the CPU 240.

Subsequently, the data read from the memory 21720 is inputted into a selector 21714 as a selection signal. When the selection signal has the low level, the inputted R, G and B image data are outputted from the selector 21714 as is. On the other hand, when the selection signal has the high level, R, G and B data (eight bits) stored in a register 21729 and respectively corresponding to four planes are outputted. In this case, since the CPU 240 can set the R, G and B data stored in the register 21729, the CPU 240 can add arbitrary colors to the additional information each described for the four planes.

The signals processed by the selector 21714 are converted by a D/S converter 21716 into analog signals for the monitor 219, and then the final image is displayed on the monitor 219.

(Color Conversion Unit 205)

Figure 14:
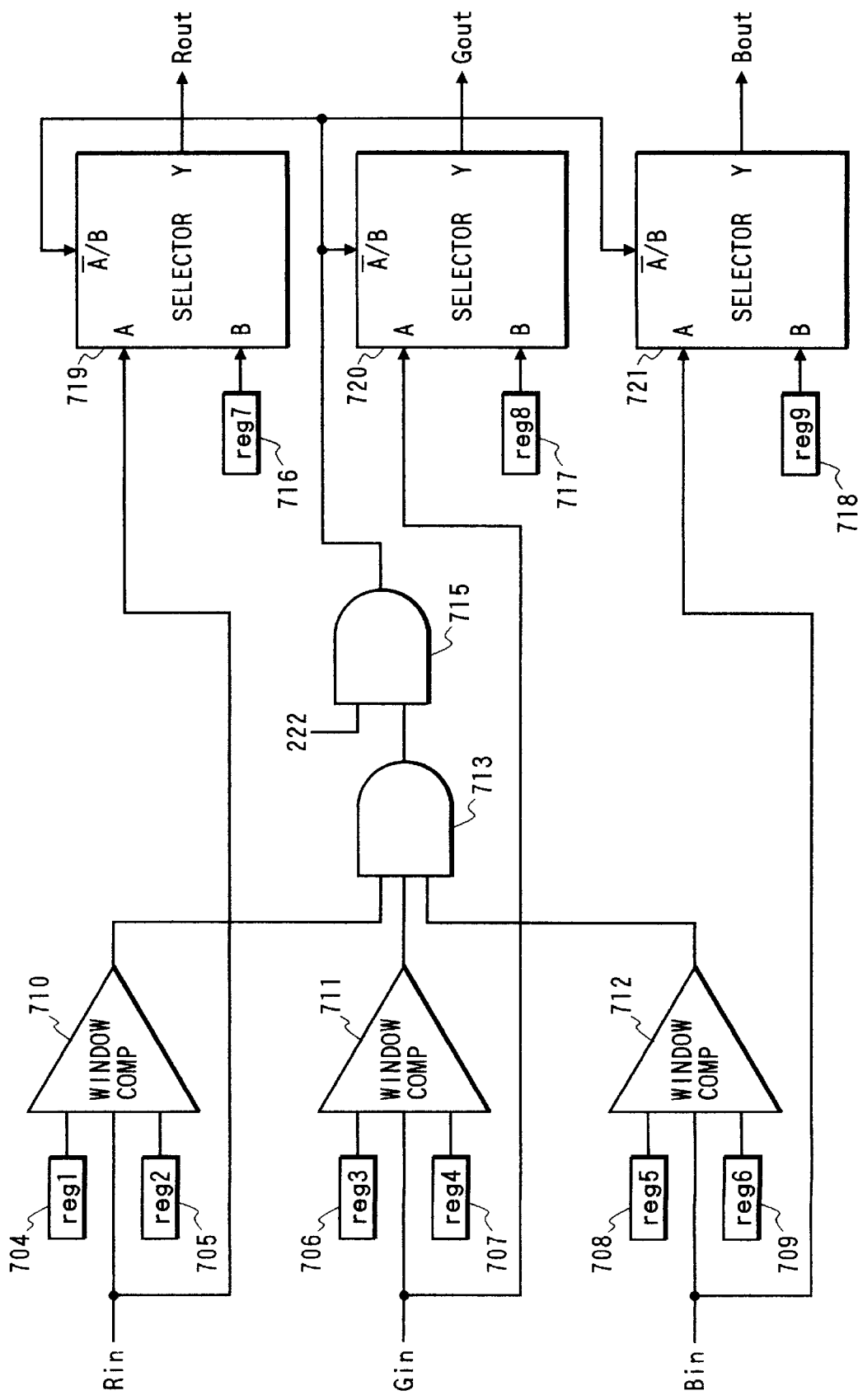
FIG. 14 is a block diagram showing the detailed structure of a color conversion unit.

FIG. 14 is a block diagram showing an example of the structure of the color conversion unit 205. This unit 205 is roughly divided into a detection part and a conversion part.

The detection part includes three window comparators 710 to 712, two AND gates 713 and 715, and registers 704 to 709 for storing threshold values of the window comparators. In this case, the threshold value of each window comparator is set by the CPU 240. In a case where the inputted image data satisfied all of following conditions, outputs of the respective window comparators and the AND gate 713 become "1". Therefore, when the enable signal 222 inputted from the area generation unit B 230 in to the AND gate 715 is "1", it can be considered that one specific color is detected.

$$reg1 \leq Rin \leq reg2$$

$$reg3 \leq Gin \leq reg4$$

$$reg5 \leq Bin \leq reg6$$

In this case, Rin, Gin and Bin respectively represent the R, G and B signals inputted into the color conversion unit 205, and reg1 to reg6 represent the threshold values respectively stored in the registers 704 to 709.

On the other hand, the conversion part includes three selectors 719 to 721 and three registers 716 to 718. When an output of the AND gate 715 is "1", the conversion colors set by the CPU 240 in the registers 716 to 718 are outputted. On the other hand, when the output of the AND gate 715 is "0", the image signals inputted into the color conversion unit 205 are outputted.

(Edit Circuit 213 (Paint and Free Color Processes))

Figure 15:
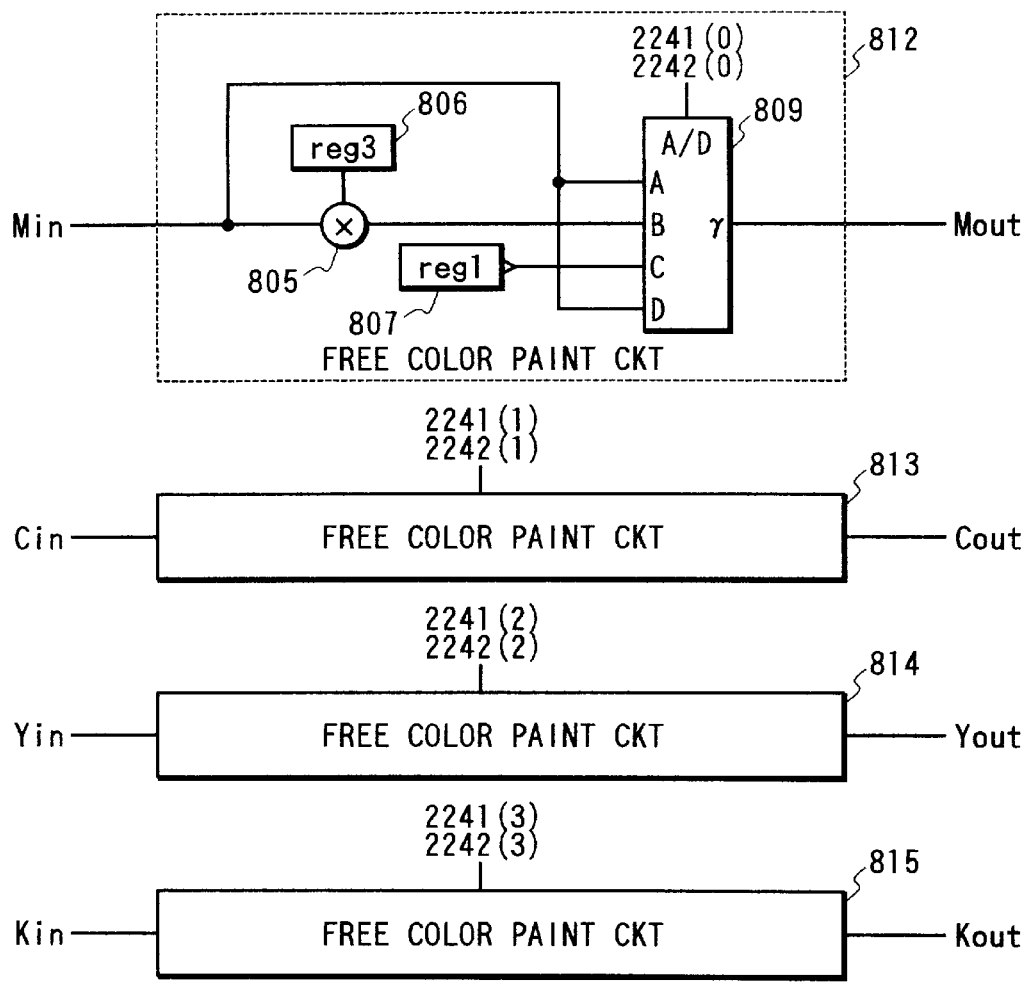
FIGS. 15A and 15B are block diagrams showing the detailed structure of an edit circuit.

FIG. 15A is a block diagram showing an example of the structure of the edit circuit 213. Since the edit circuit 213 includes the same structure for the respective color components, only the structure of a free color paint circuit 812 for the M (magenta) signal is shown, and the detailed structure of free color paint circuits 813 to 815 for other color signals (i.e., components) are omitted.

The free color paint circuit 812 includes a multiplier 805, a selector 809, and registers 806 and 807 of which values are set by the CPU 240.

In the free color process, a ND signal (=M/3+C/3+Y/3) generated by the masking and UCR unit 212 and the value reg3 (determined by the color set by the operator) set in the register 806 are multiplied by the multiplier 805, and a multiplied output is selected and outputted by the selector 809 in accordance with the enable signals 2241 and 2242. Since 0th bits of the enable signals 2241 and 2242 are inputted into the selector 809 as the area signals, the selecting is performed according to the values of these signals as shown in a table of FIG. 15B. For example, if the operator intends to perform the free color process only on part of the image, he may set the 0th bit of the signal 2241 as "1" and the 0th bit of the signal 2242 "0" on the portion to which the free color process is intended. Since the 0th bit of the signal 2242 is "0", the masking and UCR unit 212 is controlled to output the ND signal on the area to which the free color process is performed.

Further, in the paint process, the selector 809 selects the value reg1 set in the register 807. That is, the controlling is performed such that the 0th bits of the signals 2241 and 2242 become "0" and "1", respectively.

The free color paint circuits 813, 814 and 815 for the C (cyan), Y (yellow) and K (black) color components are controlled by the first, second and third bits of an area signal 224, respectively.

In case of the preview displaying, the controlling is performed such that all the bits of the signal 224 become simultaneously enabled.

As explained above, according to the present embodiment, there are provided the mode for previewing the image obtained by the color conversion process (i.e., process in RGB system) to the read original image, the mode for previewing the image obtained by the paint process and the free color process (i.e., processes in CMY system), and the mode for previewing the result of the image synthesizing. Therefore, in all the image processes, the preview displaying of the images which are substantially equivalent to those practically printed out can be performed.

(Console Unit 500)

Figure 16:
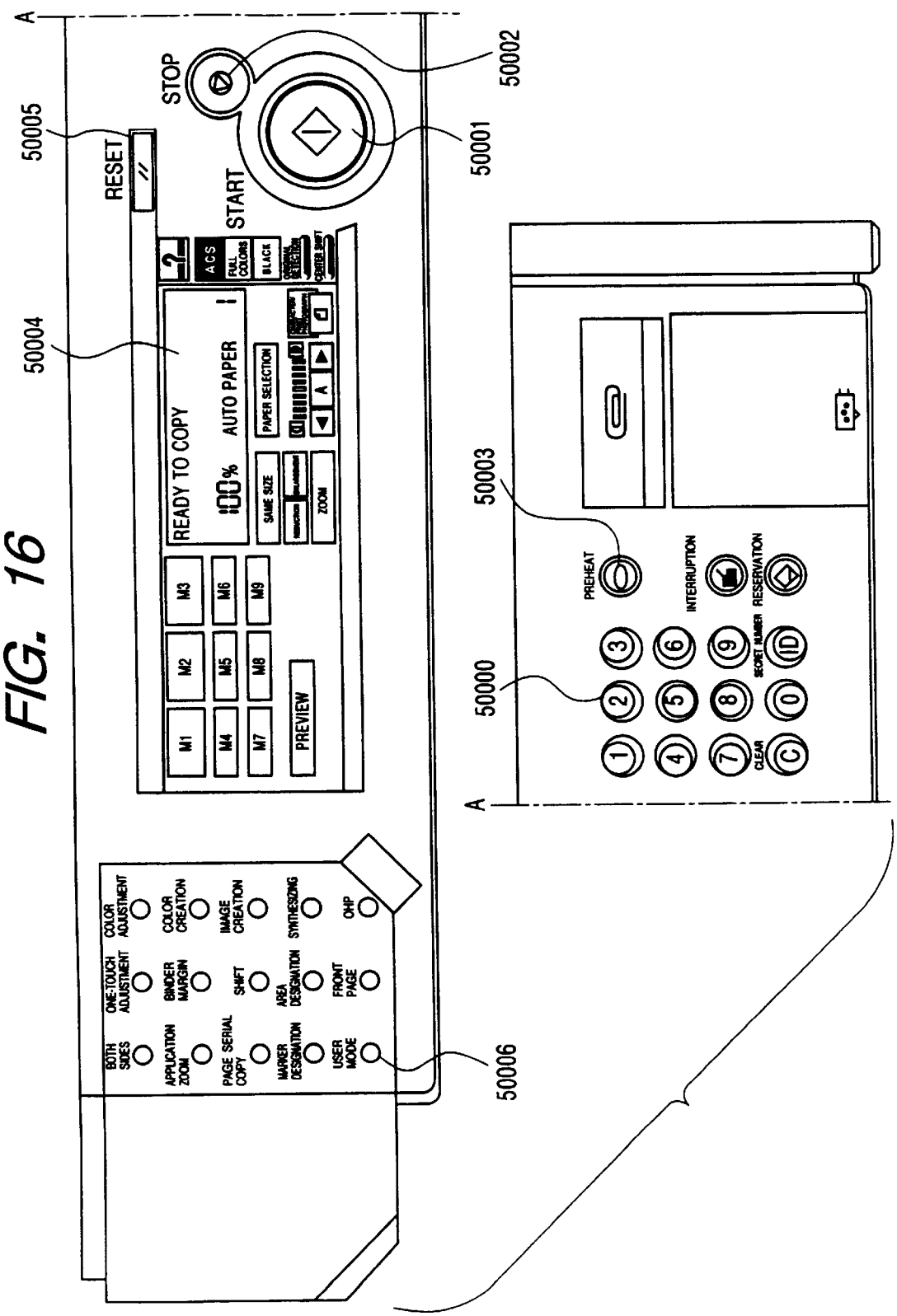
FIG. 16 is a view showing the outer appearance of a console unit of a digital copy machine.

FIG. 16 is a view showing appearance of the console unit 500. In FIG. 16, reference numeral 50000 denotes numeral keys (or ten key), 50001 denotes a copy start key, 50002 denotes a stop key, 50003 denotes a preheat key, 50004 denotes a liquid crystal display unit, 50005 denotes a reset key, and 50006 denotes a user mode key.

Figure 17:
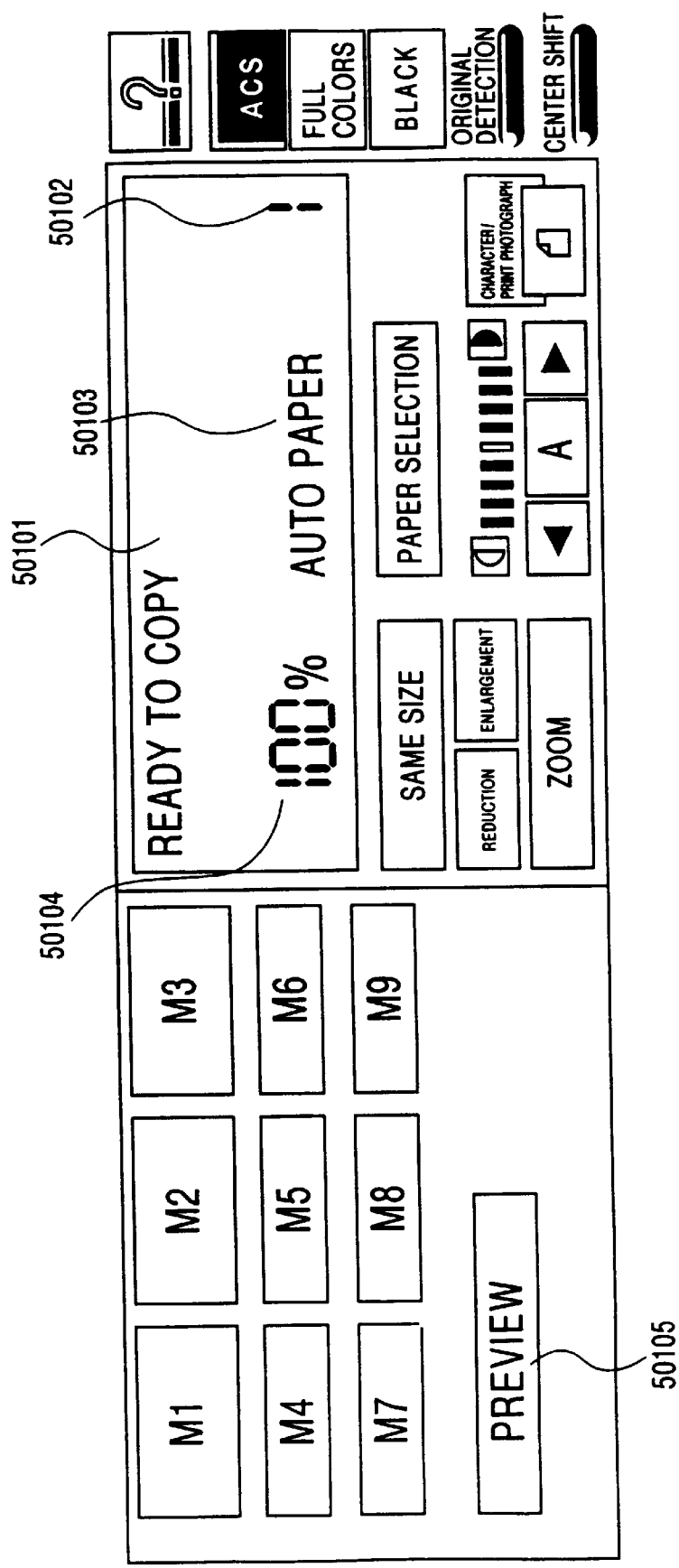
FIG. 17 is a view showing a standard image plane of the console unit.

FIG. 17 shows a standard image plane of the liquid crystal display unit 50004.

In the standard image plane of FIG. 17, reference numeral 50101 denotes a display part for displaying the state of the apparatus, 50102 denotes a display part for displaying the number of copies which was set by the operator, 50103 denotes a display part for displaying a paper size, and 50104 denotes a display part for displaying copy magnification. Reference numeral 50105 denotes a touch key (i.e., preview mode key) for instructing to start the preview mode in the present embodiment.

Prior to starting of the preview process, the operator designates the magnification, the paper size and the edit process by using the console unit 500. Then, the operator depresses the preview mode key 50105 to change the standard image plane to a preview operation image plane.

Figure 18:
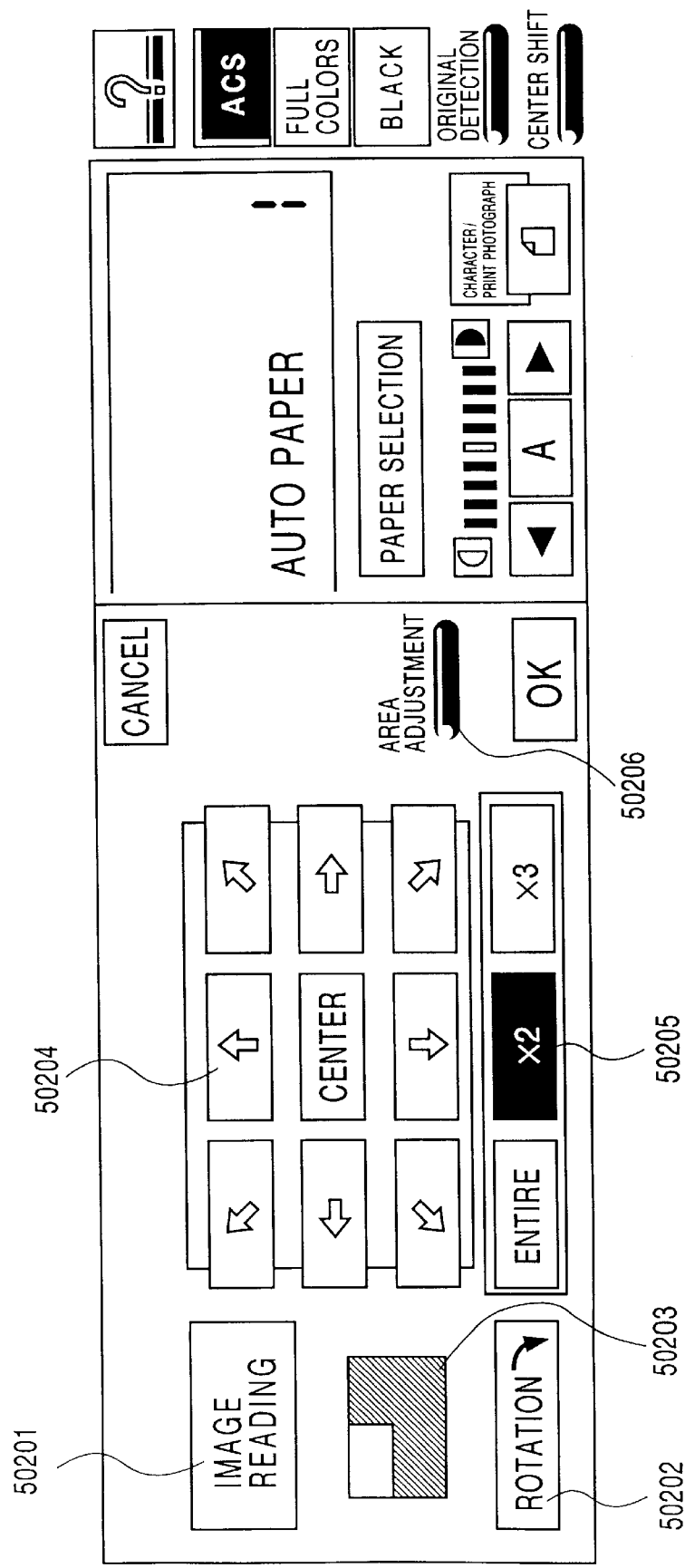
FIG. 18 is a view showing a preview operation image plane.

FIG. 18 shows an example of the preview operation image plane. In the image plane, reference numeral 50201 denotes an image reading key for showing the preview starting, 50202 denotes a display direction setting key, 50203 denotes an area monitor, 50204 denotes display position setting keys, 50205 denotes display magnification setting keys, and 50206 denotes an area fine adjustment key.

Initially, the operator puts the original on an original mounting board (not shown) or the feeder 102, and sets a display direction (i.e., longitudinal or lateral) of the original by using the display direction setting key 50202. Ordinarily, the display direction is set such that an original stop position on the original mounting board is located at an upper right part on the monitor 219. When the display direction setting key 50202 is depressed, the displaying of such key is reversed into black, and the image rotated by 90° is written into the memories 21711 to 21713 in the display edit circuit 2175 of the preview process unit 217. Thus, the image at the original stop position on the board which was rotated by 90° is displayed on the monitor 219.

When the operator depresses the image reading key 50201, if the original is being put on the feeder 102, the original is fed from the feeder 102 to original mounting board. Further, if a prescan mode is being set, pre-scanning is performed to detect a size of the original put on the board. Then, a scanning operation for reading the image starts to begin to derive the image from the CCD 201. The derived image signal is converted into the C, M and Y signals, and subjected to the various edit processes. Then, the processed signals are transferred to the preview process unit 217. Then, on the basis of the display direction, the magnification, the original size and the like which were set from the console unit 500, the CPU 240 calculates a most effective image size such that the entire image can be stored into each of the memories 21711 to 21713. Thus, the image signals are written or stored into the memories 21711 to 21713 in the calculated image size. Then, when these image signals are transferred to the monitor 219 by the display controller 21710, the preview image is displayed.

Each size of the image memories 21711, 21712 and 21713 is nine times as large as the display size 640×480 pixels of the monitor 219, i.e., 1920×1440 pixels. For this reason, in case of transferring the data from the image memories 21711 to 21713 to the monitor 219, it is necessary to transfer such data to the monitor 219 after such data in the image memories 21711 to 21713 are zoomed by the display controller 21710 on the basis of the display size of the monitor 219 and the display magnification set by the display magnification setting keys 50205.

Figure 19:
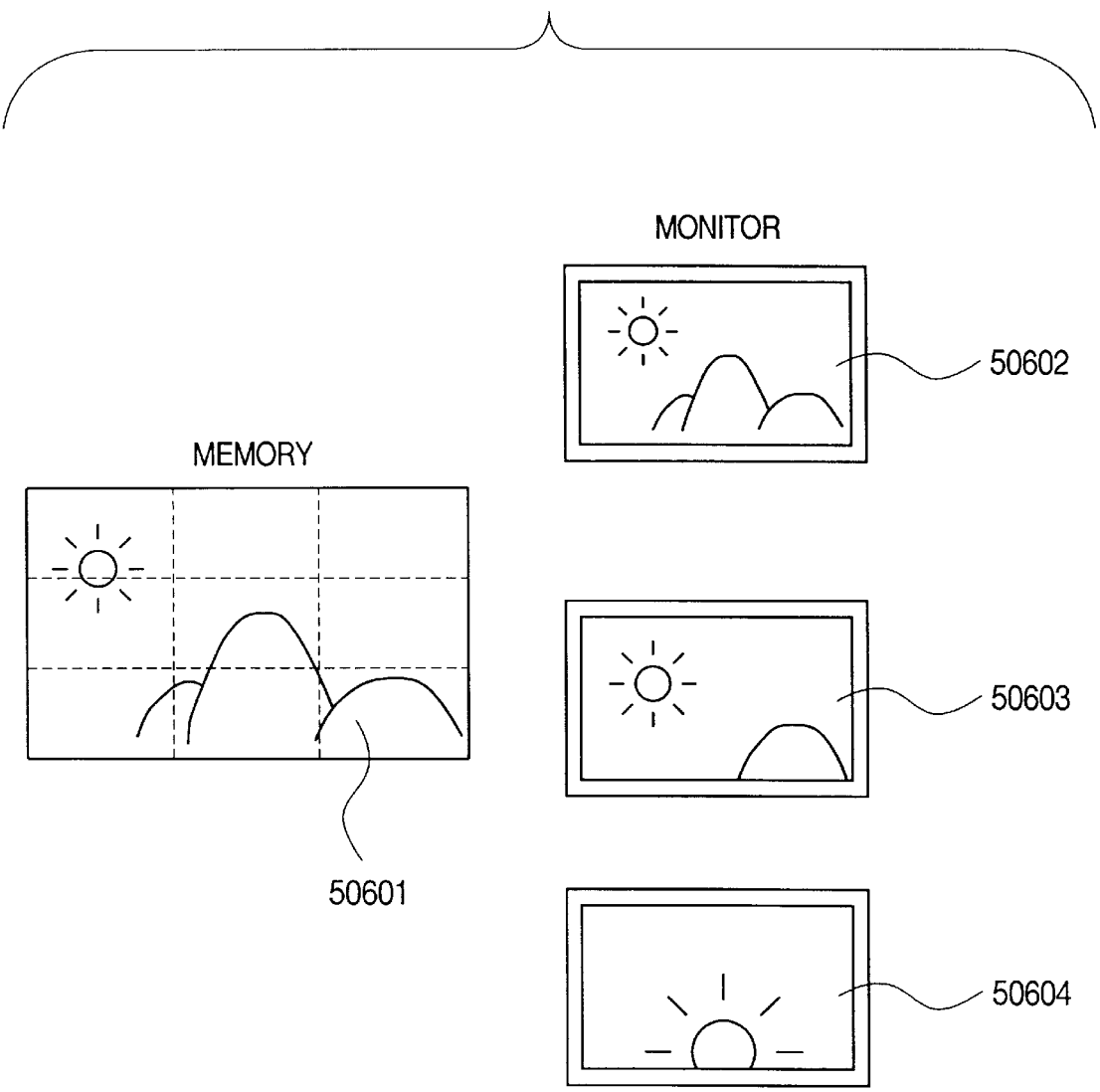
FIG. 19 is a view showing an example of a monitor displaying by a display magnification setting.

FIG. 19 shows a concrete example of display magnification setting. In FIG. 19, it will be explained hereinafter a case where the image data represented by a monitor image plane 50601 is being written or stored in the image memories 21711 to 21713. In this case, if the display magnification "entire" (i.e., "×1") is set by the display magnification setting key 50205, all the data areas of the image memories 21711 to 21713 are reduced by ⅑ by the display controller 21710 and displayed on the monitor 219 as shown in a monitor image plane 50602. If the display magnification "×2" is set by the display magnification setting key 50205, ⅑ of the data areas of the image memories 21711 to 21713 are reduced by ¼ by the display controller 21710 and displayed on the monitor 219 as shown in a monitor image plane 50603. That is, as compared with the displaying in case of "entire", the part of the image (⅑ areas) is enlarged twice and displayed. Similarly, if the display magnification "×3" is set by the display magnification setting key 50205, a ⅑ data area of the image data is transferred to the display memory with the same size, and displayed as shown in a monitor image plane 50604. That is, as compared with the displaying in case of "entire", the part of the image (⅑ areas) is enlarged three times as large as the original size and displayed.

Further, in the case where the display magnification "×2" or "×3" is being set by the display magnification setting key 50205, the part of the image memories 21711 to 21713 is displayed on the monitor 219. Thus, if the reading position in the memory area is changed and then the read data is transferred to the monitor 219, the part which is not currently displayed can be displayed. Hereinafter, a method for realizing such method will be described.

In the case where the display magnification "×2" is being set by the display magnification setting key 50205, the arbitrary image of ¼ size in the image memories 21711 to 21713 is being displayed on the monitor 219. At this time, if a downward arrow key included in the display position setting keys 50204 is depressed once, the reading start position of the image memories 21711 to 21713 is set at a position shifted downward by, e.g., four dots. The image data of ¼ size is transferred from such position. Therefore, the lower-part image in the image plane which has not been displayed on the monitor 219 can be newly displayed.

Further, if the display area in the image is shifted, the current display area is being displayed on the area monitor 50302 such that the operator can confirm which area in the image memories 21711 to 21713 is being currently displayed.

(Area Correction by Previewing)

In the present embodiment, before the operator performs the preview displaying, if the area designating has been set by the digitizer (not shown) or the like, the area-processed preview image can be displayed. In this case, if the area position or the size of the displayed image is different from that designated, of if the processed tint in the area slightly differed, such area can be finely adjusted on the preview image plane (i.e., monitor 219).

Figure 20:
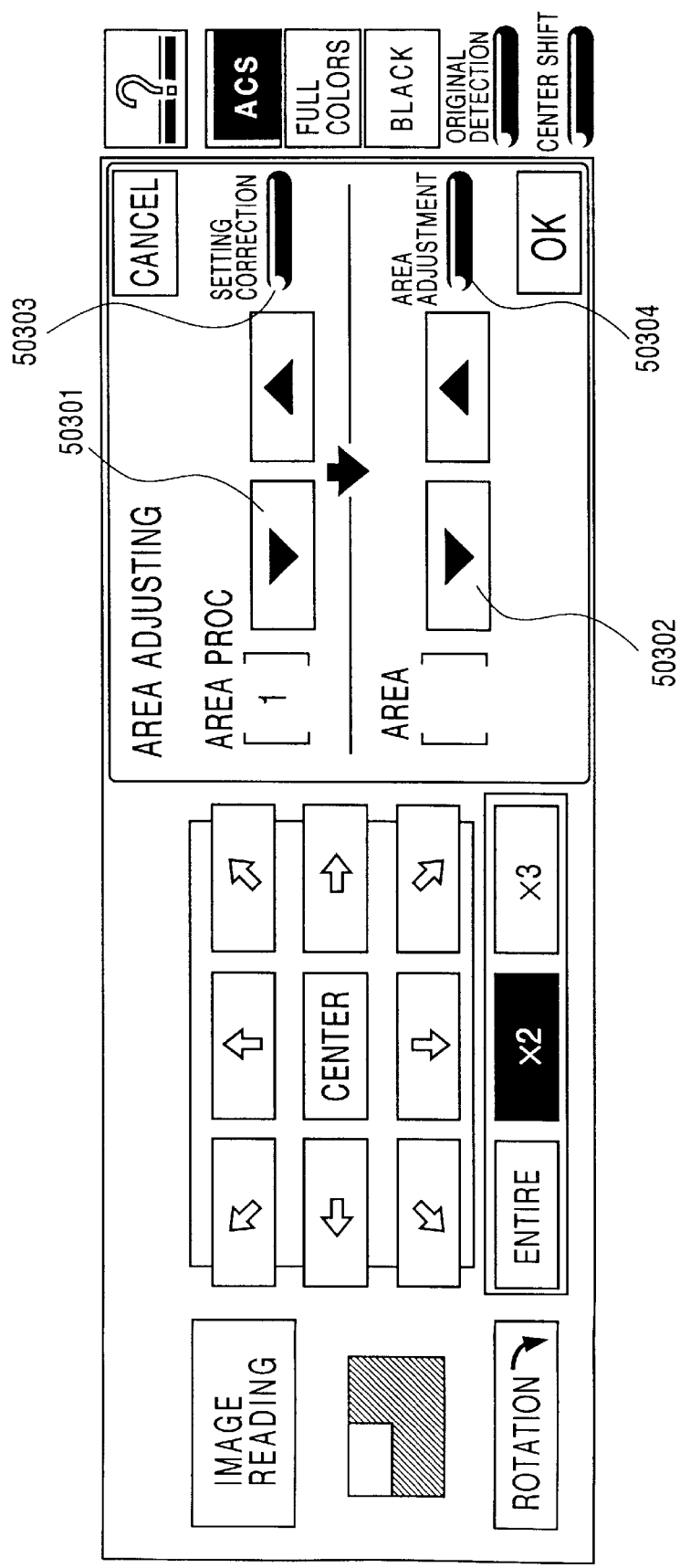
FIG. 20 is a view showing an area selection image plane.
Figure 21:
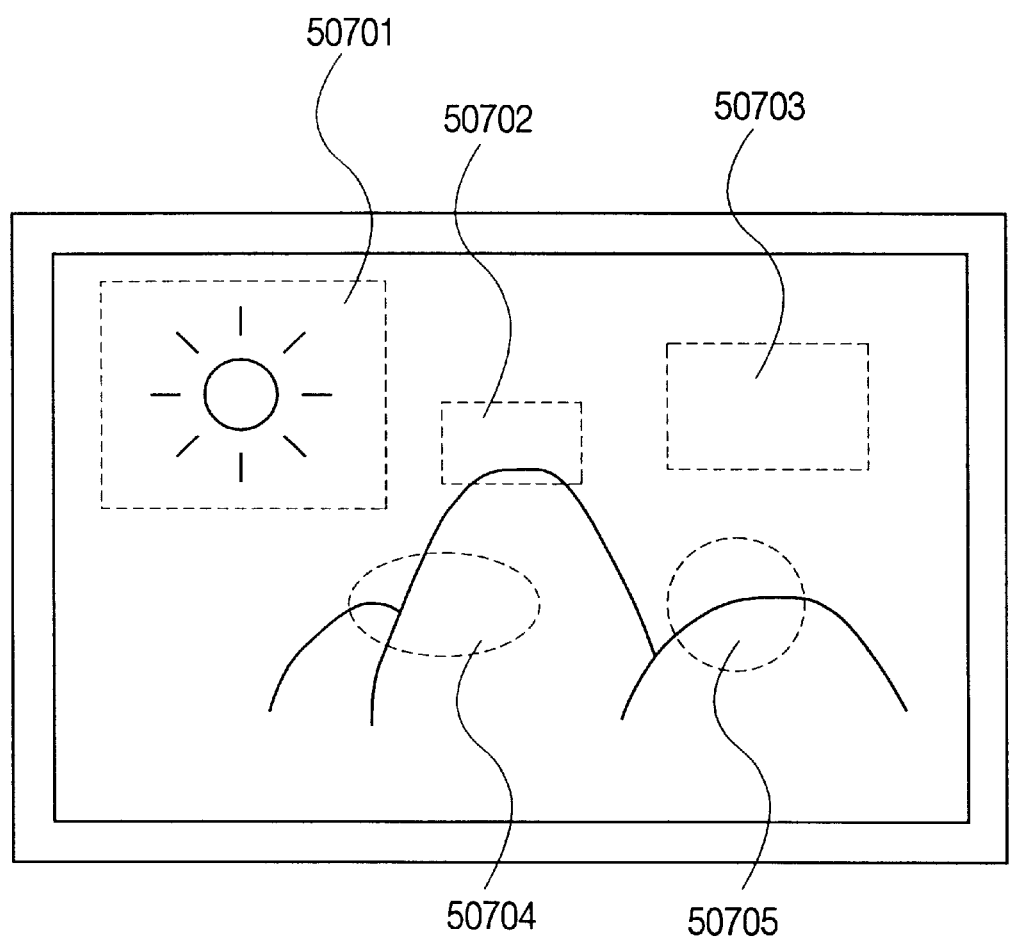
FIG. 21 is a view showing an example of a preview image for area correcting.

Prior to the start of area adjusting, the operator depresses the area fine adjustment key 50206 to change the preview operation image plane to an area fine adjustment image plane shown in FIG. 20. Then, an area selection image plane shown in FIG. 21 is displayed on the monitor 219. In this case, outer frames of all the areas set in the area setting is double displayed on the image which is displayed on the monitor 219. Such outer frame is generated by calculating the size and position of the setting area with the CPU 240, on the basis of the copy magnification, the display magnification set by the display magnification setting keys 50205, the display direction set by the display direction setting key 50202, and the like.

Outer frame information of the formed area is developed into an area image memory 1 (to be referred as plane memory 1 hereinafter) of the memory 21720 in the display edit circuit 2175, and transferred to an area display memory 1 (to be referred as plane memory 1' hereinafter) of the same memory 21720. Then, the outer frame information is displayed on the monitor 219. At this time, the area is double displayed in the currently displayed preview image plane.

The plane memory 1 has a size several times as large as the pixel size of the monitor 219. In a case where a transfer area and transfer magnification in the preview image are calculated, a transfer area and transfer magnification of the plane memory 1 are simultaneously calculated based on the setting display magnification and display position, and then obtained data is transferred to the plane memory 1'. Therefore, every time the display magnification setting and the display position setting are changed, the area is re-displayed according to updating of the preview image.

In the present embodiment, the process contents can be set up to the maximum 30 area processes, and the maximum 15 areas can be set every area process. FIG. 21 shows an example of the preview image in case of performing the plurality of areas designating. That is, as an area process 1, the paint process is performed on three areas 50701 (area 1), 50702 (area 2) and 50703 (area 3). Further, as an area process 2, the color conversion process is performed on two areas 50704 (area 1') and 50705 (area 2').

As above, in the case where the plurality of areas are being set within one image, it is necessary for the user to designate the area (i.e., target area) on which the area adjusting is intended. In an area adjustment image plane shown in FIG. 20, such target area can be designated by area process number setting keys 50301, area number setting keys 50302 or the like.

Initially, when an up key in the area process number setting keys 50301 is selected, the areas for the area process 1 are selected. At this time, the outer frames (50701, 50702 and 50703 in FIG. 21) of the areas for the area process 1 are calculated in the above-described procedure, and formed in an area image memory 2 (to be referred as plane memory 2 hereinafter) of the memory 21720 in the display edit circuit 2175 shown in FIG. 13 by the CPU 240. Subsequently, the frames are zoomed based on the magnification designated by the display magnification setting key 50205, transferred to an area display memory 2 (to be referred as plane memory 2' hereinafter) of the memory 21720, and then displayed on the monitor 219 with a color different from that in the displaying of the plane memory 1'.

As above, by differing the display color set in the plane memory 1' from that set in the plane memory 2', the selected area process can be easily recognized in the plurality of areas on the monitor 219.

Further, if the area process 2 is designated by depressing the up key of the area process number setting keys 50301, the areas for the area process 1 written in the plane memory 2 are deleted, and instead the areas (50704 and 50705 in FIG. 21) for the area process 2 are newly rewritten and displayed on the monitor 219.

Figure 22:
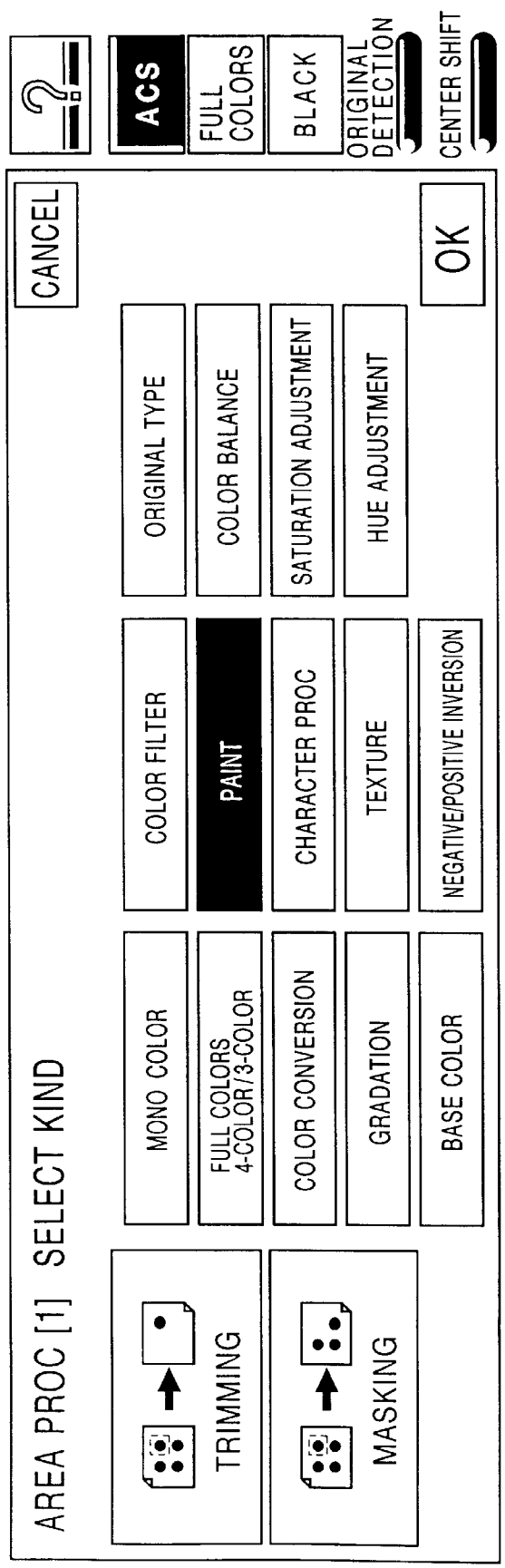
FIG. 22 is a view showing an area process content change image plane.

As above, if the operator sets the area process of which contents are intended to be changed and changes the process contents on an area process content change image plane shown in FIG. 22 by depressing a setting correction key 50303, such changed contents are fed back, whereby the area process contents can be changed.

Subsequently, a case will be explained where the area size is changed.

In the area adjustment image plane shown in FIG. 20, the area process including the area intended to be changed is first selected by the area process number setting keys 50301 in the above-described procedure. Then, the area is selected by the area number setting keys 50302. Hereinafter, a case will be explained, e.g., the area 2' for the area process 2 (50705 in FIG. 21) is intended to be shifted leftward by 1 cm.

Initially, the area process 2 is selected by the area process number setting keys 50301. Subsequently, when the area number setting key 50302 is depressed, the area 1' (50704 in FIG. 21) for the area process 2 is selected. At this time, the outer frame of the area 1' is developed into an area image memory 3 (to be referred as plane memory 3 hereinafter) of the memory 21720 in the display edit circuit 2175 in FIG. 13 by the CPU 240. Such developed frame is transferred to an area display memory 3 (to be referred as plane memory 3' hereinafter) of the memory 21720, and displayed on the monitor 219 with a color different from those in the displaying of the plane memories 1' and 2'.

Priority order of the display memories is the plane memory 1'<the plane memory 2'<the plane memory 3'. Therefore, even if the operator does not remember the area number intended to be corrected, he can recognize the designated area process in all the areas on the monitor 219, and further recognize the desired area in all the areas.

Subsequently, in the case where the area 2' (50705 in FIG. 21) is set by the area number setting keys 50302, the area 1' (50704) in the plane memory 3' is deleted, and instead the area 2' is newly written into the plane memory 3 and displayed on the monitor 219.

Figure 23:
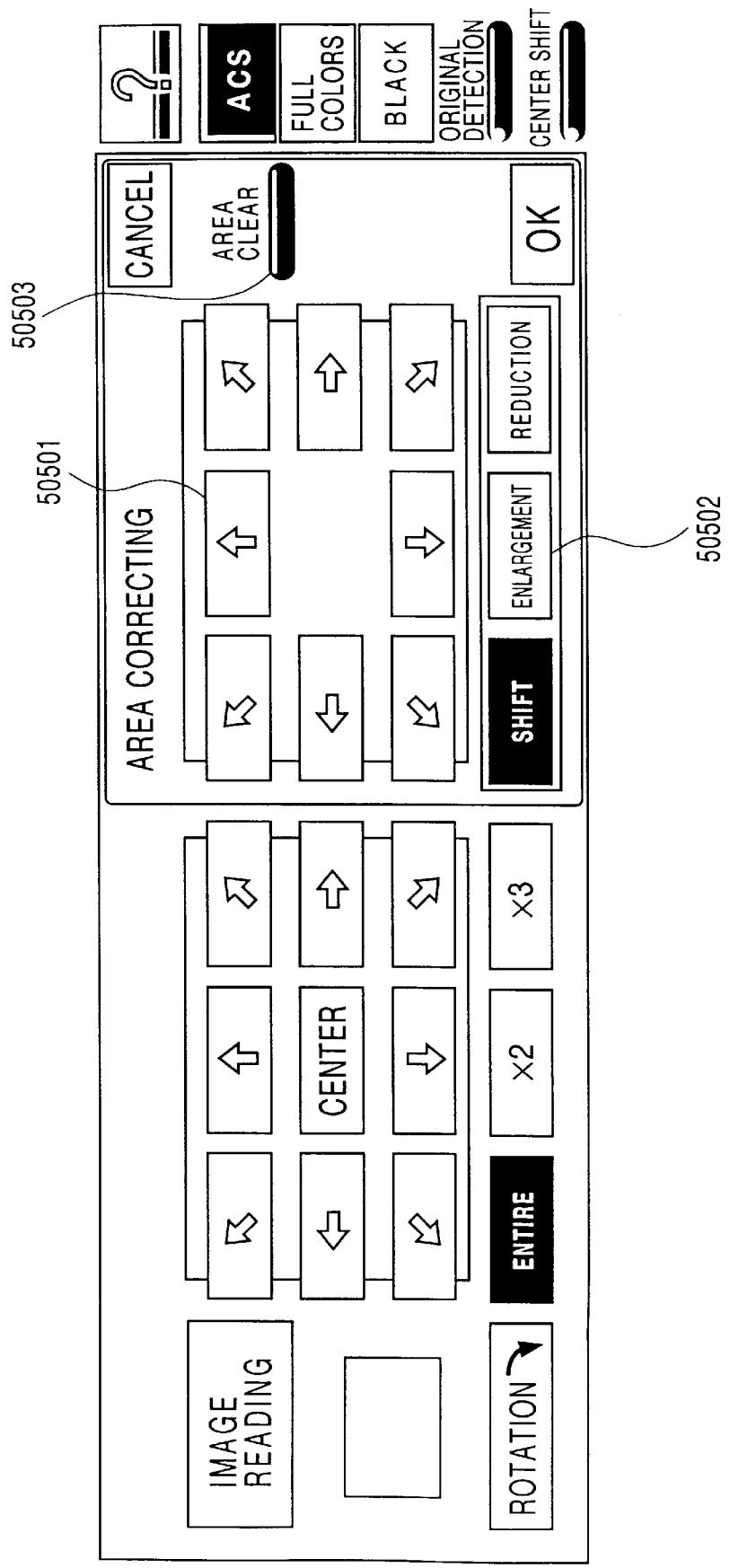
FIG. 23 is a view showing an area size adjustment image plane.

As above, after setting the area for which area size is intended to be changed, the operator depresses an area correction key 50304 to change the image plane to the area size adjustment image plane shown in FIG. 23.

In FIG. 23, reference numerals 50501 denotes area correction keys, 50502 denotes area correction setting keys, and 50503 denotes an area clear key.

Hereinafter, a case will be explained where the area 2' is intended to be shifted leftward. In this case, a "shift" mode is first designated by the area correction setting key 50502, and a leftward arrow key of the area correction keys 50501 is then depressed. At this time, the area 2' stored in the plane memory 3 is cleared, and instead the area which was shifted leftward by four pixels is formed in the plane memory 3 and then transferred to the plane memory 3' to be displayed on the monitor 219. Therefore, it is understood that the designated area is shifted in the preview image displayed on the monitor 219. Moreover, since an amount of such shifting is fed back to the CPU 240, if the image reading key 50201 is again depressed on the preview control image plane in FIG. 18, the preview displaying of the image which was area-processed is performed at the shifting-adjusted area position.

As above, in the present embodiment, as the preview image is compared with the designated area, the area can be shifted. Further, in case of changing the area size, similarly, an "enlargement" mode or a "reduction" mode may be set by the area correction setting key 50502. Furthermore, since the area size is stepwise changed according to depressing of an OK key, the area size can be arbitrarily set.

As described above, in the present embodiment, as the size, position and processing contents of the area are compared with the preview image, such area can be adjusted. Then, if the image desired by the operator is preview displayed on the monitor 219, such image can be printed out by depressing the copy start key 50001.

In each of the above-explained operation image planes on the console unit 500, if the OK key is depressed, the image plane returns to the previous image plane in a state that the current correcting or adjusting is reflected. On the other hand, if a cancel key is depressed, the current correcting or adjusting is deleted, and the image plane returns to the previous image plane with maintenance of the preceding setting.

As explained above, according to the present embodiment, in the case where the preview image displayed on the monitor 219 is edited and re-displayed, the monitor displaying can be performed without again scanning the original by the reader unit 101. Therefore, since a processing time necessary for the re-displaying can be shortened, a waiting time for the operator can be also shortened, whereby the preview process which is satisfactory in operability can be performed.

Further, since the original scanning is not performed in case of the re-displaying, a life of a halogen lamp or the like of the reader unit 101 which irradiates the original can be prolonged, whereby image processing apparatus which is also satisfactory in cost can be provided.

The present embodiment has been explained on the image processing apparatus of a four-drum system. However, it may be used with an image processing apparatus having the structure to form a latent image on one photosensitive drum by using a plurality of image formation units.

The present invention can be applied to a system constructed by a plurality of equipments such as a host computer, an interface, a printer and the like, or can be applied to an apparatus comprising one equipment such as a copy machine or the like.

It will be obviously understood that the present invention can be applied to a case which is executed by supplying a program to a system or apparatus. In this case, a storage medium which stores the program according to the present invention constructs the present invention. By reading the program from storage medium to the system or apparatus, such the system or apparatus operates in a predetermined manner.

As explained above, according to the present embodiment, since the color process which is used in case of the image forming is also used in case of the preview displaying, it can be prevented that the scale of the apparatus becomes large. Further, since the preview process corresponding to the first color process mode is performed irrespective of the color process control signal, the preview displaying which reflects the setting color process mode can be performed.

Although the present invention has been described with respect to the above-described embodiment, the present invention is not limited to such the embodiment but many modifications and variations are possible within the spirit and scope of the appended claims.

What is claimed is:

1. An image processing apparatus comprising:

color process means for performing a color process including a masking process and a UCR process for input image data in order to generate color image data composed of a plurality of color components including a black component;

judgement means for judging a characteristic of the input image data, and outputting a color process control signal;

control means for controlling said color process means on the basis of the color process control signal;

output means for outputting the color image data to image formation means; and preview process means for performing a preview process on the color image data by using a parameter obtained on the basis of a parameter used by said color process means, and outputting preview image data composed of a plurality of color components which do not include the black component, wherein said preview process means performs a predetermined process by using the obtained parameter independent of the color process control signal.

2. An apparatus according to claim 1, wherein said judgment means performs a black character judgment process.

3. An apparatus according to claim 2, further comprising setting means for setting a kind of an image represented by the image data, on the basis of manual instructions, and wherein said judgment means performs the black character judgment process on the basis of the manual instructions.

4. An apparatus according to claim 1, wherein the preview process includes an inverse logarithmic conversion process and the color process corresponding to a display characteristic of display unit.

5. An image processing method comprising:

a color process step of performing a color process including a masking process and a UCR process for input image data in order to generate color image data composed of a plurality of color components including a black component;

a judgement step of judging a characteristic of the input image data, and outputting a color process control signal;

a control step of controlling said color process step on the basis of the color process control signal;

an output step of outputting the color image data to image formation means; and a preview process step of performing a preview process on the color image data by using a parameter obtained on the basis of a parameter used by said color process step, and outputting preview image data composed of a plurality of color components which do not include the black component, wherein said preview process step performs a predetermined process by using the obtained parameter independent of the color process control signal.

6. A storage medium which stores a program for executing an image processing method comprising:

a color process step of performing a color process including masking process and a UCR process for input image data in order to generate color image data composed o a plurality of color components including a black component;

a judgement step of judging a characteristic of the input image data, and outputting a color process control signal;

a control step of controlling said color process step on the basis of the color process control signal;

an output step of outputting the color image data to image formation means; and a preview process step performing a preview process on the color image data by using a parameter obtained on the basis of a parameter used by said color process step, and outputting preview image data composed of a plurality of color components which do not include the black component, wherein said preview process step performs la predetermined process by using the obtained parameter independent of the color process control signal.

* * * * *

UNITED STATES PATENT AND TRADEMARK OFFICE
CERTIFICATE OF CORRECTION

PATENT NO. : 5,933,257
DATED : August 3, 1999
INVENTOR(S) : Mitsuru Kurita It is certified that error appears in the above-identified patent and that said Letters Patent is hereby corrected as shown below:

ON THE TITLE PAGE

[57] In the Abstract:
    Line 11, "a" (second occurrence) should read --an--.

COLUMN 1

Line 30, "manufactured" should read
    --manufactured as--.

COLUMN 4

Line 56, "terminated," should read --is terminated,--.

COLUMN 5

Line 41, "the" (first occurrence) should read --an--.

COLUMN 8

Line 4, "an" should read --a--.

COLUMN 9

Line 58, "an" should read --a--.

UNITED STATES PATENT AND TRADEMARK OFFICE
CERTIFICATE OF CORRECTION

PATENT NO. : 5,933,257

DATED : August 3, 1999

INVENTOR(S) : Mitsuru Kurita

It is certified that error appears in the above-identified patent and that said Letters Patent is hereby corrected as shown below:

COLUMN 10

Line 40, "the" (first occurrence) should be deleted; and
    Line 41, "to" should be deleted.

COLUMN 11

Line 2, "Laplacean" should read --Laplacian--;
    Line 20, "Laplacean" should read --Laplacian--;
    Line 46, "and" should be deleted; and
    Line 56, "bits" should read --bit--.

COLUMN 13

Line 22, "very" should read --every--; and
    Line 50, "ity" should read "ity of--.

COLUMN 15

Line 12, "finest" should read --thinnest--.

COLUMN 16

Line 42, "enable" should read --enabled--.

COLUMN 17

Line 23, "enable" should read --enabled--.

UNITED STATES PATENT AND TRADEMARK OFFICE
CERTIFICATE OF CORRECTION

PATENT NO. : 5,933,257

DATED : August 3, 1999

INVENTOR(S) : Mitsuru Kurita

It is certified that error appears in the above-identified patent and that said Letters Patent is hereby corrected as shown below:

COLUMN 18

Line 46, "the" (first occurrence) should be deleted; and "occurred" should read --occurring--.

COLUMN 19

Line 59, "the" should read --a--.
Line 59, "S605" should read --S 507 --

COLUMN 23

Line 1, "developed" (first occurrence) should be deleted.

COLUMN 26

Line 42, "is" should read --are--.

UNITED STATES PATENT AND TRADEMARK OFFICE
CERTIFICATE OF CORRECTION

PATENT NO.   : 5,933,257

DATED        : August 3, 1999

INVENTOR(S)  : Mitsuru Kurita

It is certified that error appears in the above-identified patent and that said Letters Patent is hereby corrected as shown below:

COLUMN 30

Line 39, "o" should read --of--; and
    Line 55, "la" should read --a--

Signed and Sealed this

Third Day of October, 2000

Attest:

Attesting Officer

Q. TODD DICKINSON

Director of Patents and Trademarks